US012213934B2

(12) United States Patent
Tung et al.

(10) Patent No.: US 12,213,934 B2
(45) Date of Patent: Feb. 4, 2025

(54) EXOSKELETON LEGS TO REDUCE FATIGUE DURING REPETITIVE AND PROLONGED SQUATTING

(71) Applicants: The Regents of the University of California, Oakland, CA (US); suitX, Inc., Emeryville, CA (US)

(72) Inventors: Wayne Tung, Berkeley, CA (US); Minerva V. Pillai, Redwood City, CA (US); James Hatch, Oakland, CA (US); Homayoon Kazerooni, Berkeley, CA (US); Theerapat Yangyuenthanasan, Berkeley, CA (US); Yusuke Maruo, Berkeley, CA (US); David Cuban, Oakland, CA (US)

(73) Assignees: The Regents of the University of California, Oakland, CA (US); suitX, Inc., Emeryville, CA (US)

( * ) Notice: Subject to any disclaimer, the term of this patent is extended or adjusted under 35 U.S.C. 154(b) by 864 days.

(21) Appl. No.: 17/208,900

(22) Filed: Mar. 22, 2021

(65) Prior Publication Data

US 2021/0315765 A1 Oct. 14, 2021

Related U.S. Application Data

(63) Continuation of application No. 15/813,013, filed on Nov. 14, 2017, now Pat. No. 10,966,894, which is a (Continued)

(51) Int. Cl.

| | |
|---|---|
| ***A61H 3/00*** | (2006.01) |
| ***A61H 1/02*** | (2006.01) |

(52) U.S. Cl.

CPC ............... *A61H 3/00* (2013.01); *A61H 1/024* (2013.01); *A61H 2201/1207* (2013.01); (Continued)

(58) Field of Classification Search

CPC ...... A61F 5/019; A61F 5/0102; A61F 5/0127; A61F 5/0585; A61F 5/0111; (Continued)

(56) References Cited

U.S. PATENT DOCUMENTS

| | | | |
|---|---|---|---|
| 4,821,707 | A | 4/1989 | Audette |
| 4,967,734 | A | 11/1990 | Rennex |

(Continued)

FOREIGN PATENT DOCUMENTS

| | | | |
|---|---|---|---|
| WO | 2014039134 | A1 | 3/2014 |
| WO | 2018090047 | A1 | 5/2018 |

OTHER PUBLICATIONS

U.S. Appl. No. 15/813,013, Final Office Action mailed Sep. 17, 2020, 8 pgs.

(Continued)

*Primary Examiner* — Ophelia A Hawthorne

(74) *Attorney, Agent, or Firm* — Sterne, Kessler, Goldstein & Fox P.L.L.C

(57) ABSTRACT

An exoskeleton leg is wearable by a person. The exoskeleton includes a thigh link configured to move in unison with the thigh of the person, a shank link rotatably coupled to the thigh link and comprising at least one tooth, and a locking block coupled to the thigh link and comprising a locking face. Moreover, when the at least one tooth of the shank link contacts with the locking face, the shank link is prevented from flexion motion relative to the thigh link, but is allowed to extend relative to the thigh link.

23 Claims, 58 Drawing Sheets

Related U.S. Application Data continuation-in-part of application No. 15/647,856, filed on Jul. 12, 2017, now Pat. No. 9,980,873, which is a continuation of application No. 15/194,489, filed on Jun. 27, 2016, now Pat. No. 9,744,093.

(60) Provisional application No. 62/421,720, filed on Nov. 14, 2016, provisional application No. 62/185,185, filed on Jun. 26, 2015.

(52) U.S. Cl.
CPC ................ *A61H 2201/1246* (2013.01); *A61H 2201/164* (2013.01); *A61H 2201/1642* (2013.01); *A61H 2201/165* (2013.01); *A61H 2201/1652* (2013.01); *A61H 2201/1676* (2013.01); *A61H 2201/5007* (2013.01); *A61H 2201/5058* (2013.01); *A61H 2201/5061* (2013.01); *A61H 2201/5069* (2013.01); *A61H 2201/5084* (2013.01); *A61H 2203/0406* (2013.01); *A61H 2203/0418* (2013.01); *A61H 2205/102* (2013.01)

(58) Field of Classification Search
CPC ...... A61H 2201/164; A61H 2203/0406; A61H 2201/5061; A61H 2201/1676; A61H 2201/1652; A61H 2201/165; A61H 2201/1642; A61H 2201/1207
See application file for complete search history.

(56) References Cited

U.S. PATENT DOCUMENTS

| | | | |
|---|---|---|---|
| 6,666,796 | B1 | 12/2003 | MacCready, Jr. |
| 10,966,894 | B2 | 4/2021 | Tung et al. |
| 2010/0130898 | A1 | 5/2010 | Franke et al. |
| 2014/0276265 | A1* | 9/2014 | Caires .................. A61H 1/0255 601/34 |
| 2016/0158087 | A1 | 6/2016 | Huang et al. |
| 2016/0374888 | A1 | 12/2016 | Tung et al. |
| 2018/0200135 | A1 | 7/2018 | Tung et al. |

OTHER PUBLICATIONS

U.S. Appl. No. 15/813,013, Non Final Office Action mailed Apr. 16, 2020, 8 pgs.

U.S. Appl. No. 15/813,013, Notice of Allowance mailed Nov. 25, 2020, 7 pgs.

International Application Serial No. PCT/US2017/061627, Search Report and Written Opinion mailed Feb. 28, 2018, 9 pgs.

* cited by examiner hip abduction hip flexion hip rotation 140 degree

110degree 75 degree foot outward rotation foot inward rotation

EXOSKELETON LEGS TO REDUCE FATIGUE DURING REPETITIVE AND PROLONGED SQUATTING

CROSS-REFERENCE TO RELATED APPLICATIONS

This application is a continuation of U.S. patent application Ser. No. 15/813,013, filed on Nov. 14, 2017, issued as U.S. Pat. No. 10,966,894 on Apr. 6, 2021, which claims the benefit of U.S. Provisional Patent Application No. 62/421,720, filed Nov. 14, 2016, and is a continuation-in-part of U.S. patent application Ser. No. 15/647,856, filed Jul. 12, 2017, issued as U.S. Pat. No. 9,980,873 on May 29, 2018, which is a continuation of U.S. patent application Ser. No. 15/194,489, filed Jun. 27, 2016, issued as U.S. Pat. No. 9,744,093 on Aug. 29, 2017, which claims the benefit of U.S. Provisional Patent Application No. 62/185,185, filed Jun. 26, 2015, all of which are incorporated herein by reference in their entirety and for all purposes along with all other references cited in this application.

TECHNICAL FIELD

Described herein is an energetically passive exoskeleton system designed to resist flexion when the wearer is squatting or lunging, while not impeding the wearer during other maneuvers, such as during ambulation.

BACKGROUND

This apparatus relates to the field of exoskeletons, and in particular exoskeletons for legs. Human beings, for example, have two legs to walk, run, jump, squat, and kick, which are all very human activities. Exoskeletons can be used to restore, enhance and support some mobility.

SUMMARY

Here we describe a leg support exoskeleton to support squatting and lunging, while not impeding the wearer during other maneuvers. The system is an exoskeleton that provides assistance during knee flexing maneuvers of its wearer, such as (but not limited to) squatting or lunging, by use of a constraining mechanism at one or both exoskeleton legs having at least two operational modes: a constrained mode for assisting such flexing maneuvers, and an unconstrained mode, which allows for free and unconstrained walking. When the constraining mechanism is in its constrained mode, a force generator provides a force to support the wearer during flexion, and may support the wearer during extension, while in its unconstrained mode, the force generator provides minimal to no interference to the wearer's flexing maneuvers. Thus, the wearer is free to move without any interference from the exoskeleton during, for example, walking or descending stairs.

In one embodiment, the system is configured to be coupled to two lower extremities of a wearer, including two exoskeletal legs, each leg including (a) a thigh link, (b) a shank link, rotatably coupled to the thigh link, and capable of flexing and extending relative to the thigh link about a knee joint, (c) a force generator, wherein a first end of the force generator is coupled to the shank link, and a second end of the force generator is coupled to the thigh link, and (d) a constraining mechanism, coupled to the thigh link, and having at least two operational modes—a constrained mode and an unconstrained mode—such that in its first operational mode, the constraining mechanism constrains the second end of the force generator and the thigh link to have a only rotational motion relative to each other, and in its unconstrained operational mode, the constraining mechanism allows the second end of the force generator to have other motions relative to the thigh link in addition to rotational motion. In operation, the system is configured such that at least one of the constraining mechanisms moves to its constrained mode when the wearer has flexed at least one of her/his knees.

In other embodiments, the system is configured such that, when in operation, at least one of the constraining mechanisms moves to a constrained mode when: (a) the wearer is squatting: and/or (b) at least one of the wearer's hips has been lowered relative to an ankle.

In additional embodiments, each force generator is selected from a set consisting of a gas spring, compression spring, coil spring, leaf spring, air spring, tensile spring, torsion spring, clock spring and combinations thereof. In some embodiments, the force generator may provide extension assistance, after providing flexion resistance.

In further embodiments, the system comprises at least one signal processor, which, when in operation, is configured to receive at least one signal from at least one exoskeleton leg, and is configured to command at least one of the constraining mechanisms to enter its constrained mode when the wearer has flexed (or is flexing) at least one of her or his knees. In yet further embodiments, at least one such signal received by the signal processor is selected from a set of signals representing kinematics of the shank link and/or kinematics of the thigh link.

In yet further embodiments, two exoskeleton legs comprise at least one signal processor, which, when in operation, commands at least one of the constraining mechanisms to enter its constrained mode when the signal processor has determined (a) that the wearer's hip height is below a nominal squat threshold (b) that the wearer hip height is decreasing, or (c) that the wearer's hip height has decreased to below a nominal squat threshold and the wearer hip height is decreasing.

Also disclosed herein are apparatus configured to be coupled to a wearer. The apparatus comprise a first exoskeleton leg comprise a thigh link, a shank link, a knee joint coupled to the thigh link and the shank link, and configured to allow flexion and extension motion between the thigh link and the shank link, and a force generator comprising a first end and a second end, where the first end is coupled to the shank link, and where the second end is coupled to the thigh link. Apparatus further include a constraining mechanism coupled to the thigh link, where the constraining mechanism is configured to have at least two operation modes, a constrained mode and an unconstrained mode, and a first signal processor configured to move the constraining mechanism between its at least two operation modes, where, when in the constrained mode, the constraining mechanism is configured to limit the second end of the force generator to a rotational motion relative to the thigh link, and is configured to provide support to the wearer when the knee of the wearer is flexing, and where, when in the unconstrained mode, the constraining mechanism is configured to allow additional motion of the second end of the force generator relative to the thigh link in addition to the rotational motion, and is configured to provide no support to the wearer when the knee of the wearer is flexing.

In some embodiments, the apparatus further comprise at least one leg sensor configured to produce at least one leg signal representing kinematics of a leg of the wearer, where the first signal processor is further configured to receive and use the at least one leg signal to command the constraining mechanism to change its operation mode. According to various embodiments, the apparatus further comprise a second exoskeleton leg, where the first signal processor of the first exoskeleton leg is configured to communicate, using a communication signal, the at least one leg signal with a second signal processor of the second exoskeleton leg. In some embodiments, the at least one leg sensor comprises at least one shank sensor configured to produce at least one shank signal representing the kinematics of the shank link or the kinematics of the shank of the wearer. In some embodiments, where the at least one leg sensor comprises at least one thigh sensor configured to produce at least one thigh signal representing the kinematics of the thigh link or the kinematics of the thigh of the wearer.

In various embodiments, the first signal processor is configured to have a first operation mode and a second operation mode, where in first operation mode, the first signal processor is configured to command the constraining mechanism into its unconstrained mode, and where in second operation mode, the first signal processor is configured to command the constraining mechanism into its constrained mode. In various embodiments, the first signal processor is configured to transition to the first operation mode when a hip height has decreased below a nominal squat threshold. In various embodiments, the nominal squat threshold is determined based on a difference in thigh angles of a thigh of the wearer and a contralateral thigh. In some embodiments, the first signal processor is configured to transition to the first operation mode when the hip height of the wearer is decreasing. According to some embodiments, the first signal processor is configured to transition to the second operation mode when the hip height of the wearer is greater than nominal rise threshold.

In some embodiments, the apparatus may further include an ankle exoskeleton, where the ankle exoskeleton comprises a foot connector rotatably coupled to the shank link, wherein the foot connector is configured to connect to a shoe of the wearer. In some embodiments, the foot connector is configured to extend into a heel of the shoe of the wearer. According to some embodiments, the foot connector is coupled outside a heel of the shoe of the wearer. In various embodiments, the foot connector comprises a heel cuff, wherein the heel cuff wraps around the heel of the shoe. In some embodiments, the foot connector comprises an overshoe strap and an under-shoe catch. According to some embodiments, the foot connector is rotatably coupled to the shank link using at least an ankle rotation joint configured to provide rotation of the foot connector relative to the shank link. In various embodiments, the foot connector is rotatably coupled to the shank link using at least an ankle plantar joint configured to provide ankle dorsiflexion and plantar flexion of the foot connector relative to the shank link. In some embodiments, the foot connector is rotatably coupled to the shank link using a combination ankle rotation joint configured to provide rotation of the foot connector relative to the shank link along a combination ankle rotation axis.

According to some embodiments, the apparatus further comprise a human machine interface, wherein the human machine interface comprises a butt pad configured to couple knee flexion of the wearer with knee flexion of at least one exoskeleton leg. In various embodiments, the apparatus further comprise a waist belt and at least a thigh clip. In some embodiments, the thigh link and the thigh clip are coupled, and the thigh link is configured to move in unison with the thigh of the wearer. According to some embodiments, the thigh link and the thigh clip are coupled, and are configured to be detachable. In various embodiments, where the thigh link and the thigh clip are coupled using a holding bracket and a button assembly, and where the holding bracket is coupled to the thigh clip, the holding bracket comprising an upper cavity and a lower, and where the button assembly is coupled to the thigh link, the button assembly comprising a button neck and a button head, where the upper cavity is configured to allow insertion and removal of the button neck in a designated orientation, and the button head is configured to be able to rotate freely in the lower cavity. In some embodiments, the apparatus further comprise at least one shoulder strap. According to some embodiments, the apparatus further comprise at least one shin strap configured to be coupled to the shank of the wearer.

Apparatus may also comprise at least one exoskeleton leg comprising a thigh link, a shank link, and a knee joint coupled to the thigh link and the shank link, the knee joint being configured to allow flexion and extension motion between the thigh link and the shank link, where the at least one exoskeleton leg is configured to prevent knee flexion of a wearer at at least one angular position. Apparatus may further comprise a locking block that is linearly constrained to move along thigh link. In some embodiments, the locking block comprises a locking face, where the shank link comprises at least one tooth, where the shank link is rotatable relative to the thigh link, where when the at least one tooth of the shank link interfaces with the locking face, the shank link is prevented from continuing motion in a flexion direction relative to the thigh link, and where the shank link is allowed to continue motion in an extension direction relative to the thigh link. In various embodiments, the constraining mechanism of the first exoskeleton leg is configured to transition to the constrained mode when the wearer is squatting. In some embodiments, the constraining mechanism of the first exoskeleton leg is configured to transition to the unconstrained mode when the wearer initiates walking.

BRIEF DESCRIPTION OF DRAWINGS

FIG. 23 depicts the constraining mechanism in its unconstrained operational mode.

DESCRIPTION OF EMBODIMENTS

Figure 23:
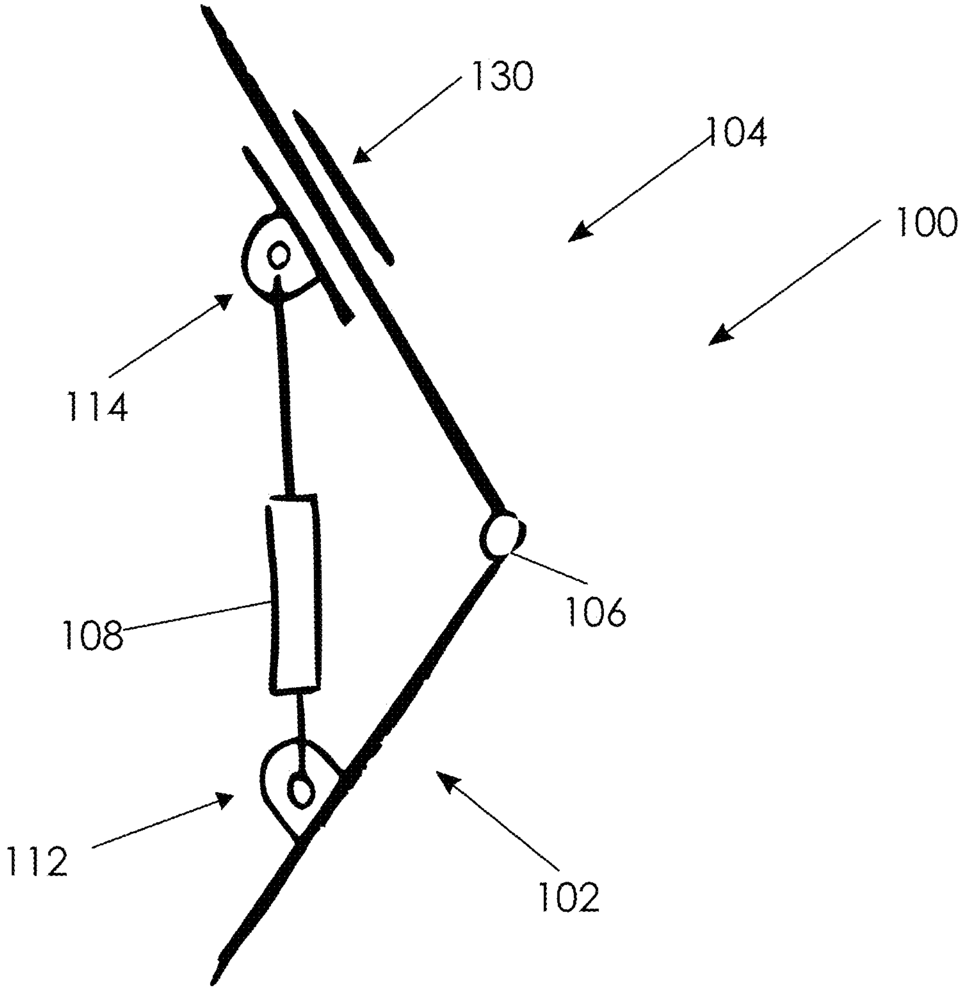
FIG. 23 shows a graphical representation of how the constraining mechanism of the embodiment of FIG. 9 includes at least two operational modes.
Figure 24:
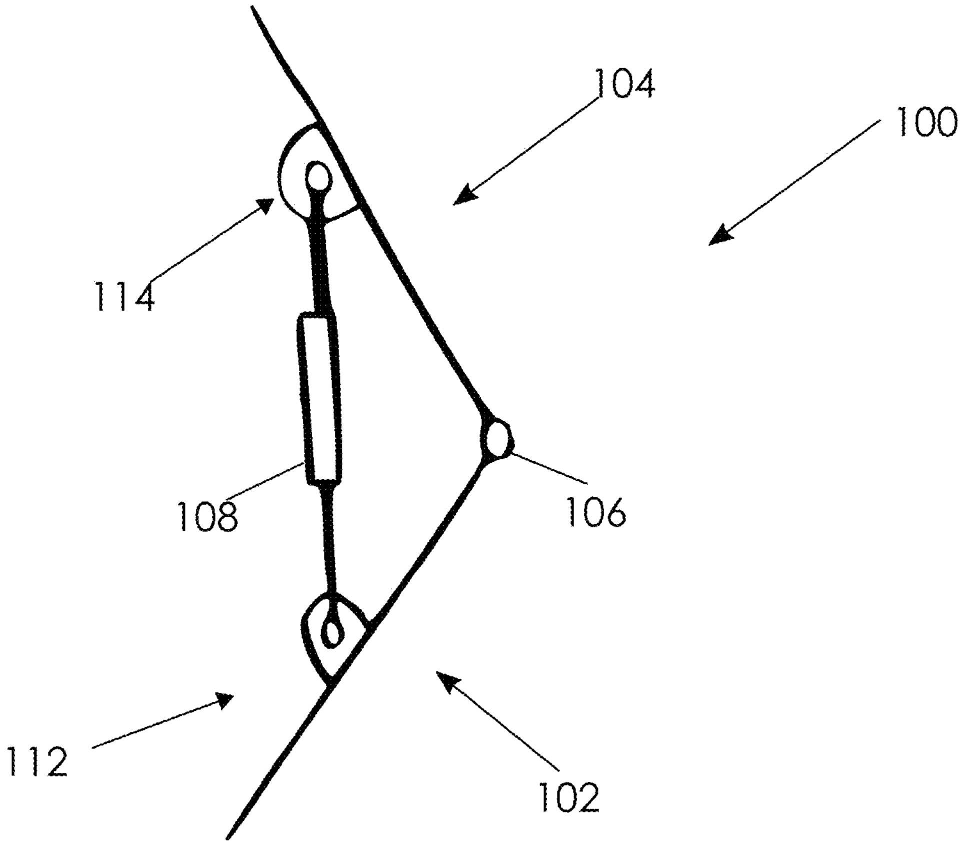
FIG. 24 shows a graphical representation of the constraining mechanism in its constrained operational mode.

FIGS. 23 and 24 show a graphical representation of apparatus disclosed herein. In some embodiments, exoskeleton leg 100 comprises at least two segments 102 and 104, coupled to each other in a manner that allows segments 102 and 104 to rotate about joint 106 and flex and extend with respect to one another.

In various embodiments, segments 102 and 104 are referred to as thigh link 104 and shank link 102, and flexion and extension between them occurs at a knee joint 106. However, it will be appreciated that this reference is meant to provide clarity in the descriptions of some embodiments and is not intended to be limiting. Other examples of segments are but not limited to the human torso or foot and are also within the scope, where the joint of rotation can be a hip joint or an ankle joint. In some embodiments, the segments could be the torso and the arm.

FIG. 23 and FIG. 24 illustrate how a constraining mechanism 130 of the embodiment of FIG. 9 comprises discussed in greater detail below at least two modes. FIG. 23 depicts constraining mechanism 130 in unconstrained mode 139. FIG. 24 depicts constraining mechanism 130 in constrained mode 138. FIGS. 23 and 24 show schematic representations of one embodiment of exoskeleton leg 100. Technical effects of constrained mode 138 and unconstrained mode 139 of the present embodiments is described below.

In unconstrained mode 139, as shown in the embodiment of FIG. 23, constraining mechanism 130 includes a rotational coupling between second end 114 of force generator 108 and thigh link 104, and another degree of freedom (in this case, a sliding motion). This additional degree of freedom allows motion of the thigh link 104 relative to the shank link 102 occurs by sliding the force generator 108 about thigh link 104.

In contrast, in constrained mode 138, as shown in FIG. 24, constraining mechanism 130 only allows for rotational coupling of force generator 108 to thigh link 104 at its second end 114, which operates as a pivot point. In this operational mode of the embodiment, second end 114 of force generator 108 is rotatably coupled to thigh link 104 and does not slide along thigh link 104. In this embodiment of the constrained mode 138, motion of the thigh link 104 relative to the shank link 102 occurs by changing the length of force generator 108 which in turn resists the motion of the think link 104 relative to the shank link 102.

The difference between constrained mode 138 and unconstrained mode 139 is that force generator 108 in unconstrained mode 139 has little effect on flexion and extension of thigh link 104 and shank link 102 relative to each other. In contrast, force generator 108 in constrained mode 138 affects flexion and extension of thigh link 104 and shank link 102 relative to each other.

Thus, in some embodiments, there are two modes of operation: constrained mode 138 where force generator 108 does affect flexion and extension of thigh link 104 and shank link 102 relative to each other; and unconstrained mode 139 wherein force generator 108 does not affect flexion and extension of thigh link 104 and shank link 102 relative to each other. When constraining mechanism 130 is in constrained mode 138, force generator 108 may provide a force to support a wearer 200. While in unconstrained mode 139, force generator 108 provides minimal to no interference and wearer 200 is free to move without any interference from exoskeleton leg 100.

In some embodiments, force generator 108 provides a force to assist wearer 200 during knee extension 118.

As described herein, the embodiments achieve this through the implementation and configuration of constraining mechanism 130. It will be appreciated that many other methods of creating functionally equivalent modes of operation are possible and some are disclosed herein. The ones disclosed are not intended to be limiting.

Figure 2:
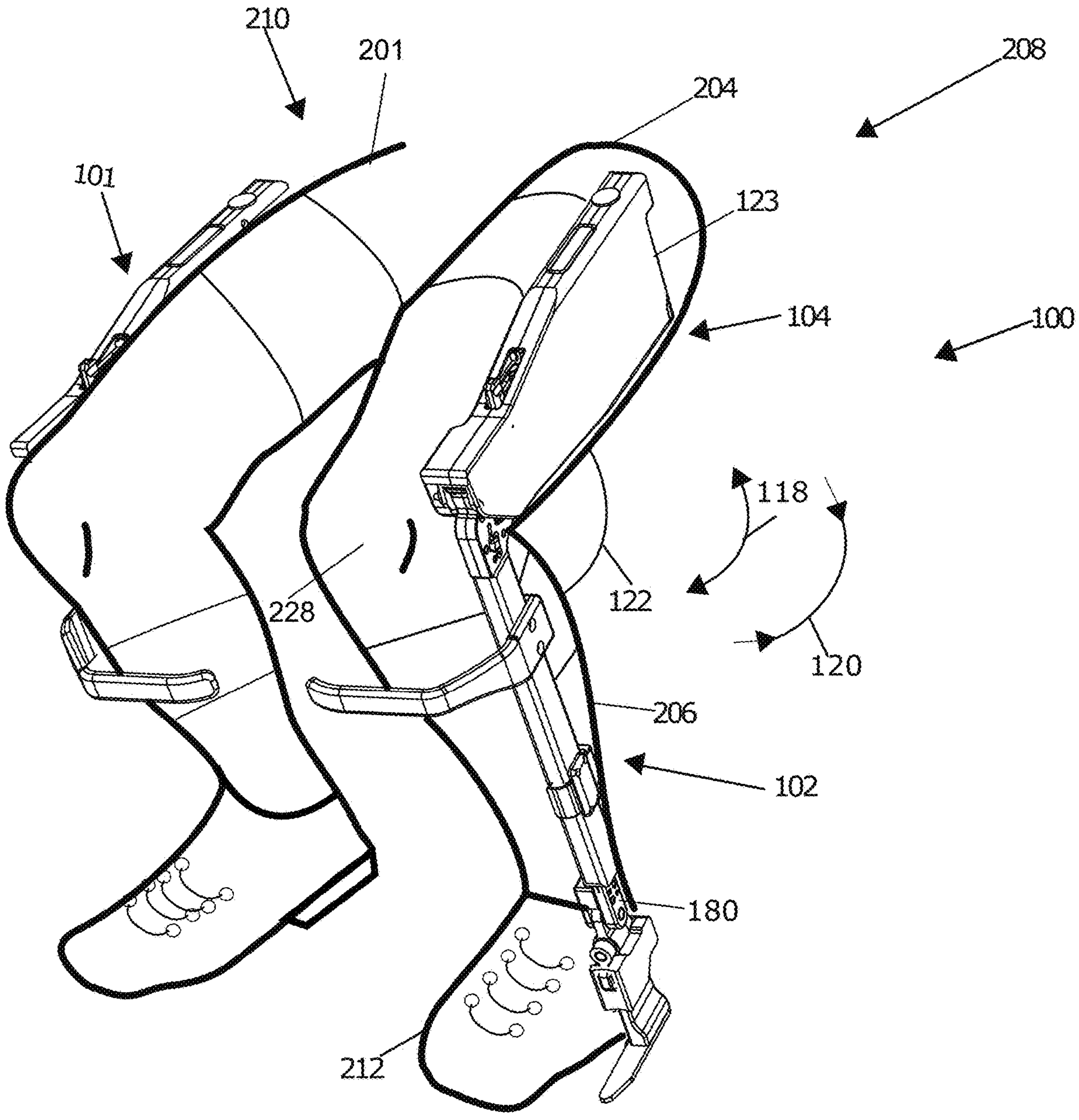
FIG. 2 shows an embodiment coupled to a human wearer's legs.
Figure 3:
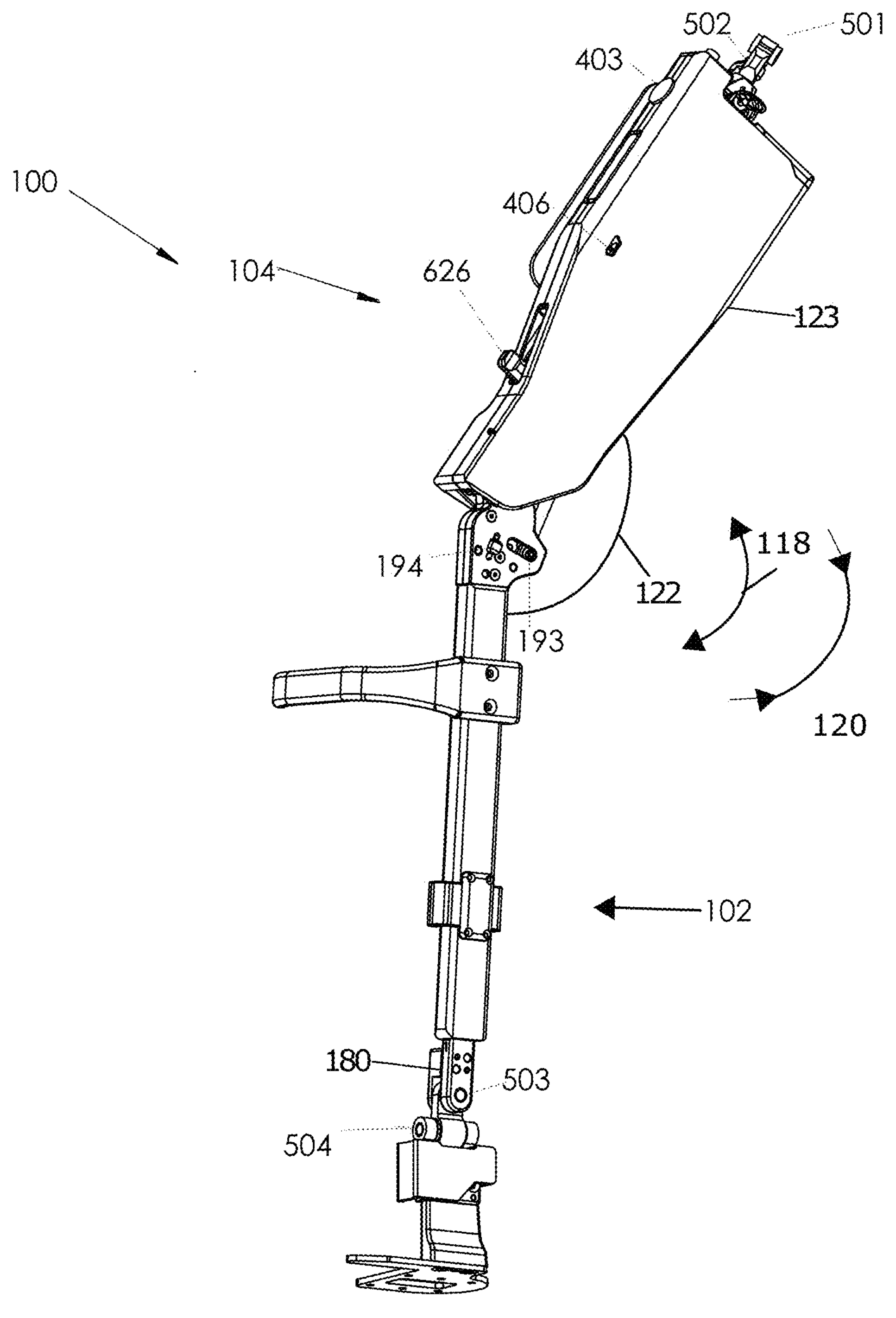
FIG. 3 shows one view of one embodiment of an exoskeleton leg when isolated from a two-legged embodiment and from the wearer.

In some embodiments, constraining mechanism 130 enters unconstrained mode 139 from constrained mode 138 when force generator 108 is unloaded. When force generator 108 is unloaded, first end 112 and second end 114 of force generator 108 produce a negligible to very small amount of force on thigh link 104 and shank link 102. In some embodiments of the disclosure, force generator 108 produces a reaction force as a result of contact or deformation. Force generator 108, in conjunction with other elements provides support to wearer 200. FIG. 3 is a schematic illustration of exoskeleton leg 100 without showing wearer's leg 208. FIG. 2 is a schematic illustration of exoskeleton leg 100 coupled to wearer's leg 208 and exoskeleton leg 101 coupled to wearer's contralateral leg 210, in accordance with some embodiments.

As shown in FIG. 2 and FIG. 3, knee motion in flexion direction (or knee flexion) 120 where knee angle 122 between thigh link 104 and shank link 102 is decreasing. Knee extension 118, on the other hand, is a motion where knee angle 122 between thigh link 104 and shank link 102 is increasing. As depicted in FIGS. 2 and 3, arrows 120 and 118 represent flexion and extension of knee angle 122, respectively.

Figure 4:
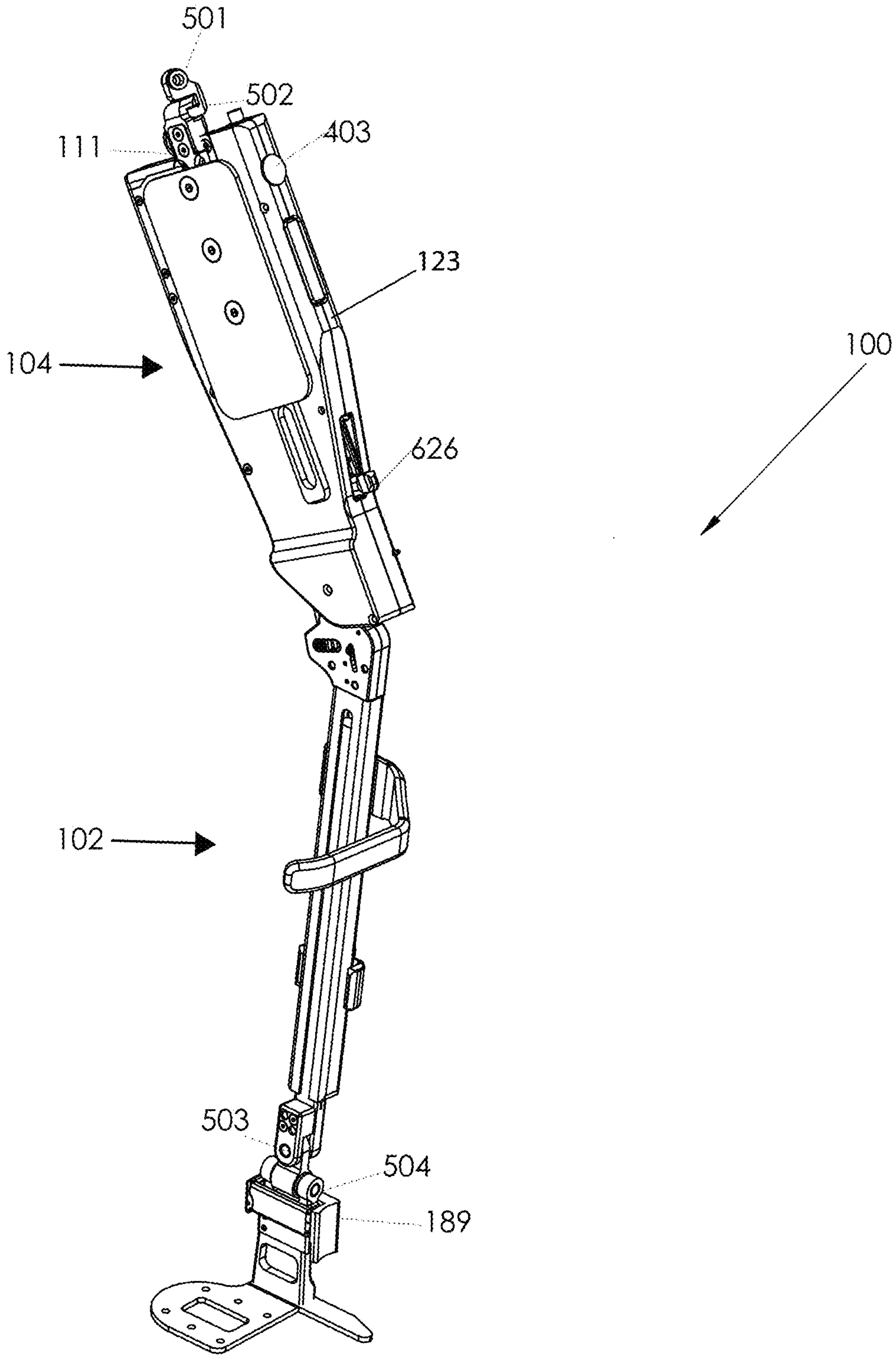
FIG. 4 shows another view of the embodiment of the exoskeleton leg shown in FIG. 3.
Figure 5:
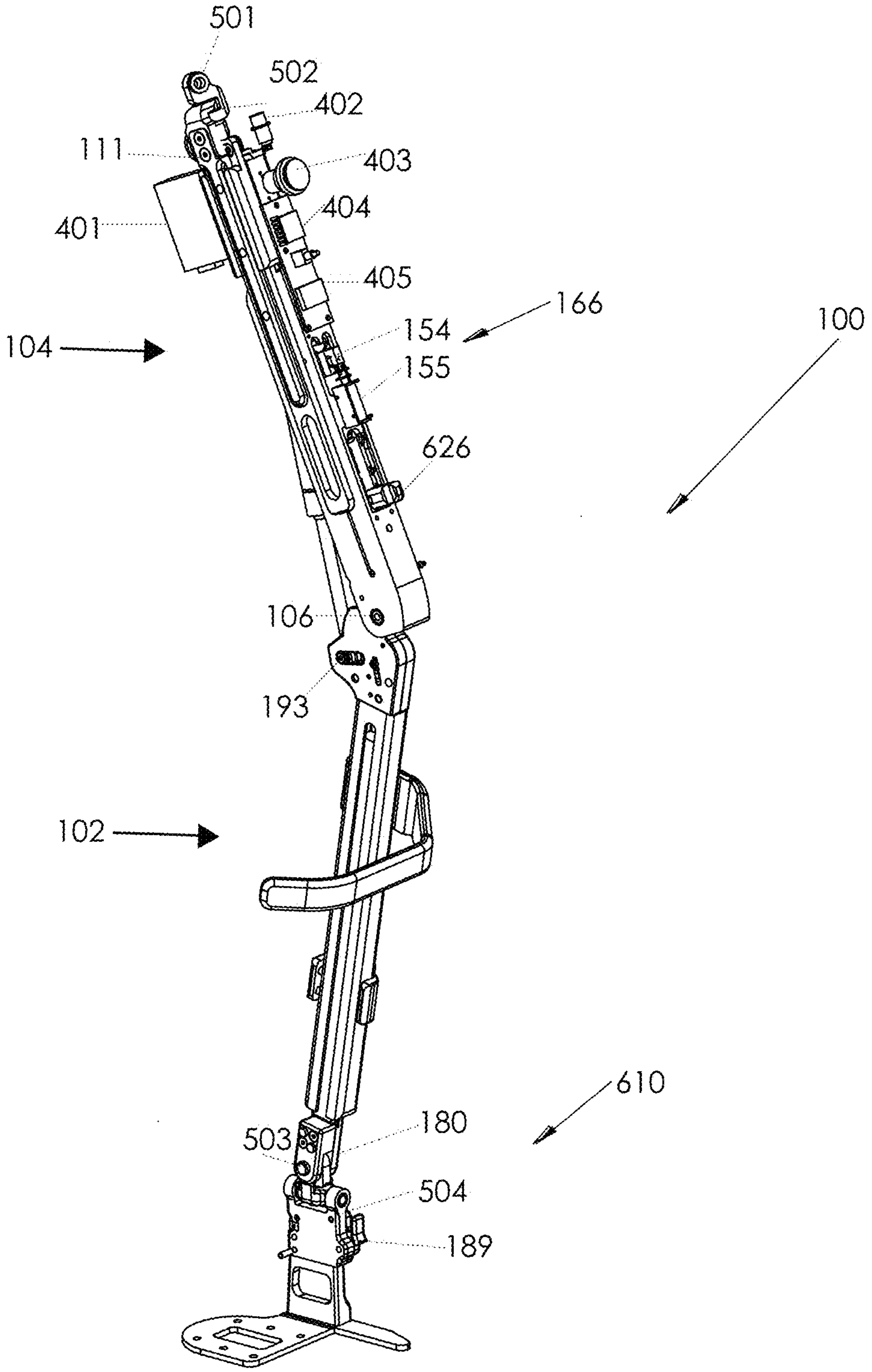
FIG. 5 shows the same embodiment of the isolated exoskeleton leg shown in FIGS. 3 and 4 when its cover 123 is removed to show details of the embodiment.

FIG. 4 shows another view of the embodiment of exoskeleton leg 100 shown in FIG. 3, isolated from wearer 200. Moreover, FIG. 5 shows the same embodiment of exoskeleton leg 100 isolated from wearer 200 as shown in FIGS. 3 and 4 when its cover 123 (as shown in those FIG. 3 and FIG. 4) is removed to show more detail of the embodiment. FIG. 5 shows exoskeleton leg 100 comprising a thigh link 104 and a shank link 102, coupled about a knee joint 106, and configured to allow flexion 120 and extension 118 between thigh link 104 and shank link 102. This embodiment comprises a constraining mechanism 130 (an embodiment of which is shown in FIG. 9 and FIG. 10), capable of switching between at least two operational modes: constrained mode 138 where exoskeleton leg 100 resists knee flexion 120 of thigh link 104 and shank link 102, and unconstrained mode 139 where exoskeleton leg 100 allows unrestricted motion or substantially free motion between thigh link 104 and shank link 102.

FIG. 5 further shows ankle exoskeleton 610 and its components and several electronic components such as battery 401, wired connector 402, on switch 403 and other elements further described below. In some embodiments, exoskeleton legs 100 and 101 further comprise at least one signal processor 404. In such embodiments, signal processor 404 is used in conjunction with other elements further described below to operate between constrained mode 138 and unconstrained mode 139 of constraining mechanism 130. Signal processor 404 can be an electronic controller, micro-controller, microprocessor, amplifier. Accordingly, in various embodiments, signal processor 404 is configured to include components, such as one or more processors, controllers and amplifiers. In some embodiments, signal processor 404 is an electronic controller. Some commercial examples of signal processor 404 are mbed microcontroller, arduino microcontroller and elmo controllers.

In some embodiments, constraining mechanism 130 mode is controlled by signal processor 404. In some embodiments, signal processor 404 commands constraining mechanism 130 to move between its operating modes.

In some embodiments of the disclosure, signal processor 404 has at least two modes: a first operation mode 331 and a second operation mode 332. In some embodiments, first operation mode 331 of signal processor 404 corresponds to constrained mode 138 of constraining mechanism 130, and second operation mode 332 of signal processor 404 corresponds to unconstrained mode 139 of constraining mechanism 130. FIGS. 9 and 10 show an embodiment of unconstrained mode 139 and constrained mode 138 discussed in more detail below.

In some embodiments, where signal processor 404 transitions to second operation mode 332, to command constraining mechanism 130 to move into unconstrained mode 139, constraining mechanism 130 may transition to unconstrained mode 139 immediately, or may transition to unconstrained mode 139 after force generator 108 has stopped providing a resistive force to flexion 120 between thigh link 104 and shank link 102. This immediate or delayed transition into unconstrained mode 139 of constraining mechanism 130 depends on one or more aspects or features of constraining mechanism 130.

It will be appreciated that exoskeleton legs 100 may be used in other coupling configurations with a wearer 200, other than leg couplings as described herein, in order to assist wearer 200 with a variety of physical maneuvers other than those expressly described herein.

Figure 25:
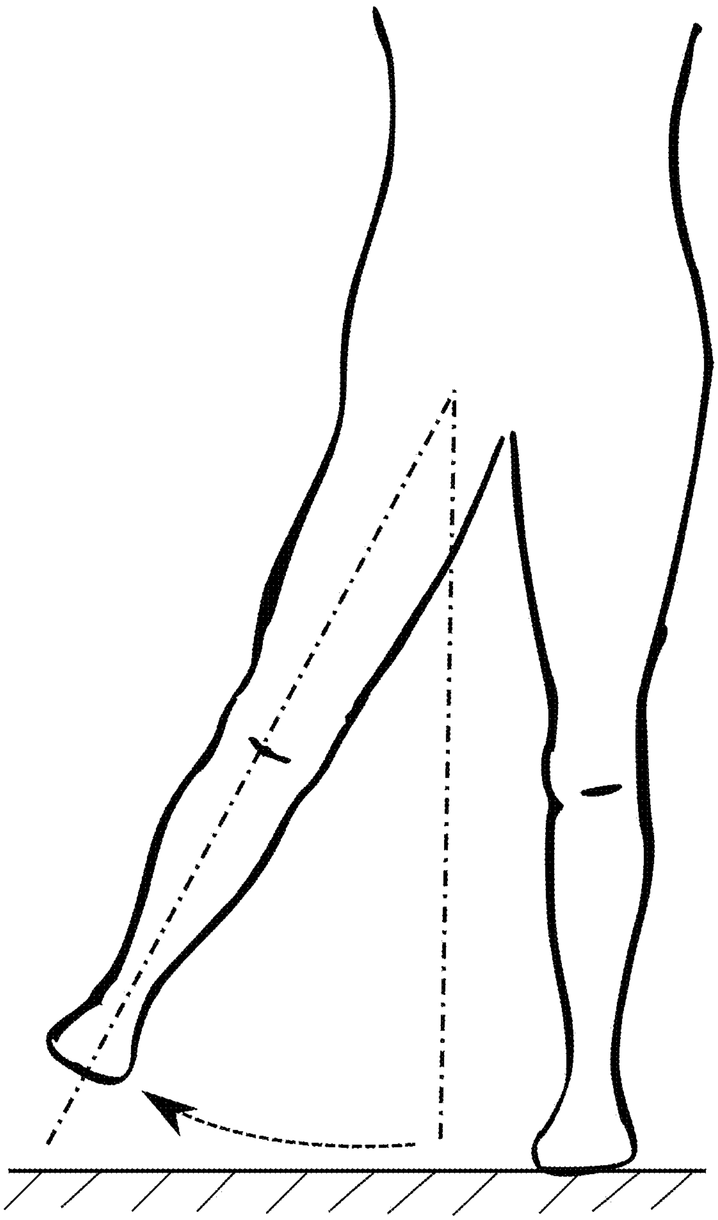
FIG. 25 shows hip abduction in an intended wearer.
Figure 26:
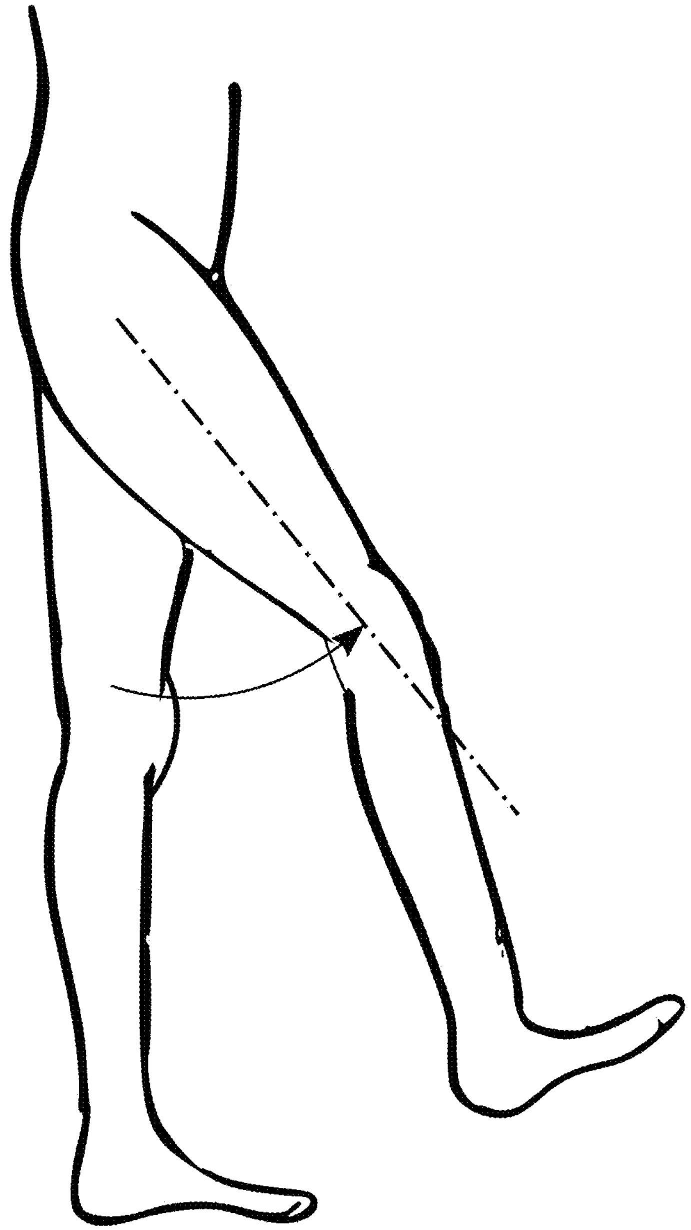
FIG. 26 shows hip flexion in an intended wearer.
Figure 27:
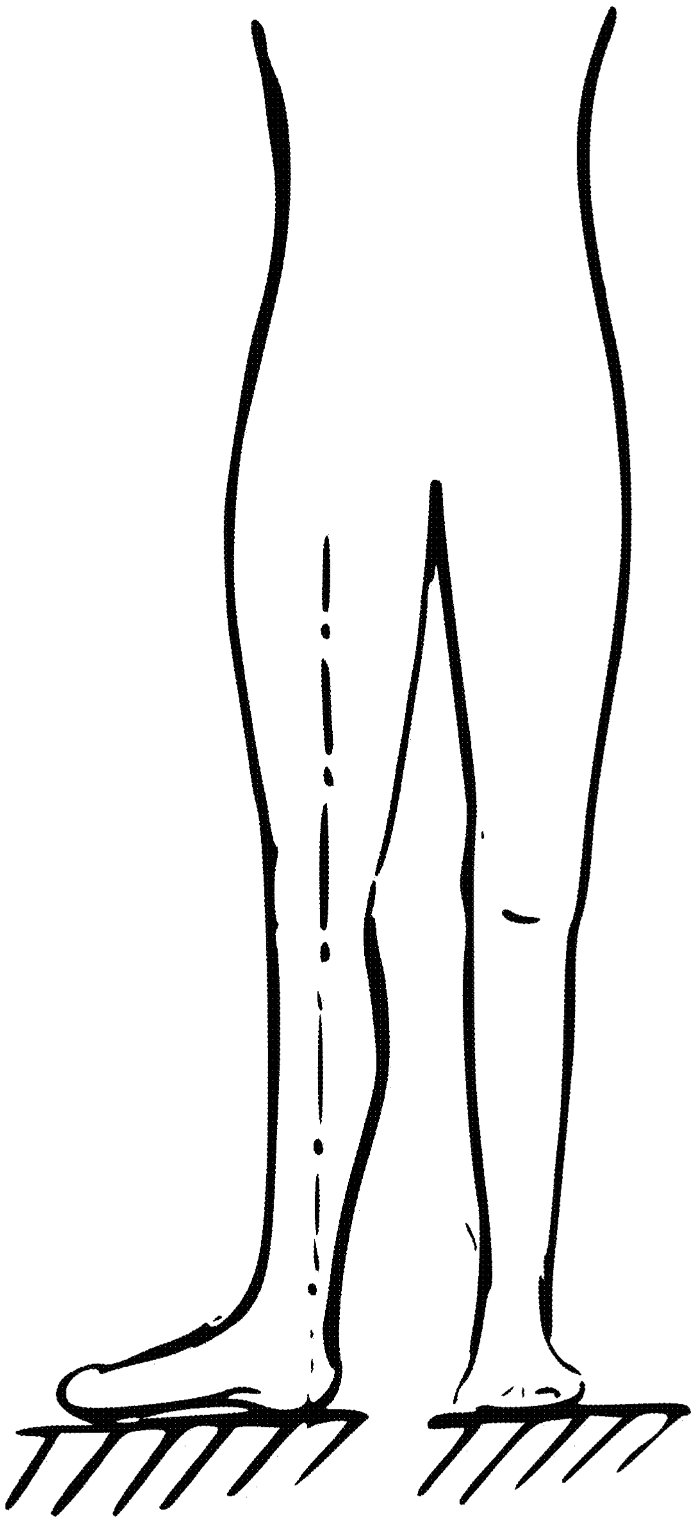
FIG. 27 shows hip rotation in an intended wearer.
Figure 28:
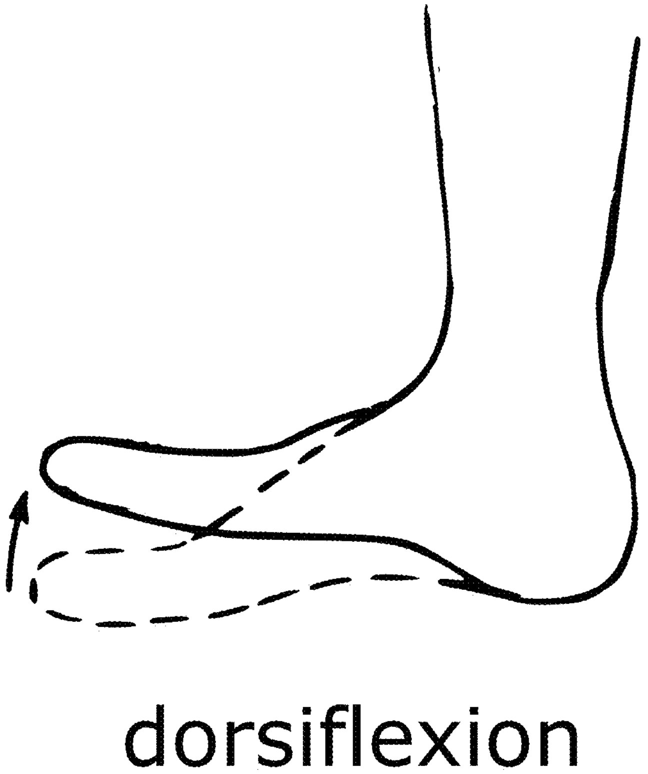
FIG. 28 shows ankle dorsiflexion in an intended wearer.
Figure 29:
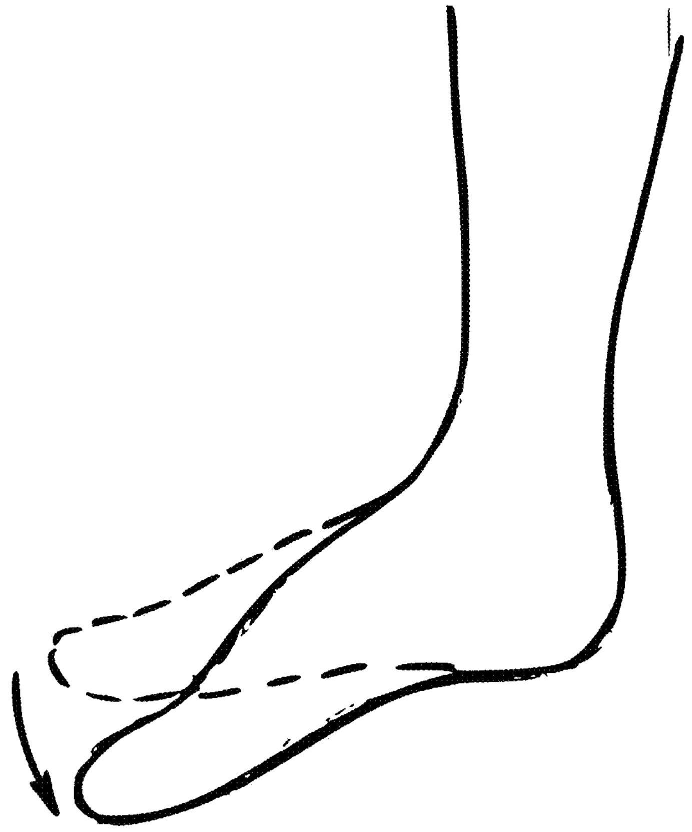
FIG. 29 shows ankle plantar flexion in an intended wearer.

To clarify some of the terms used herein, the following figures have been included for general illustration purposes: FIG. 25 shows hip abduction in an intended wearer 200; FIG. 26 shows hip flexion in an intended wearer; FIG. 27 shows hip rotation in an intended wearer; FIG. 28 shows ankle dorsiflexion in an intended wearer; and FIG. 29 shows ankle plantar flexion in an intended wearer.

In one embodiment, force generator 108 is selected from a set comprising of a gas spring, a compression spring, a coil spring, a leaf spring, an air spring, a tensile spring, a torsion spring, clock spring and any combination thereof. In the embodiment depicted in FIGS. 6-14, force generator 108 takes the form of a compression gas spring.

In some embodiments of the disclosure, force generator 108 may be incompressible. This embodiment is capable of preventing flexion (as opposed to resisting flexion) thus completely supporting the weight of wearer 200.

Figure 6:
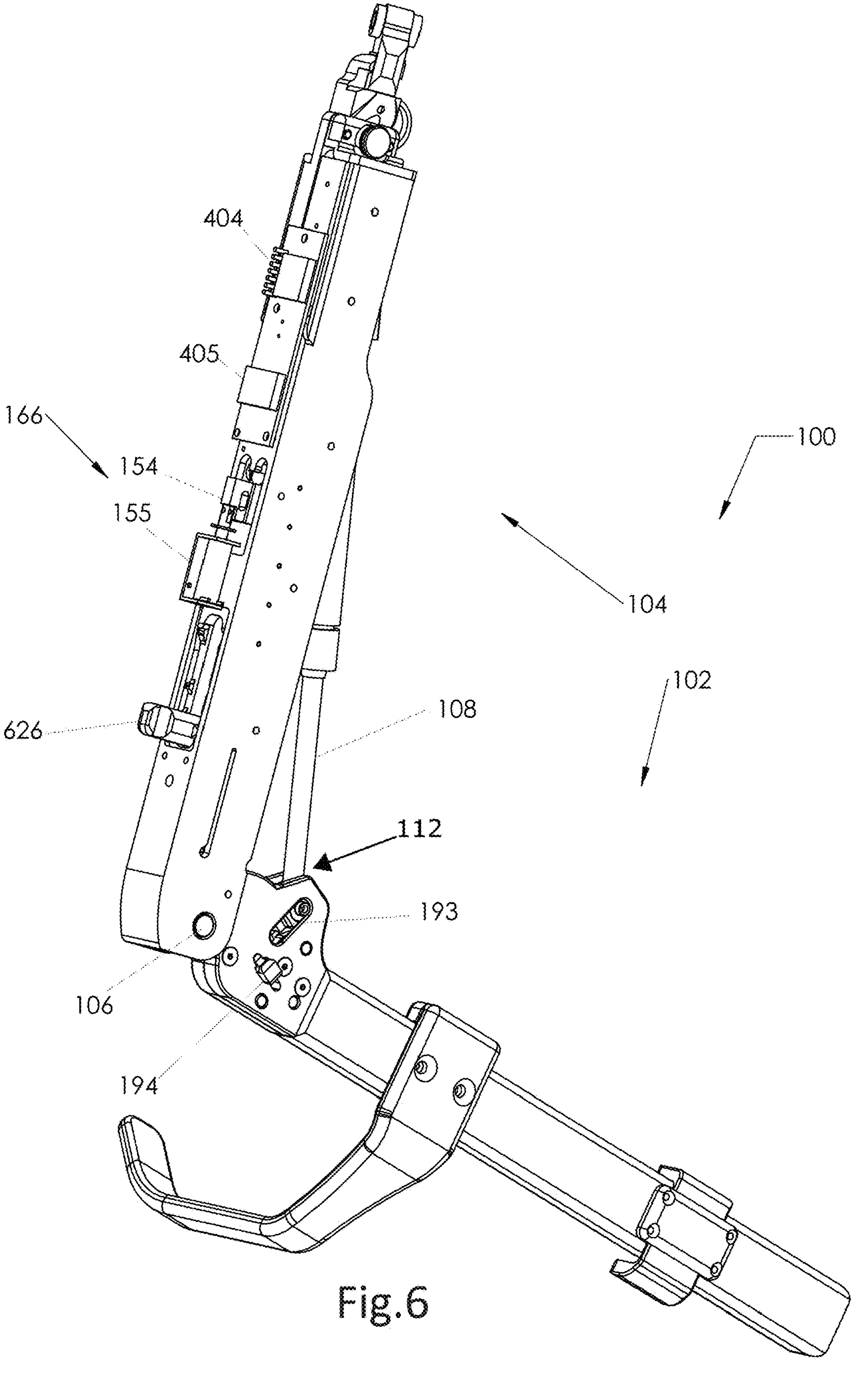
FIG. 6 shows a close-up and partial view of the embodiment shown in FIG. 5, including a thigh link, a shank link, a knee joint, a force generator, and associated components further described below.

FIG. 6 shows a close-up and partial view of the embodiment shown in FIG. 5, comprising a thigh link, a shank link, a knee joint, a force generator, and associated components further described below. More particularly, as shown in FIG. 6, exoskeleton leg 100 further comprises a force generator 108, having a first end 112 rotatably coupled to shank link 102. In operation, the role of force generator 108 is best described by FIGS. 23 and 24, discussed in detail above.

Figure 7:
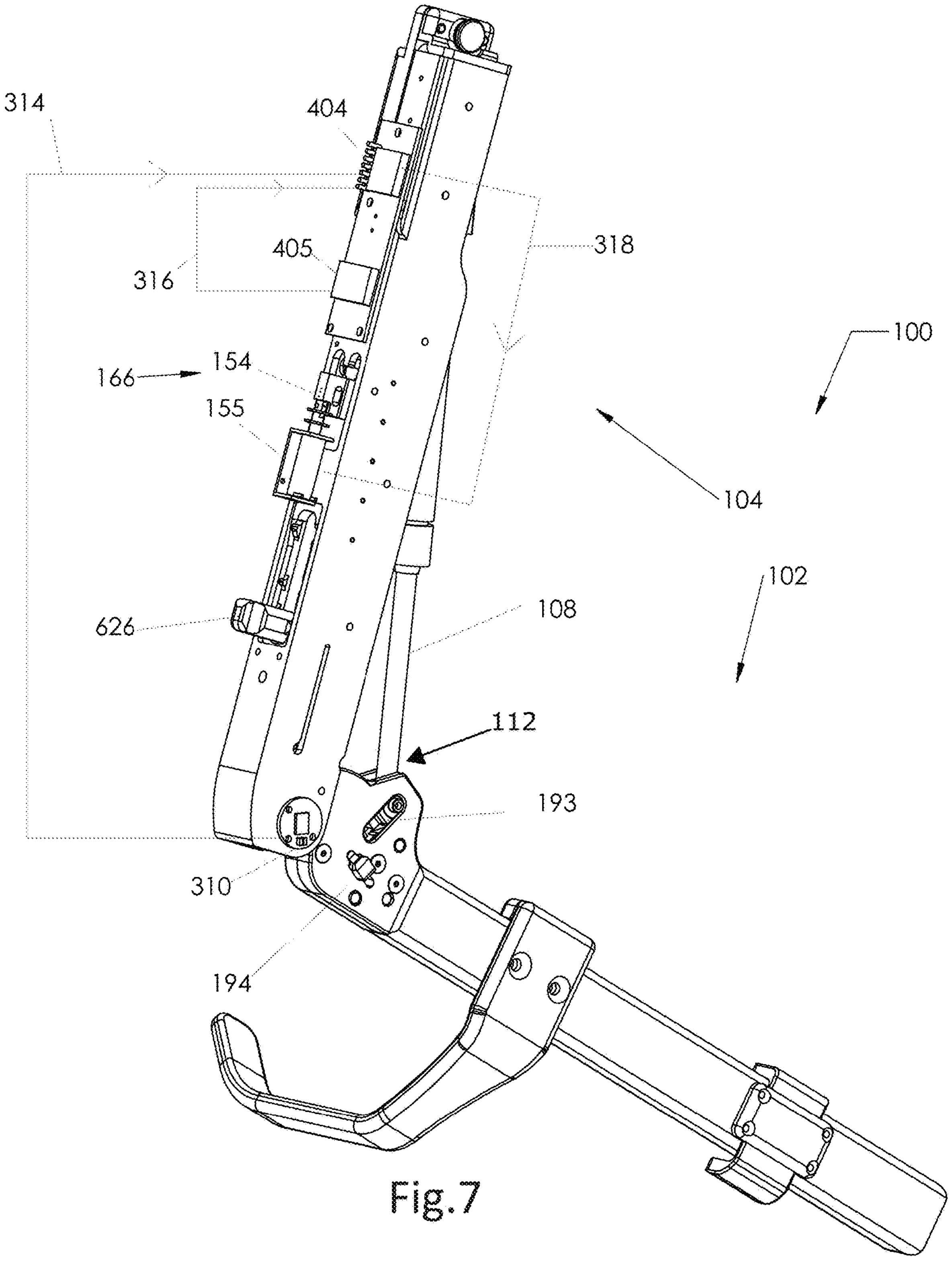
FIG. 7 shows a further annotated close-up view of the embodiment of FIG. 6.

FIG. 7 shows a further annotated close-up view of the embodiment of FIG. 6. As shown in FIG. 7, and in some embodiments, at least one signal is generated by one or more sensors, for example, a leg sensor. Examples of leg sensor are shank sensor 310 and/or thigh sensor 405, height sensor (not shown) and other sensors identifying the kinematics of wearer's leg 208.

In some embodiments, at least one leg sensor produces a leg signal representing the kinematics of wearer's leg 208. In some embodiments, shank sensor 310 and/or thigh sensor 405 provide at least one leg signal to signal processor 404. In embodiments where shank sensor 310 and/or thigh sensor 405 are the leg sensor, the leg signal may be a shank signal 314 and/or the thigh signal 316 In some embodiments, at least one leg sensor may be situated on exoskeleton leg 100. In some embodiments, at least one leg sensor may be situated externally to exoskeleton leg 100. Examples of this are vision systems viewing the wearer, lidar sensors etc.

In some embodiments, leg signal can represent the height of wearer's hips 216 relative to ground 218, the height of wearer's hips joint 216 to wearer's ankle 220, the velocity of wearer's leg 208, the velocity of wearer's hips joint 216, speed of wearer's leg 208, angle of leg segments, velocity or acceleration of leg segments.

In some embodiments, a combination of sensors may be used to create leg sensor producing at least one leg signal.

In some embodiments, shank sensor 310 and thigh sensor 405 each sense changes in angle. In other embodiments, shank sensor 310 measures the kinematics of shank link 102, and thigh sensor 405 measures the kinematics of thigh link 104. However, other sensors may be used to sense other parameters.

In various embodiments, shank signal 314 can be the absolute or relative angular position, absolute or relative position, velocity, or acceleration of shank link 102. In various embodiments, thigh signal 316 can be the absolute or relative angular position, absolute or relative position, velocity, or acceleration of thigh link 104. In some embodiments, shank signal 314 represents the kinematics of wearer's shank 206. In some embodiments, thigh signal 316 represents the kinematics of wearer's thigh 204.

In some embodiments, signal processor 404 receives at least one leg signal from at least one leg sensor, and uses the sensor information to command a change in the operation mode of the constraining mechanism 130 in an informed way.

As shown in FIG. 7, and in some embodiments, leg sensor are a shank sensor 310 and a thigh sensor 405. In some embodiments, shank sensor 310 produces a shank signal 314 representing an angle of shank link 102. In some embodiments, the angle of shank link 102 may represent an absolute angle of shank link 102 relative to gravity. In other embodiments, the angle of shank link 102 may represent a relative angle of shank link 102 with respect to thigh link 104.

As shown in FIG. 7, and in some embodiments, thigh sensor 405 produces a thigh signal 316 representing an angle of thigh link 104. In some embodiments, an angle of thigh link 104 may represent an absolute angle of thigh link 104 relative to gravity. In other embodiments, an angle of thigh link 104 may represent a relative angle of thigh link 104 relative to shank link 102.

In some embodiments, shank signal 314 and thigh signal 316 produced by shank sensor 310 and thigh sensor 405, respectively, yield information about the activity of wearer 200 to signal processor 404, which allows signal processor 404, in conjunction with other elements further described below, to control the operational mode of constraining mechanism 130 in an informed manner. In some embodiments, only a shank sensor 310 is used. In other embodiments, only a thigh sensor 405 is used. In still other embodiments, both a shank sensor 310 and a thigh sensor 405 may be used. FIG. 7 shows an embodiment of exoskeleton leg 100 wherein signal processor 404 receives a thigh signal 316 from thigh sensor 405 and receives shank signal 314 from shank sensor 310. In this embodiment, thigh sensor 405 is an inertial measurement sensor, and shank sensor 310 is an encoder. In operation, signal processor 404 uses thigh signal 316 and shank signal 314 to create an actuation signal 318, which in turn is used to command constraining mechanism 130 to change its operation mode.

Figure 1:
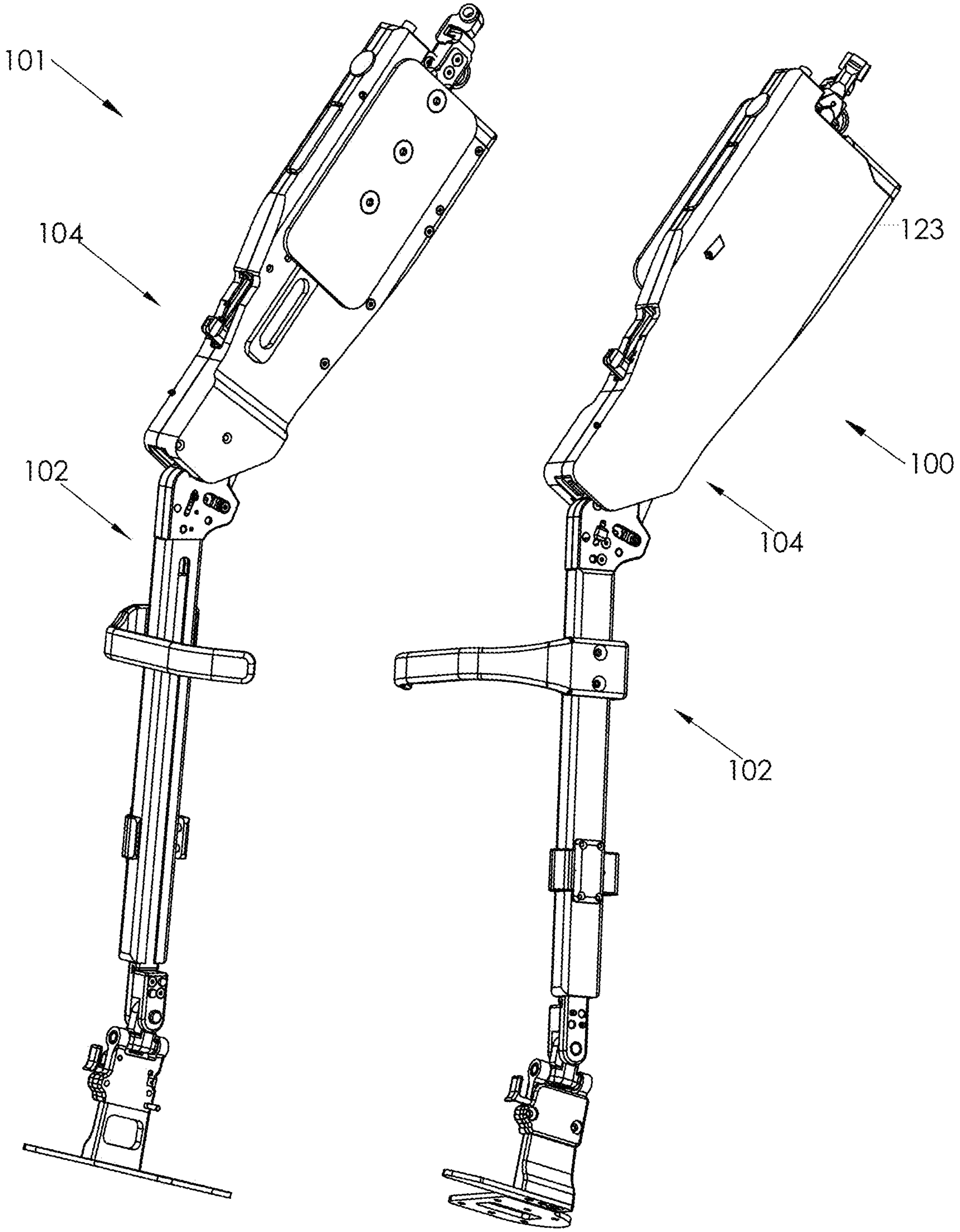
FIG. 1 shows an embodiment including two exoskeleton legs configured to be worn by a wearer.

FIG. 1 is a schematic illustration of two exoskeleton legs 100 and 101 configured to be worn by a wearer 200, in accordance with some embodiments. As shown in FIG. 1, exoskeleton legs 100 and 101 may have substantially identical mechanical features, but are mirrored. Therefore, the mechanical features of exoskeleton legs 100 and 101 are described in detail with respect to exoskeleton leg 100. It will be appreciated that all described features may be utilized by exoskeleton legs 101.

In other embodiments, constraining mechanism 130 of one or both exoskeleton legs may be coupled to shank link 102 instead of thigh link 104.

When using the information from two of the wearer's legs to initiate support, at least three scenarios, as described in greater detail below, are possible. The description of the below scenarios is not intended to be limiting and other scenarios of the signal processor acquiring data is possible.

In some embodiments, a signal processor 404 of exoskeleton leg 100 is configured to receive at least a leg signal from a leg sensor, and a contralateral leg signal (not shown) from contralateral leg sensor from exoskeleton leg 100 and exoskeleton 101 directly. In such embodiments, signal processor 404, is configured to command a change of operating mode of both constraining mechanism 130 and contralateral constraining mechanism (not shown).

In some embodiments, wearer's contralateral leg is not coupled to an exoskeleton leg 101 but comprises at least one signal processor and at least a leg sensor. In some embodiments, a signal processor 404 of exoskeleton leg 100 is configured to receive at least a contralateral leg signal from a second signal processor on the contralateral leg which is not on a second exoskeleton.

In some embodiments, signal processor 404 of exoskeleton leg 100 sends and receives information from a contralateral signal processor 424 of exoskeleton leg 101 on wearer's contralateral leg 210 using a communication signal 330. Signal processor 404 and contralateral signal processor 424 share at least one leg signal using communication signal, and may use this signal to command a change of operating mode of the constraining mechanism of exoskeleton leg 100 and exoskeleton leg 101.

Figure 8:
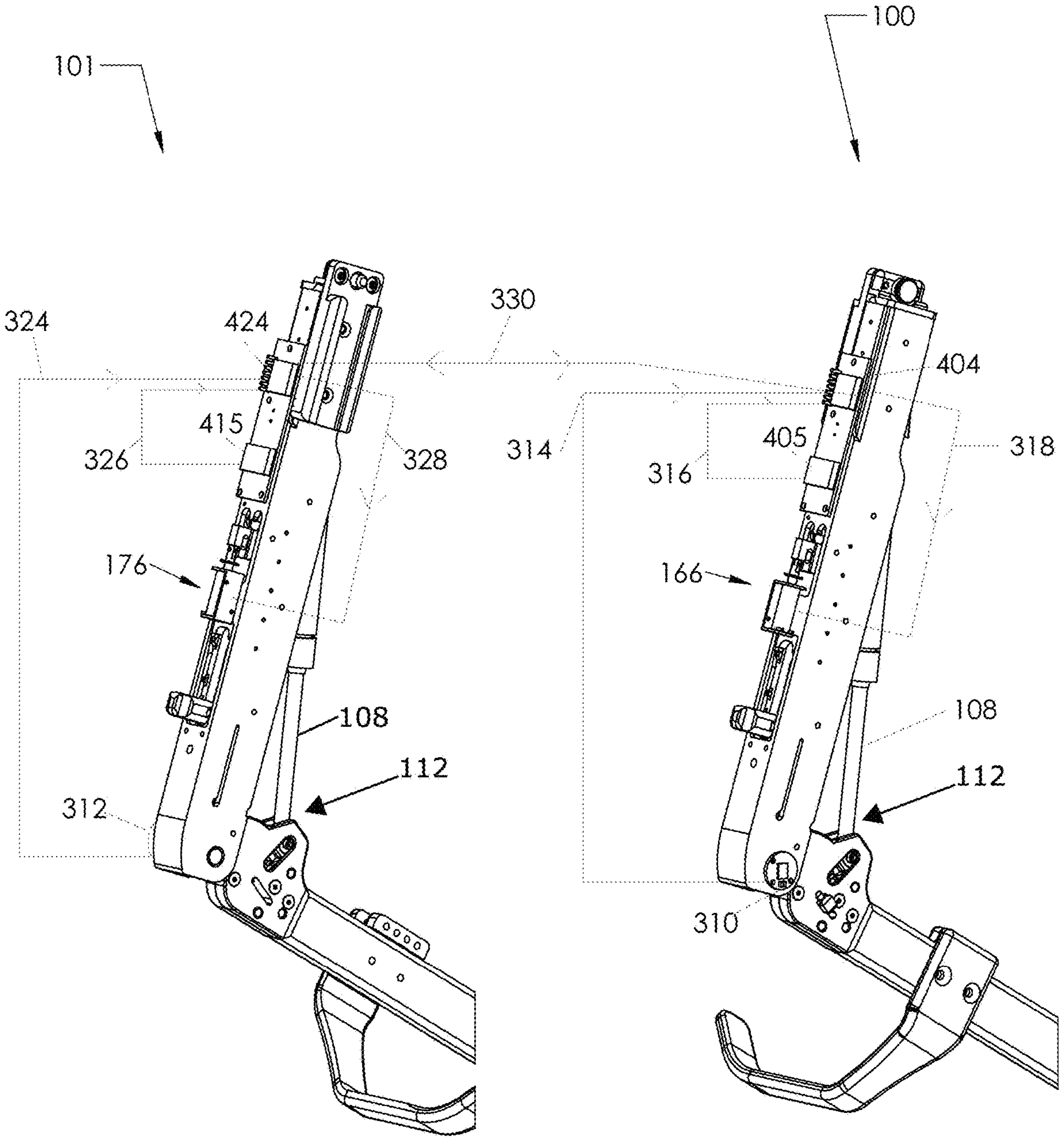
FIG. 8 shows an embodiment wherein both exoskeleton legs include a signal processor coupled to the thigh links.

FIG. 8 shows an embodiment wherein exoskeleton leg 100 and exoskeleton leg 101 comprise a signal processor 404 and contralateral signal processor 424, respectively, coupled to thigh link 104. In this embodiment shown in FIG. 8, signal processor 404 in conjunction with other elements further described below control the modes of constraining mechanism 130. Referring to FIGS. 7 and 8, shank sensor 310 of some embodiments may be a single sensor or a combination of sensors used to obtain an angle of shank link 102 or wearer's shank 206 (see FIG. 2) with respect to either gravity or the thigh link. These combinations of sensors can be placed, for example and without limitation, on shank link 102, thigh link 104, wearer's hip joint 216 (shown in FIG. 19), wearer's torso 207 (not shown), wearer's thigh, wearer's shank, ankle first link 180 (shown in FIG. 3), or on any joint between exoskeleton leg links.

In some embodiments, thigh angle sensor 405 may be a single sensor or a combination of sensors used to obtain an angle of thigh link 104 or a wearer's thigh 204 (see FIG. 2). These combinations of sensors can be placed on a shank link 102, a thigh link 104, a wearer's hip joint 216, wearer's thigh, wearer's shank, an ankle first link 180, or on any joint between exoskeleton links. Any of these combinations of sensor placements may be used to yield information to signal processor 404 to control, in junction with other elements described below, the operational mode of constraining mechanism 130 in an informed manner.

In some embodiments, shank signal 314 or thigh signal 316 are generated using at least one sensor in a family of sensors, including but not limited to, an accelerometer, a gyroscope, a magnetometer, an inertial measurement unit, an encoder, and a potentiometer, or any combination thereof. In some embodiments, shank signal 314 and thigh signal 316 may include information from a stance sensor (not shown).

FIG. 8 shows an embodiment where both exoskeleton leg 100 and exoskeleton leg 101 have a signal processor 404 and contralateral signal processor 424, respectively. Signal processor 404 receives shank signal 314 and thigh signal 316 from shank sensor 310 and thigh angle sensor 405 respectively. Contralateral signal processor 424 receives contralateral shank signal 324 and contralateral thigh signal 326 from contralateral shank sensor 312 and contralateral thigh sensor 415.

Figure 9:
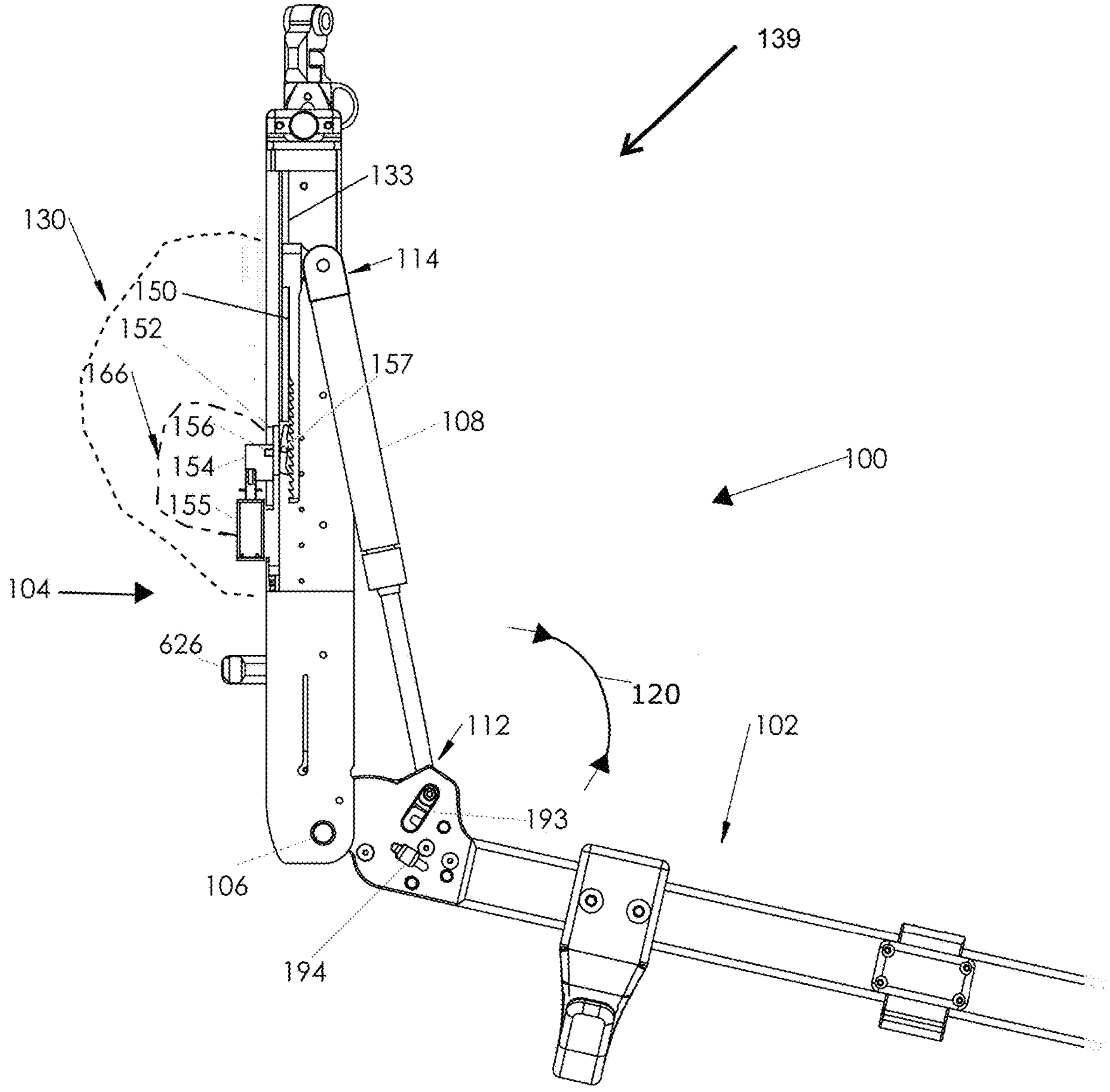
FIG. 9 an embodiment of an exoskeleton leg, including a constraining mechanism coupled to the thigh link in its unconstrained state.
Figure 10:
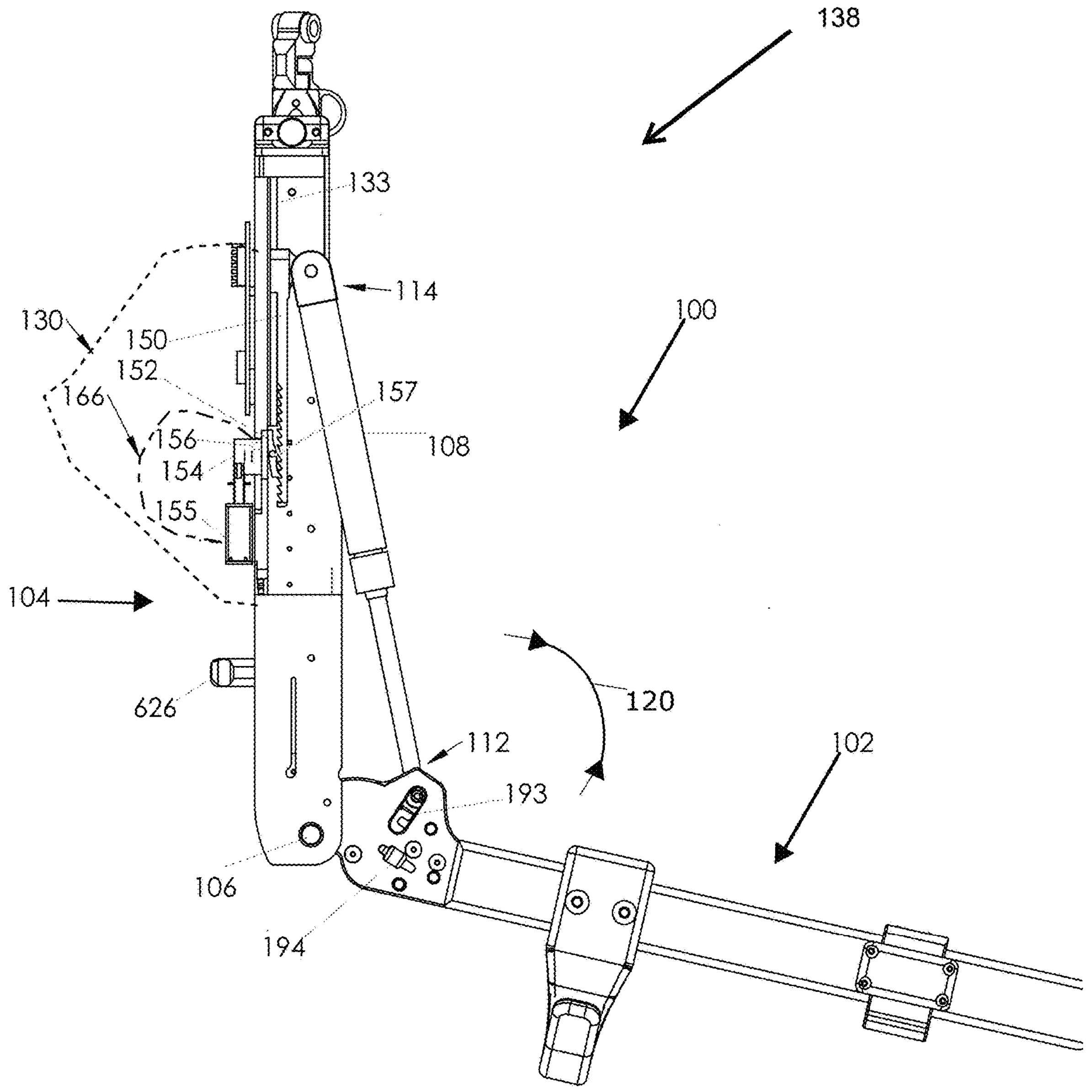
FIG. 10 shows the embodiment of FIG. 9, wherein the exoskeleton leg is engaged in a constrained operational mode ("first operational mode").
Figure 11:
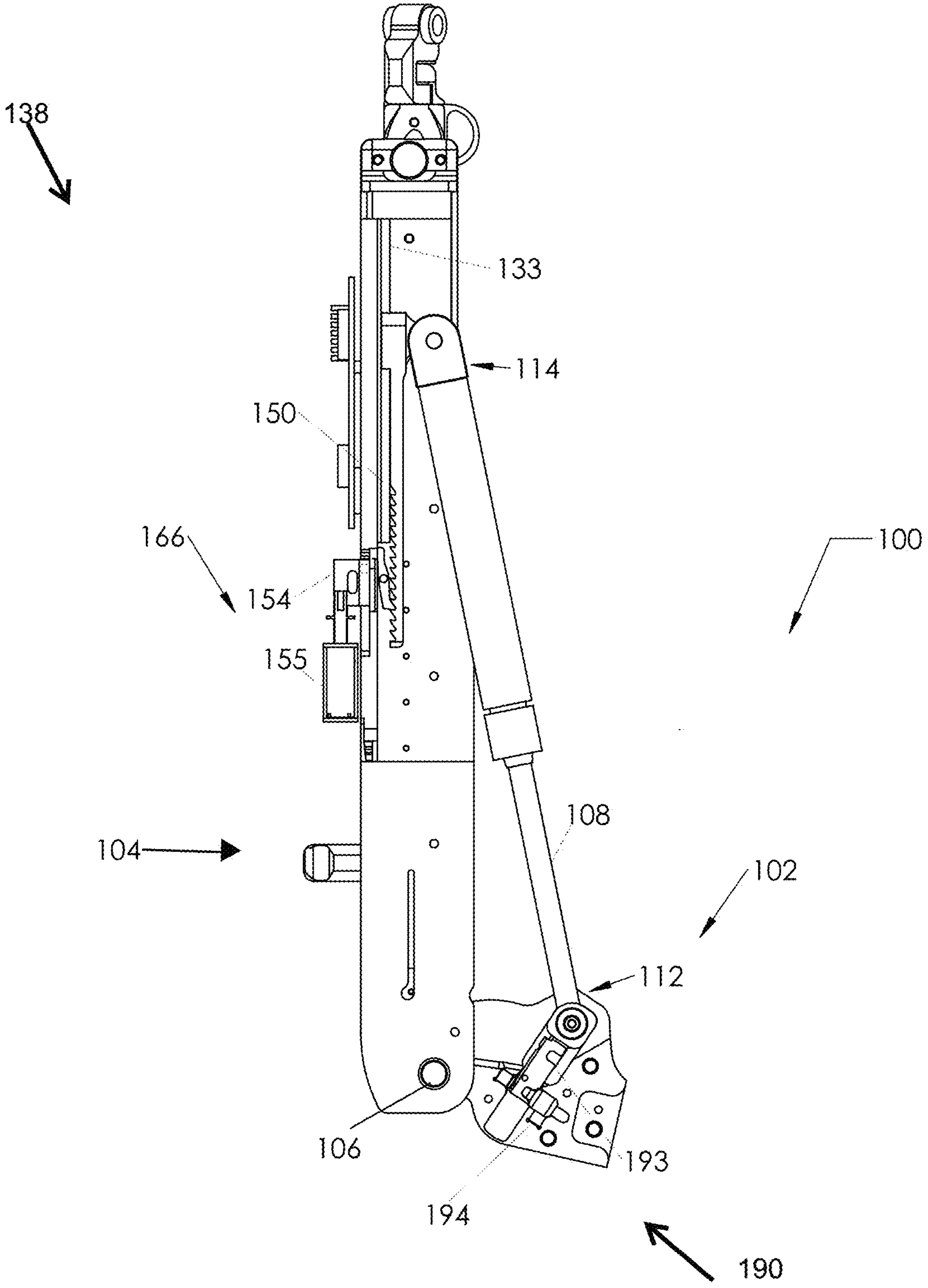
FIG. 11 shows a close-up and partial view of the embodiment shown in FIG. 10, wherein an adjustment mechanism coupled to the shank link is shown.

In some embodiments, such as that shown in FIG. 8, signal processor 404 and contralateral signal processor 424 share a communication signal 330, and a combination of communication signal 330, shank signal 314, contralateral shank signal 324, thigh signal 316, and contralateral thigh signal 326 is used by signal processors 404 and contralateral signal processor 424 to generate actuation signal 318 for actuator 166, and contralateral actuation signal 328 for actuator 176, in order to change operational modes of constraining mechanisms (element 130, as shown for exoskeleton leg 100 in FIGS. 9-11, which is substantially identical to a constraining mechanism (not shown) for contralateral exoskeleton leg 101).

In some embodiments of the disclosure, signal processor 404 of exoskeleton leg 100 uses communication signal 330 received from the contralateral exoskeleton leg 101 to change its operation mode. Similarly, the contralateral signal processor 424 of contralateral exoskeleton leg 101 can use communication signal 330 received from exoskeleton leg 100 to change its operation mode.

In some embodiments, signal processors 404 and contralateral signal processor 424 may use communication signal 330 in addition to at least one leg signal to change its operation mode.

In the embodiments of FIG. 8, exoskeleton leg 100 and exoskeleton 101 communicate with each other using communication signal 330. Communication signal may convey information about the operation mode of the signal processor, the operation mode of the constraining mechanism, the leg signal of the exoskeleton leg 100 or 101. In some embodiments, signal processor 404 and 424 use communication signal 330 to make a decision about changing the operation mode of exoskeleton leg 100 or exoskeleton 101.

In some embodiments, signals (such as shank signal 314 or thigh signal 316) produced by one or more sensors (such as shank sensor 310 or thigh sensor 405) coupled to at least one exoskeleton leg (100 and/or 101), can individually or in combination be used to determine: if a wearer is in knee flexion 120; if vertical hip-ankle distance 262 or contralateral vertical hip-ankle distance 263 is decreasing; if vertical hip-ankle distance 262 or contralateral vertical hip-ankle distance 263 has passed a threshold; if vertical hip-ground distance 260 or contralateral vertical hip-ground distance is decreasing; and/or if vertical hip-ground distance 260 or contralateral vertical hip-ground distance has passed a threshold. These are few of many parameters which are useful in the identification of squatting or lunging. Their description and use described herein is not intended to be limiting.

In some embodiments, communication signal 330 can be communicated using a wired connection, or wirelessly. For example, in some embodiments, communication of signal 330 can occur over Bluetooth Classic, Bluetooth Low Energy/Bluetooth Smart, Serial peripheral interface (SPI), UART protocol, I2C, CAN, and/or combinations thereof, and may utilize communications interfaces included in or coupled to such signal processors. It will be appreciated that any form of electronic communication can be used to communicate between processor 404 and contralateral signal processor 424.

In some embodiments, a manual switch 406 (see, for example, FIG. 3) is used to change an operational mode of constraining mechanism 130.

In some embodiments, at least one signal processor 404 uses at least one actuation signal 318 to command at least one actuator 166 to change the mode of constraining mechanism 130. Such embodiments are discussed in more detail below when discussing a specific embodiment of the mechanical system.

Figures 19A, 19B, 19C:
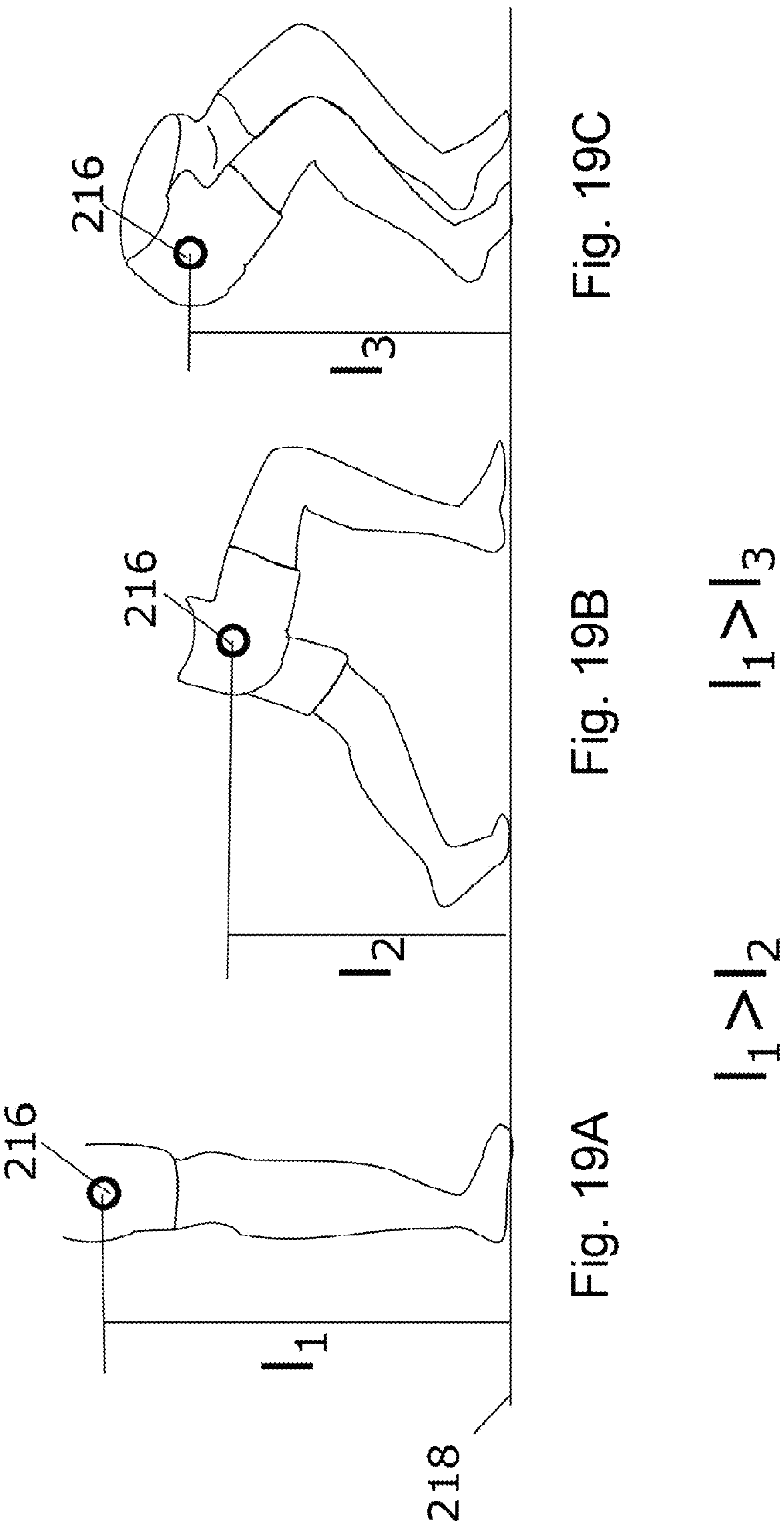
FIG. 19A shows an upright posture of an intended wearer.
FIG. 19B shows a lunging posture of an intended wearer.
FIG. 19C shows a squatting posture of an intended wearer.
Figure 21:
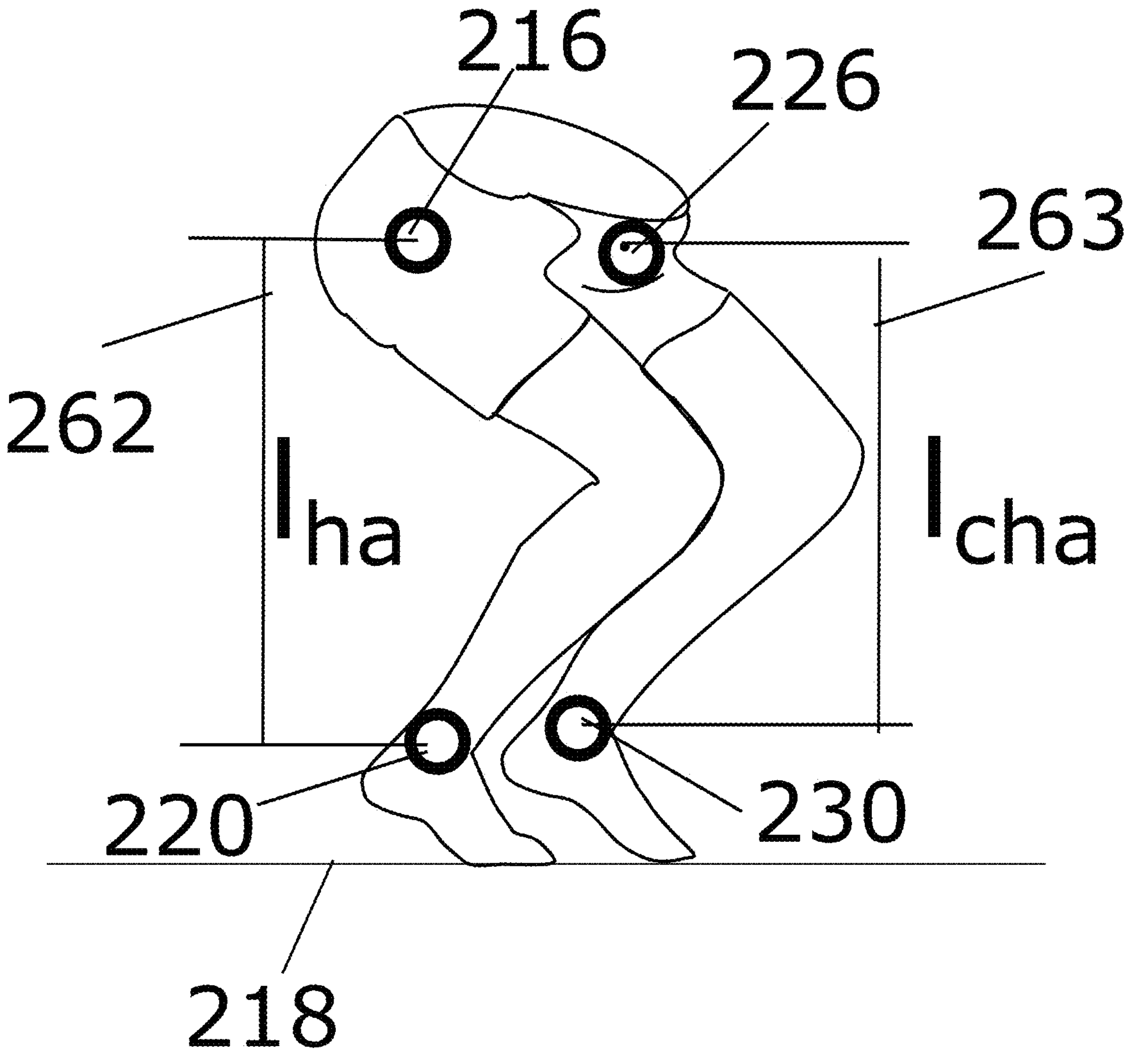
FIG. 21 shows additional detail of the squatting posture shown in FIG. 19C.

Embodiments disclosed herein assist a wearer 200 during activities where support is beneficial. Examples of such an activity include squatting, stance (foot is on the ground) flexion, lunging and other activities. FIGS. 19A, 19B, and 19C show three different postures for an intended wearer 200: an upright posture (FIG. 19A); a lunging posture (FIG. 19B): and a squatting posture (FIG. 19C). These figures depict ground 218, and wearer's hip joint 216. As seen in FIG. 19, the lunging and squatting postures result in a decrease in hip height when compared to standing upright. FIG. 21 shows further detail of the squatting posture shown in FIG. 19C. Wearer's hip joint 216 and wearer's ankle 220 are separated by vertical hip-ankle distance 262. Similarly, wearer's contralateral wearer's hip joint 226 and contralateral wearer's ankle 230 are separated by contralateral vertical hip-ankle distance 263. During stance, vertical hip-ankle distance 262 and vertical hip-ground distance 260 are substantially similar. Thus when we refer to hip height, in some embodiments, hip height is vertical hip-ground distance 260. Similarly, contralateral hip height is contralateral vertical hip-ground distance. In some embodiments, hip height is vertical hip-ankle distance 262. Similarly, contralateral hip height is contralateral vertical hip-ankle distance 263. Some embodiments, may utilize information from the leg and contralateral leg to transition mode of the signal processor or the constraining mechanism.

Some of the various parameters associated initiating support to the wearer or not restricting the wearer are discussed below.

In some embodiments, at least one constraining mechanism 130 transitions to constrained mode 138 when wearer 200 is squatting. In various embodiments, at least one constraining mechanism 130 transitions to constrained mode 138 when wearer 200 is lunging. There are several means of identifying the act of squatting or lunging in order to initiate support, one way is observe changes in the hip height of the wearer 200, still another way is to observe when the wearer's foot is on the ground and they are flexing their knee. This is discussed in more detail below but is not intended to be limiting.

In various embodiments, at least one constraining mechanism 130 transitions to unconstrained mode 139 when wearer 200 is walking. There are various embodiments configured to identify if wearer 200 is walking or locomoting. One implementation utilizes measuring the horizontal hip speed of wearer 200. The horizontal hip speed of wearer 200 is greater while walking or locomoting as compared to standing. In some embodiments, constraining mechanism 130 transitions to unconstrained mode 139 when horizontal hip speed of at least one of wearer's hip joint 216 is greater than a threshold. This speed can be measured using external sensors such as vision systems or sensors on board the exoskeleton leg.

In some embodiments, constraining mechanism 130 transitions to unconstrained mode 139 when wearer 200 is running. In some embodiments, constraining mechanism 130 transitions to unconstrained mode 139 when wearer 200 is locomoting.

It will be appreciated that constraining mechanism 130 of each exoskeleton leg 100 should not transition to constrained mode 138 unless a wearer's corresponding leg 208 is grounded. Otherwise, the apparatus may impede locomotive activities of wearer 200.

In some embodiments, constraining mechanism 130 transitions to unconstrained mode 139 when wearer's foot 214 (shown in FIG. 46) is not in contact with ground 218. In some embodiments, constraining mechanism 130 transitions to unconstrained mode 139 when wearer's leg 208 is not supporting at least some weight of wearer 200. In some embodiments, constraining mechanism 130 of rear thigh 205 (shown in FIG. 44) during a lunge remains in unconstrained mode 139. Parameters for identifying the rear thigh 205 are discussed below.

In some embodiments, constraining mechanism 130 transitions to constrained mode 138 when wearer's knee 228 (shown in FIG. 2) is flexing. In some embodiments, at least one constraining mechanism 130 transitions to constrained mode 138 when at least one of wearer's leg 208 is contacting ground 218 and wearer's knee 228 is flexing.

Figure 43:
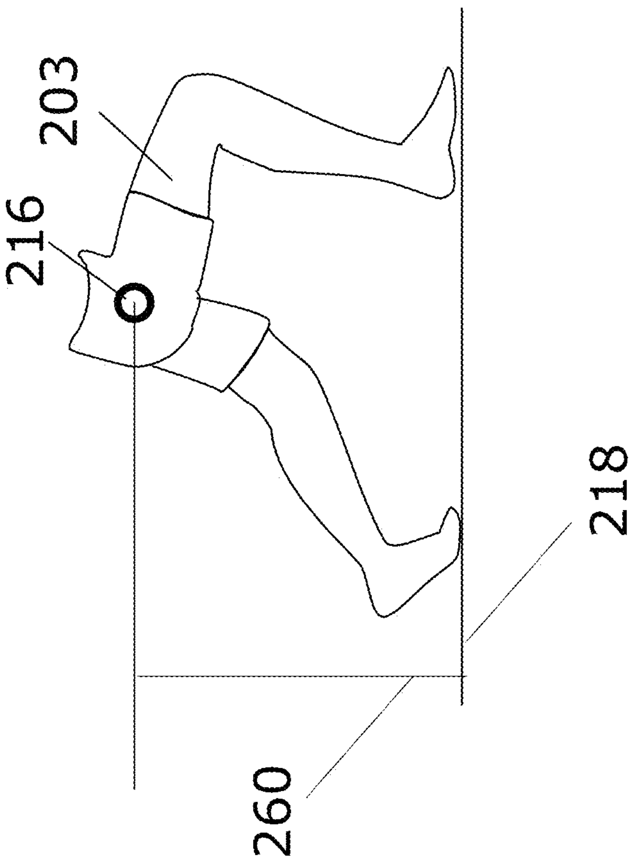
FIG. 43 shows illustrations of person during a lunge, identifying hip ground height and the front thigh.

In some embodiments, at least one constraining mechanism 130 transitions to constrained mode 138 when at least one of wearer's leg 208 is contacting ground 218 and vertical hip-ground distance 260, as shown in FIG. 43, is decreasing.

In some embodiments, at least one constraining mechanism 130 transitions to constrained mode 138 when at least one of wearer's leg 208 is contacting ground 218 and vertical hip-ground distance 260 is less than a nominal squat threshold. In some embodiments, at least one constraining mechanism 130 transitions to unconstrained mode 139 when vertical hip-ground distance 260 is greater than a nominal squat threshold.

In some embodiments, constraining mechanism 130 remains in constrained mode 138 while force generator 108 is producing a force. It can be appreciated that this functionality may be achieved in some embodiments by the friction between magnetic pawl 152 and teeth of sliding ratchet 150 of constraining mechanism 130 when force generator 108 is loaded. This mechanism is described more fully below.

In some embodiments, at least one constraining mechanism 130 transitions to constrained mode 138 when at least one of wearer's leg 208 is contacting ground 218 and at least vertical hip-ankle distance 262 or contralateral vertical hip-ankle distance 263 (shown in FIG. 21) is decreasing.

In some embodiments, at least one constraining mechanism 130 transitions to constrained mode 138 when at least one of wearer's leg 208 is contacting ground 218 and at least vertical hip-ankle distance 262 or contralateral vertical hip-ankle distance 263 is less than a nominal squat threshold.

In some embodiments, at least one constraining mechanism 130 transitions to unconstrained mode 139 when vertical hip-ankle distance 262 is greater than a threshold. In some embodiments, at least one constraining mechanism 130 transitions to unconstrained mode 139 when vertical hip-ankle distance 262 is greater than a nominal rise threshold and force generator 108 is unloaded.

In some embodiments, at least one constraining mechanism 130 transitions to constrained mode 138 when at least vertical hip-ankle distance 262 or contralateral vertical hip-ankle distance 263 is decreasing and is less than a nominal squat threshold.

In some embodiments, at least one constraining mechanism 130 transitions to constrained mode 138 when at least vertical hip-ankle distance 262 or contralateral vertical hip-ankle distance 263 is decreasing.

In some embodiments, at least one constraining mechanism 130 transitions to constrained mode 138 when at least vertical hip-ankle distance 262 or contralateral vertical hip-ankle distance 263 is less than a nominal squat threshold. In some embodiments, at least one constraining mechanism 130 transitions to unconstrained mode 139 when knee angle 122 is greater than a threshold.

In some embodiments, constraining mechanism 130 transitions to constrained mode 138 when the horizontal speeds of the wearer's ankles 220 are less than a threshold and differ by less than a selected value. This is indicative that the wearer is not moving. This feature may be used in combination with the wearer's knee flexing or the wearer's hip height decreasing to further identify squatting.

Accordingly, systems disclosed herein provide assistance during maneuvers such as, but not limited to, squatting (as shown in FIG. 19C) or lunging (as shown in FIG. 19B) by transitioning constraining mechanism 130 to constrained mode 138, but allows for free and unconstrained locomotion by transitioning constraining mechanism 130 to unconstrained mode 139.

In some embodiments of exoskeleton leg 100, force generator 108 and constraining mechanism 130 may be replaced with a torque generator, wherein torque generator has at least two modes: a first torque mode; and a second torque mode.

In some embodiments, when torque generator is in first torque mode, exoskeleton leg 100 may impose a torque on wearer 200. In some embodiments, when torque generator in first torque mode, exoskeleton leg 100 and 101 may impose an extension torque on wearer 200. This results in a resistance to flexion and assistance during extension. This is similar to constrained mode 138 when exoskeleton leg 100 consists of a spring-like force generator 108 and constraining mechanism 130. In some embodiments, when torque generator is in second torque mode, exoskeleton leg 100 imposes a negligible or very small torque to wearer 200. In some embodiments, signal processor 404 is configured to control the mode of torque generator.

In some embodiments, torque generator may comprise an electric motor, combination of electric motor and spring, electric motor and transmission any combinations thereof.

The finite state machines described herein may be applicable to embodiments of exoskeleton leg 100 comprising force generator 108 and constraining mechanism 130. The finite state machines described herein may be applicable to embodiments of exoskeleton leg 100 comprising torque generator In some embodiments, exoskeleton leg 100 is configured such that first operation mode 331 of signal processor 404 may correspond to constrained mode 138 of constraining mechanism 130. In some embodiments, exoskeleton leg 100 is configured such that second operation mode 332 of signal processor 404 may correspond to unconstrained mode 139 of constraining mechanism 130.

In some embodiments, exoskeleton leg 100 is configured such that first operation mode 331 of signal processor 404 may correspond to first torque mode of torque generator. In some embodiments, exoskeleton leg 100 is configured such that second operation mode 332 of signal processor 404 may correspond to second torque mode of torque generator.

Various configurations of the transitioning to first operation mode 331 are contemplated and disclosed herein. The configurations disclosed are not intended to be limiting. In some embodiments, signal processor 404 transitions to first operation mode 331 when wearer 200 is squatting. In some embodiments, signal processor 404 transitions to first operation mode 331 when wearer 200 is lunging.

In some embodiments, signal processor 404 transitions to first operation mode 331 when wearer's knee 228 (shown in FIG. 2) is flexing. In some embodiments, signal processor 404 transitions to first operation mode 331 when at least one of wearer's leg 208 is contacting ground 218 and wearer's knee 228 is flexing. In some embodiments, signal processor 404 transitions to first operation mode 331 when at least one of wearer's leg 208 is contacting ground 218.

In some embodiments, signal processor 404 transitions to first operation mode 331 when at least one of wearer's leg 208 is contacting ground 218 and vertical hip-ground distance 260, as shown in FIG. 43, is decreasing. In some embodiments, signal processor 404 transitions to first operation mode 331 when at least one of wearer's leg 208 is contacting ground 218 and vertical hip-ground distance 260 is less than a nominal squat threshold.

In some embodiments, signal processor 404 transitions to first operation mode 331 when vertical hip-ground distance 260 is less than a nominal squat threshold. In some embodiments, signal processor 404 transitions to first operation mode 331 when vertical hip-ground distance 260 is decreasing. In some embodiments, signal processor 404 transitions to first operation mode 331 when vertical hip-ground distance 260 is decreasing and is less than a nominal squat threshold. In some embodiments, signal processor 404 transitions to second operation mode 332 when vertical hip-ground distance 260 is greater than a nominal rise threshold.

In some embodiments, signal processor 404 transitions to first operation mode 331 when at least one of wearer's leg 208 is contacting ground 218 and at least vertical hip-ankle distance 262 or contralateral vertical hip-ankle distance 263 (shown in FIG. 21) is decreasing.

In some embodiments, signal processor 404 transitions to first operation mode 331 when at least one of wearer's leg 208 is contacting ground 218 and at least vertical hip-ankle distance 262 or contralateral vertical hip-ankle distance 263 is less than a nominal squat threshold. In some embodiments, signal processor 404 transitions to second operation mode 332 when vertical hip-ankle distance 262 is greater than a nominal rise threshold.

In some embodiments, signal processor 404 transitions to first operation mode 331 when at least vertical hip-ankle distance 262 or contralateral vertical hip-ankle distance 263 is decreasing and is less than a nominal squat threshold. In some embodiments, signal processor 404 transitions to first operation mode 331 when at least vertical hip-ankle distance 262 or contralateral vertical hip-ankle distance 263 is decreasing. In some embodiments, signal processor 404 transitions to first operation mode 331 when at least vertical hip-ankle distance 262 or contralateral vertical hip-ankle distance 263 is less than a nominal squat threshold. In some embodiments, signal processor 404 transitions to second operation mode 332 when knee angle 122 is greater than a nominal rise threshold.

Figure 20:
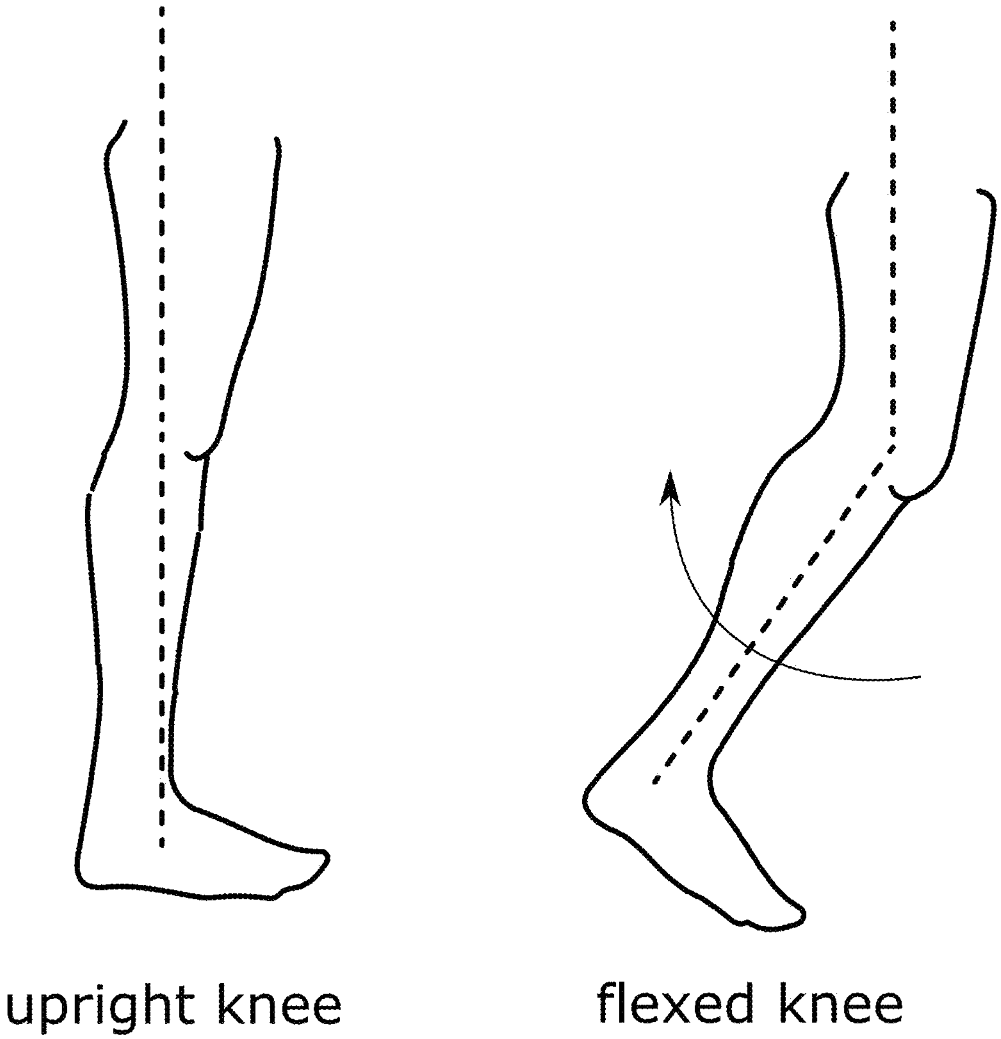
FIG. 20 shows a graphical comparison of a flexed knee and an upright knee in an intended wearer.

Squatting may be characterized in many ways. Described below are parameters that may be used to identify squatting and other conditions where supporting wearer's knee 228 may be beneficial. The descriptions of these parameters are not intended to be limiting. FIG. 20 shows a graphical comparison of a flexed knee and an upright knee in an intended wearer 200. A parameter that may be used to identify maneuvers and/or conditions where support is appropriate is hip height. As mentioned earlier, hip height maybe the vertical hip ground distance 260 in some embodiments and hip height may be the vertical hip-ankle distance 262 in other embodiments.

In some embodiments, nominal squat threshold is proportional to the value of vertical hip-ground distance 260 when a wearer 200 is standing upright. In some embodiments, nominal squat threshold is 90% of the value of vertical hip-ground distance 260 when a wearer 200 is standing upright. In some embodiments, nominal squat threshold is proportional to the value of vertical hip-ankle distance 262 when a wearer 200 is standing upright. In some embodiments, nominal squat threshold is 90% of the value of vertical hip-ankle distance 262 when a wearer 200 is standing upright.

For example, FIGS. 19A, 19B, and 19C depict two situations where vertical hip-ground distance 260 has decreased below a threshold. FIG. 19A depicts a distance 11, which we may assume for this example is nominal squat threshold.

FIG. 19B depicts a lunge resulting in a vertical hip-ground distance 260 of 12, which is less than nominal squat threshold. In some embodiments, this would result in signal processor 404 transitioning to first operation mode 331.

Similarly, FIG. 19C depicts a squat resulting in a vertical hip-ground distance 260 of 13, which is less than nominal squat threshold. In some embodiments this would result in signal processor 404 transitioning to first operation mode 331.

It will be appreciated that a vertical hip-ground distance 260 or vertical hip-ankle distance 262 can be measured using a combination of, but not limited to, distance sensor, a proximity sensor, a pressure sensor, a force sensor, a shank angle sensor, a thigh angle sensor and a knee angle sensor. For example, thigh sensor 405 and shank sensor 310 described above are both used in embodiments such as that shown in FIG. 8 to determine vertical hip-ankle distance 262.

In some embodiments, nominal squat threshold of exoskeleton leg 100 and exoskeleton leg 101 may be different. In some embodiments, nominal rise threshold may be different than nominal squat threshold.

Figure 38:
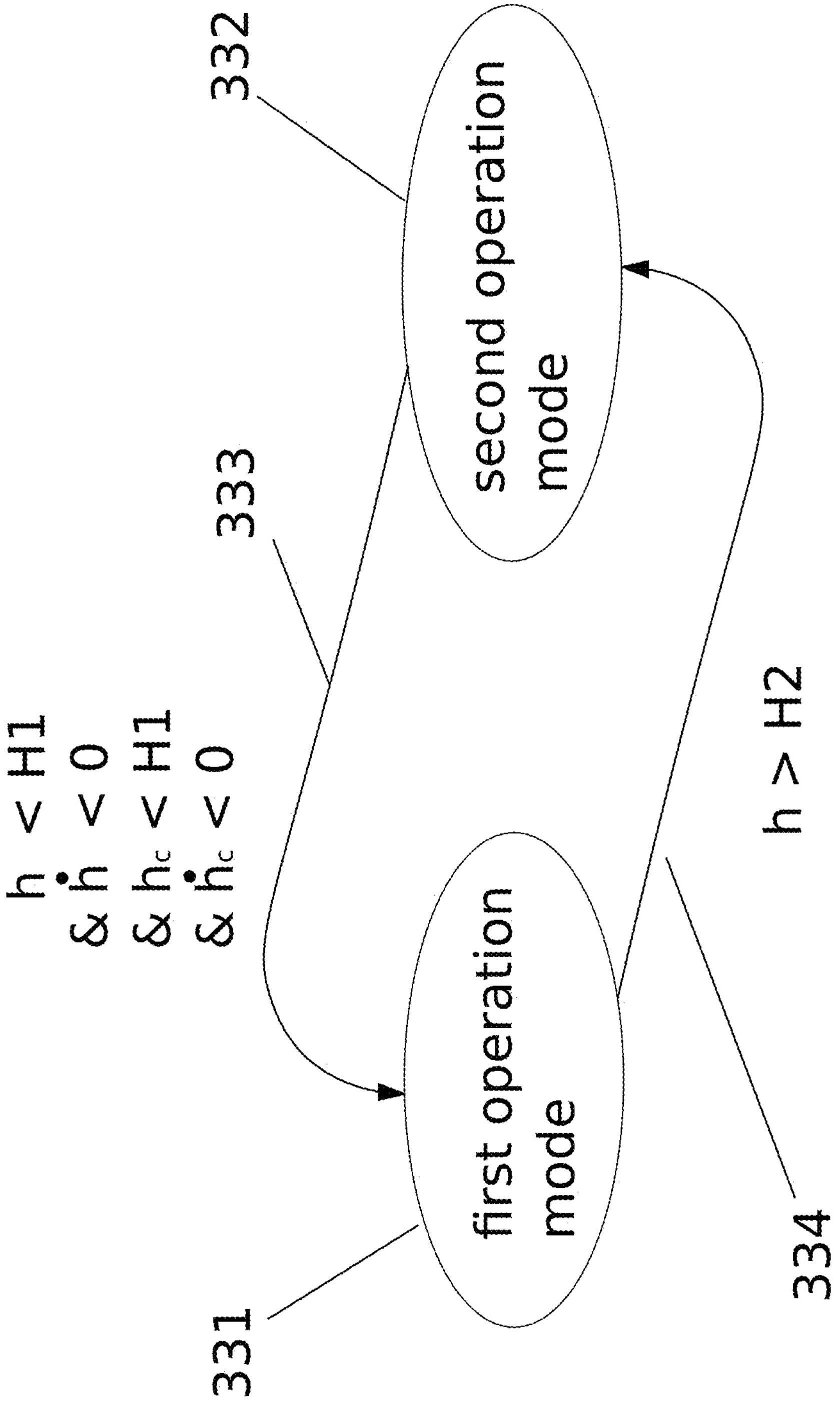
FIG. 38 shows an embodiment of a finite state machine for the two exoskeleton legs of the embodiment.

FIG. 38 shows an embodiment of a finite state machine for signal processor 404, wherein h denotes hip height, and he denotes contralateral hip height. H1 denotes a height threshold, which in some embodiments is nominal squat threshold. H2 denotes another height threshold, which in some embodiments is nominal rise threshold.

With regard to the embodiment shown in FIG. 38, hip height, h, represents vertical hip-ankle distance 262, similarly, contralateral hip height, hc, represents contralateral vertical hip-ankle distance 263. Derivatives of these quantities with respect to time are denoted by a dot above. In various embodiments, the finite state machine includes at least two states: first operation mode 331, and second operation mode 331.

In the embodiment shown in FIG. 38, signal processor 404 transitions to first operation mode 331 when hip height, h, and contralateral hip height, hc are below height threshold H1, and are decreasing (i.e. having a negative derivative with respect to time), as shown in upper arrow 333 of FIG. 38.

In the embodiment shown in FIG. 38, signal processor 404 transitions to second operation mode 332 when hip height, h, is greater than height threshold H2, as shown in lower arrow 334.

In some embodiments, these conditions are sufficient to provide assistance to wearer 200 where appropriate, yet not impede wearer 200 during other times. Accordingly, the finite state machine for the embodiment represented in FIG. 38 may assist tasks such as squatting and lunging, but may not impede motions such as walking, or ascent or descent of stairs and ladders, as more fully described below.

Furthermore, according to some embodiments, height threshold H1 and height threshold H2 are selected such that the conditions and scenarios described below are satisfied.

In scenarios in which a user is walking, the gait cycle of walking may be partitioned into at least two distinct phases: (1) swing, wherein one leg is in stance and one leg swings forward, and (2) double stance, wherein both legs are in stance.

Some embodiments, such as those which implement the finite state machine shown in FIG. 38, do not cause signal processor 404 to transition to first operation mode 331 during swing because hip height, h, of a wearer's stance leg is greater than hip height threshold H1. These embodiments do not cause signal processor 404 to transition to first operation mode 331 during double stance because at least one of hip height, h, and contralateral hip height, hc, is increasing, or at least one of hip height, h, and contralateral hip height, hc, is greater than height threshold H1. Thus, such embodiments do not impede walking.

In scenarios involving stair and ladder ascent, the gait cycle of stair and ladder ascent may be partitioned into at least two distinct phases: (1) swing, and (2) double stance. Some embodiments, such as those which implement the finite state machine shown in FIG. 38, do not cause signal processor 404 to transition to first operation mode 331 during swing phase of ladder or stair ascent because hip height, h, of a wearer's stance leg is increasing. These embodiments do not cause signal processor 404 to transition to first operation mode 331 during double stance of ladder or stair ascent because a hip height, h, for a leg on an upper rung or step is increasing, and hip height, h, for a leg on a lower rung or step is greater than height threshold H1. Thus, such embodiments do not impede stair or ladder ascent.

In scenarios involving stair and ladder descent, the gait cycle of stair and ladder descent may be partitioned into at least two distinct phases: (1) swing, and (2) double stance. Some embodiments, such as those which implement the finite state machine shown in FIG. 38, do not cause signal processor 404 to transition to first operation mode 331 during swing phase of ladder or stair descent because hip height, h, of a wearer's swing leg is increasing. These embodiments do not cause signal processor 404 to transition to first operation mode 331 during double stance of ladder or stair descent because hip height, h, for a wearer's leg on a lower rung or step is greater than height threshold H1. Thus, such embodiments do not impede stair or ladder descent.

In scenarios involving squatting and lunging, during a lowering phase of a squat or lunge, both hip height, h, and contralateral hip height, hc, are decreasing. If wearer 200 lowers sufficiently such that both hip height, h, and contralateral hip height, hc, are less than height threshold H1, these embodiments will cause signal processor 404 to transition to first operation mode 331. Thus, the embodiment may assist the squat or lunge. The finite state machine of FIG. 38 for each signal processor 404 will remain in first operation mode 331 until a hip height, h, is greater than height threshold H2. This ensures that the embodiments may provide assistance throughout a maximal portion of the squat or lunge.

Figure 41:
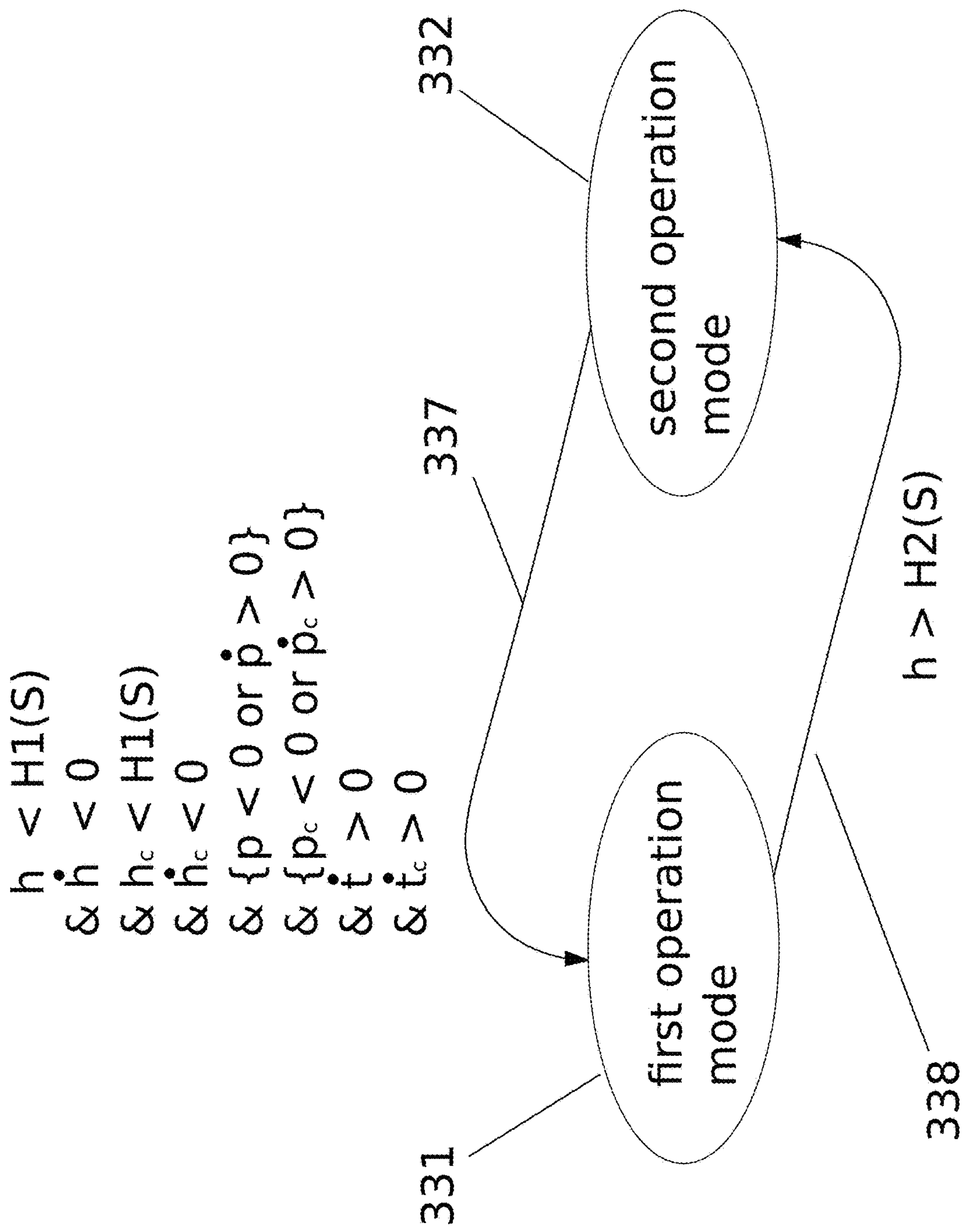
FIG. 41 shows another embodiment of a finite state machine for the two exoskeleton legs of the embodiment.

FIG. 41 shows another embodiment of a finite state machine for signal processor 404, where h denotes hip height, and hc denotes contralateral hip height. H1 denotes a height threshold, which in some embodiments is nominal squat threshold. H2 denotes another height threshold, which in some embodiments is nominal rise threshold.

With regard to the embodiment shown in FIG. 41, hip height, h, represents vertical hip-ankle distance 262, similarly, contralateral hip height, hc, represents contralateral vertical hip-ankle distance 263. In some embodiments, H1 and H2 may be a function of and determined based, at least in part, on thigh angle difference 126, denoted S in FIG. 41, and shown in FIG. 44.

Figure 42:
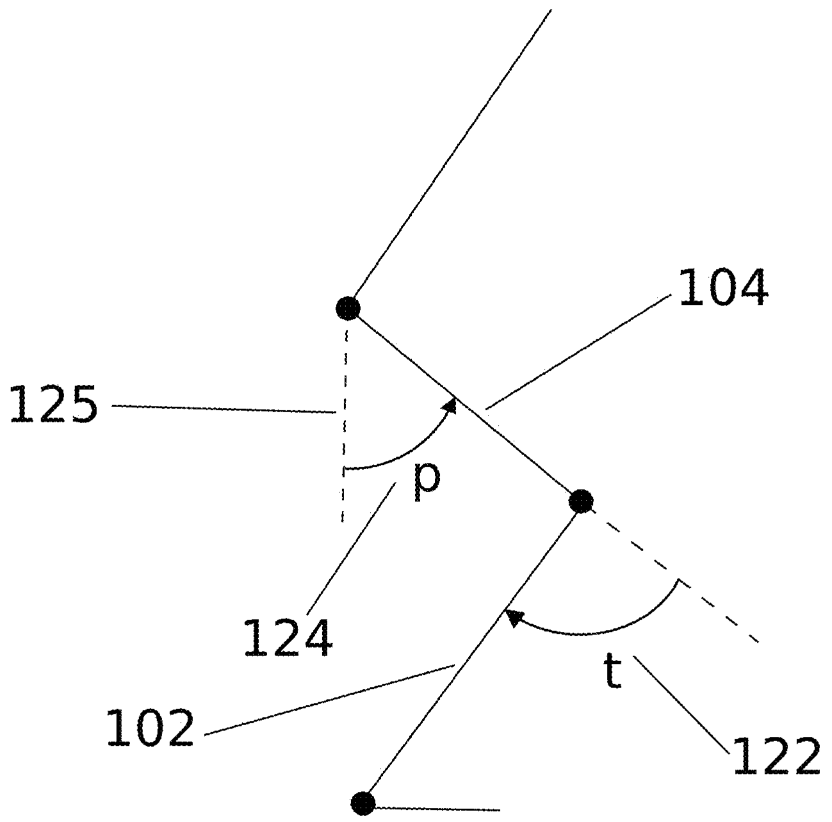
FIG. 42 shows a schematic identifying conventions used in FIG. 41.

FIG. 42, shows a simple stick figure illustration of a person wearing exoskeleton leg 100 in a squat to depict the conventions used in FIG. 41. As shown in FIG. 42, p denotes absolute thigh angle 124 from vertical 125 (where vertical represents gravity) to thigh link 104, where 0 corresponds to upright and positive direction is in front of wearer 200, and p is negative when in rear to the wearer 200 relative to vertical 125. Here, vertical represents the direction of gravity. In some embodiments, rear thigh 205 may be identified as wearer's leg 208 having a negative absolute thigh angle 124. As also shown in FIG. 41, t denotes knee angle 122, where 0 corresponds to full extension and positive direction is flexion. In FIG. 41, pc denotes contralateral thigh angle, and t, denotes contralateral knee angle. Referring again to the finite state machine of FIG. 41, derivatives of these quantities with respect to time are denoted by a dot above.

The finite state machine comprises two states: first operation mode 331, and second operation mode 331. In the embodiment shown in FIG. 41, signal processor 404 transitions to first operation mode 331 when (as shown in upper arrow 337): hip height, h, is less than height threshold H1, contralateral hip height hc is height threshold H1, hip height h is decreasing, contralateral hip height hc is decreasing, and thigh angle 124 *p* is either: negative (indicative that wearer's thigh 204 is behind wearer 200), or p is increasing (indicative that hip flexion is occurring), and contralateral thigh angle pc is either: negative, or pc is increasing, and knee angle 122, t, is decreasing, and contralateral knee angle, tc, is decreasing. Some of these conditions and features are discussed more fully below.

In the embodiment shown in FIG. 41, signal processor 404 transitions to second operation mode 332 when hip height, h, is greater than height threshold H2, as shown in lower arrow 338 of FIG. 41. These conditions are sufficient for such embodiments to be able to provide assistance to the wearer where appropriate, yet not impede the wearer during other times. Accordingly, the finite state machine for the embodiment represented in FIG. 41 may assist tasks such as squatting, lunging, and jumping, but may not impede motions such as walking, or ascent or descent of stairs and ladders.

Figure 44:
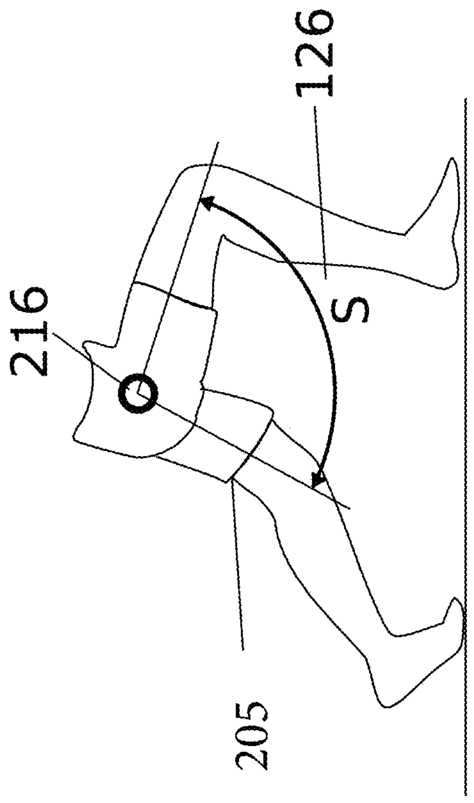
FIG. 44 shows a depiction of the thighs being apart during some maneuvers that require support.

In some embodiments, nominal squat threshold is different when the wearer's thigh 204 and contralateral thigh 201 are together compared to when the wearer's thigh 204 and contralateral thigh 201 are apart. In some embodiments of the disclosure, nominal squat threshold is a function of thigh angle difference 126, denoted S as shown in FIG. 44. In some embodiments of the disclosure, nominal rise threshold is a function of thigh angle difference 126, denoted S as shown in FIG. 44.

Having nominal squat threshold and nominal rise threshold determined based on thigh angle difference 126 allows the support from exoskeleton leg 100 to initiate earlier during symmetric squats. During double stance phase of walking, a person's hip height naturally lowers, as compared to standing upright, despite the person not squatting. Thus, a constant nominal squat threshold and nominal rise threshold are picked so that support is initiated later in a squat or walking may be impeded. By decreasing nominal squat threshold and nominal rise threshold as a function of thigh angle difference, such embodiments may engage earlier during symmetric squats, wherein thigh angle difference 126 is relatively small, while still minimizing impedance while walking, wherein thigh angle difference 126 may be substantial.

In some embodiments, signal processor 404 is configured to not transition to first operational mode 331 when hip height and contralateral hip height differ by more than a hip difference threshold 270. In some embodiments of the disclosure, constraining mechanism 130 does not transition to constrained mode 138 if hip height and contralateral hip height a differ by more than hip difference threshold 270.

These parameters reduce the likelihood of impeding wearer 200 on non-level ground, such as stairs, ladders and inclines, since these unlevel surfaces may lead to substantial hip height differences between left and right legs.

In some embodiments of the disclosure, the device is configured such that if a wearer's thigh 204 is toward the front of the wearer 200, this wearer's thigh 204 has to be rotating in the direction of hip flexion (FIG. 26) for signal processor 404 to transition to first operation mode 331. FIG. 43 shows front thigh 203, where wearer's thigh 204 is toward the front of wearer 200.

This parameter reduces the likelihood of impedance during locomotion since such maneuvers involve hip extension of the front stance leg. Since a person's leg in front of their body must have hip flexion during squatting, this configuration allows for substantially reduced impedance during locomotion while still allowing support during squatting.

In some embodiments, signal processor 404 transitions to second operation mode 332 when wearer 200 is running. In some embodiments, signal processor 404 transitions to second operation mode 332 when wearer 200 is locomoting. In some embodiments, signal processor 404 transitions to second operation mode 332 when the wearer's foot is off the ground.

In some embodiments, signal processor 404 of rear leg of wearer 200 during a lunge (as shown in FIG. 44) transitions to second operation mode 332. The rear leg of the wearer is identified as the leg with a rear thigh 205 having negative absolute thigh angle 124.

In some embodiments, signal processor 404 can be configured using an external interface. In some embodiments, the external interface is a software interface which can configure at least one mode of signal processor 404, values of thresholds such as nominal squat threshold and nominal rise threshold. This external software interface can be a GUI (graphical wearer interface) on a computer, mobile phone app, tablet, or other electronic device. The configurability of nominal squat threshold and nominal rise threshold allows for the exoskeleton leg to be configured to support the wearer for tasks such as squatting while not impeding them while walking.

FIGS. 9 and 10 show an embodiment of exoskeleton leg 100 wherein constraining mechanism 130 comprises a sliding ratchet 150, a magnetic pawl 152, and an actuator 166. It will be appreciated that other techniques may be implemented to achieve similar functionality of constraining mechanism 130 and the description here is not intended to be limiting. Actuator 166 in turn comprises a latching solenoid 155, a moving tab 154 and a magnet 156.

FIG. 9 shows an embodiment of a constraining mechanism 130 coupled to a thigh link 104 of an embodiment of an exoskeleton leg 100. More specifically, FIG. 9 shows an embodiment of exoskeleton leg 100 where a section of thigh link 104 has been exposed for clarity, to depict that exoskeleton leg 100 includes constraining mechanism 130 which is coupled to thigh link 104. A description of components sliding ratchet 150, pawl 152, moving tab 154, latching solenoid 155 and magnet 156 of constraining mechanism 130 is described in more detail below.

In one embodiment, constraining mechanism 130 has at least two operational modes. In constrained mode 138, constraining mechanism 130 allows for rotation about second end 114 of force generator 108 relative to thigh link 104. In the embodiment of FIG. 9. translation of second end 114 along thigh link 104 is constrained or substantially restricted. In this constrained mode, shank link 102, thigh link 104 and force generator 108 form a triangle, wherein changes to lengths of the triangle's sides are constrained to occur along force generator 108 only. This causes force generator 108 to create a force, which resists motion in flexion direction 120 of shank link 102 relative to thigh link 104.

In unconstrained mode 139, constraining mechanism 130 allows for both rotation and translation of second end 114 of force generator 108 relative to thigh link 104. In unconstrained mode 139, length changes to sides of a triangle defined by thigh link 104, shank link 102, and force generator 108 substantially occurs due to sliding along thigh link 104 and not along force generator 108, thus allowing free motion in both flexion direction 120 and extension direction 118. In other embodiments, second end 114 of force generator 108 may have degrees of freedom other than rotation relative to thigh link 104 in unconstrained mode 139.

As described above (and depicted in FIGS. 23 and 24), in both constrained mode 138 and unconstrained mode 139, force generator 108 is only rotatably coupled at first end 112 to shank link 102, and is constrained from translating along shank link 102, or substantially restricted from doing so.

The embodiment of FIG. 9 shows exoskeleton leg 100 in unconstrained mode 139, wherein second end 114 of force generator 108 is rotatably coupled to sliding ratchet 150 and is allowed to slide along a rail 133. Magnetic pawl 152 is pinned to rotate about pivot pin 157. In this embodiment, magnet 156 is coupled to moving tab 154 such that, in different operational modes, magnet 156 is on one side of a pivot pin 157 of magnetic pawl 152 or the other side. In unconstrained mode 139, magnet 156 attracts one end of magnetic pawl 152 such that magnetic pawl 152 does not engage/interface (i.e. make contact) with teeth of sliding ratchet 150, thereby allowing free motion in flexion direction 120 and extension 118 (shown in FIG. 2-3) directions of thigh link 104 relative to shank link 102.

The embodiment of FIG. 10 shows exoskeleton leg 100 in constrained mode 138. In constrained mode 138, magnet 156 is positioned over another side of pivot pin 157 of magnetic pawl 152 and attracts the other end of the magnetic pawl 152. In constrained mode 138, magnetic pawl 152 engages/interfaces (i.e. makes contact) ratchet 150, thereby constraining translational motion of force generator 108 at second end 114, which is coupled to thigh link 104. Thus, in constrained mode 138, flexion of exoskeleton leg 100 is resisted by force generator 108, which compresses in response to knee motion in flexion direction 120 by wearer 200.

In the embodiment of FIG. 10, if constraining mechanism 130 is in constrained mode 138, and force generator 108 is resisting motion in flexion direction 120 by producing a force between thigh link 104 and shank link 102, transitioning to unconstrained mode 139 may be accomplished by fulfillment of two conditions: (1) magnet 156, which is coupled to moving tab 154, is positioned to attract one end of magnetic pawl 152 such that magnetic pawl 152 is pulled away from teeth of sliding ratchet 150 (as described in FIG. 9); and (2) force generator 108 is unloaded (force generator 108 stops generating a force, which unloads the magnetic pawl). When force generator 108 is unloaded, magnetic pawl 152 is allowed to disengage from sliding ratchet 150, and then thigh link 104 and shank link 102 can move freely in flexion direction 120 and extension direction 118. This is because the friction force between the pawl and ratchet teeth is large when the force generator 108 is loaded. It should be appreciated that in some embodiments an actuator may be directly connected to the pawl, such that the motion of the actuator corresponds to motion of the pawl, thus if the actuator is strong enough, the force generator 108 may not be required to be unloaded, to change the mode of the constraining mechanism 130. In some embodiments, the moving tab 154 is coupled to manual switch 406, such that manual switch 406 allows a wearer manual control of the location of moving tab 154. Thus providing the wearer manual control of the constraining mechanism 130.

Referring to FIG. 10, it will be appreciated that moving tab 154 can be moved by a variety of actuation unit, some of which are described below.

As shown in FIGS. 5-13, in some embodiments, each exoskeleton (100/101) includes at least one constraining mechanism 130, where each constraining mechanism 130 comprising at least one actuator 166 to transition between two operational modes, as described above. Components of actuator 166 may be selected from a group consisting of, for example, a solenoid, a magnetically latching solenoid, a bistable solenoid, a DC motor, a servo, an AC motor, and any combination thereof. Other actuation mechanisms may also be readily apparent. FIGS. 5-13 show embodiments in which actuator 166 includes a magnetically latching solenoid 155, a moving tab 154, and a magnet 156.

Figure 15:
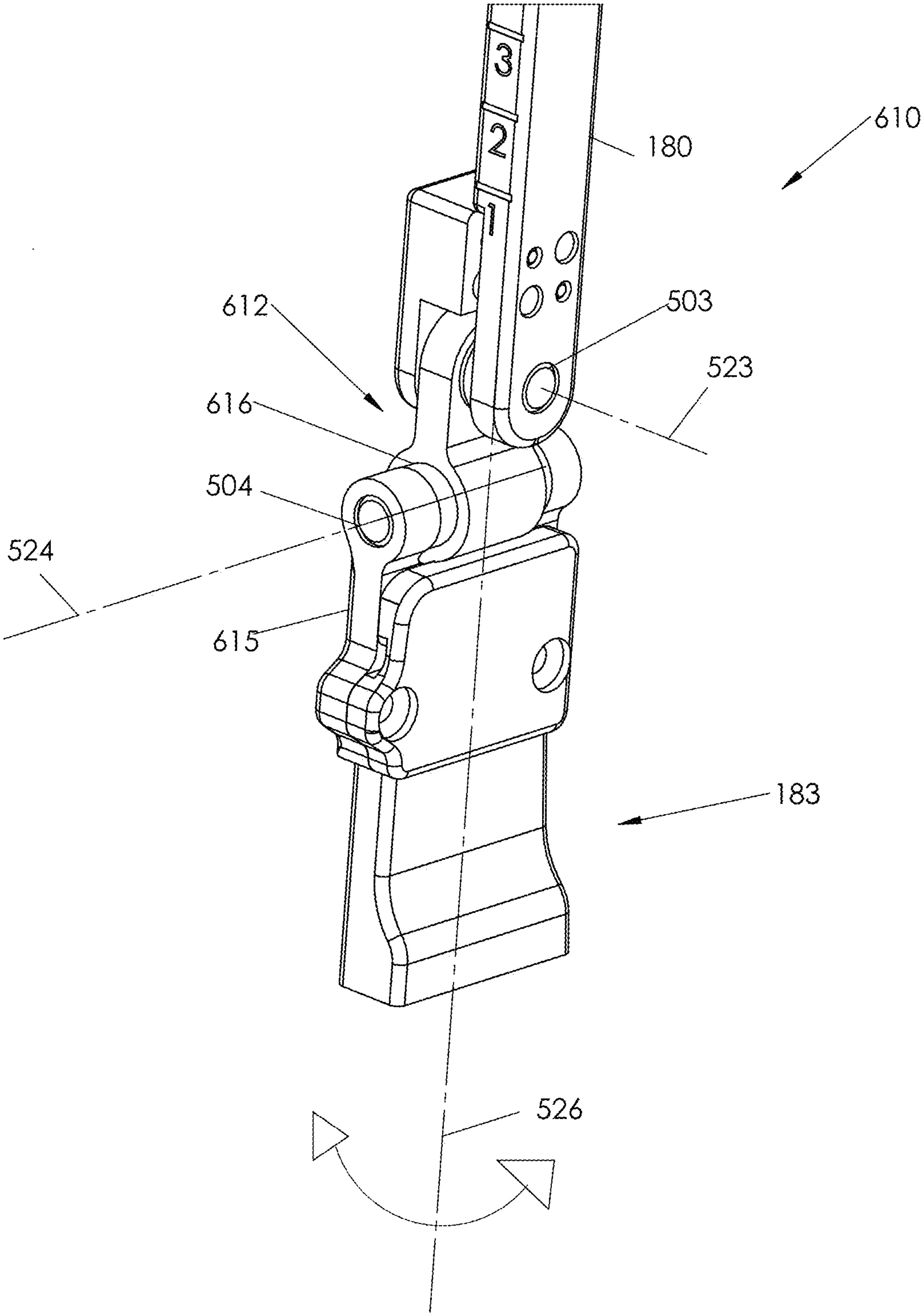
FIG. 15 shows an embodiment of a foot connector of the exoskeleton legs of FIG. 1.

In some embodiments, exoskeleton leg 100 further comprises ankle exoskeleton 610 coupled to shank link 102 from one end and to a wearer's foot 214 from another end. Thus, as shown in FIG. 15, in some embodiments, shank link 102 includes ankle first link 180, which extends shank link 102. Ankle first link 180 is substantially similar to shank link 102. The use of ankle exoskeleton 610 described is not intended to limit its use with exoskeleton leg 100. In some embodiments, a foot connector 183 of ankle exoskeleton 610 is rotatably coupled to shank link 102. Various techniques for implementing such rotatable coupling exist and some are disclosed herein. The ones disclosed are not intended to be limiting.

Figure 18:
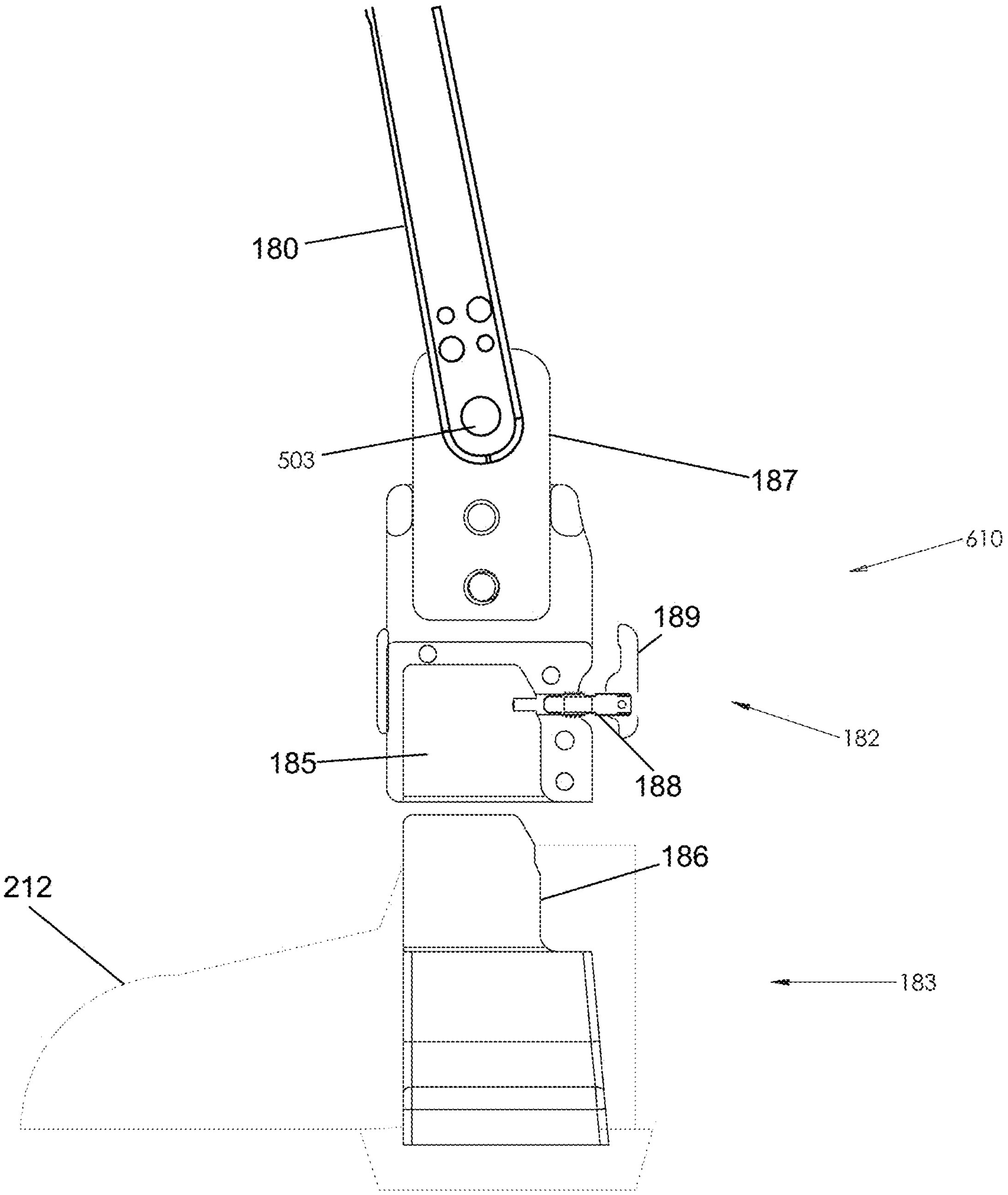
FIG. 18 shows an embodiment of the ankle exoskeleton of FIG. 16 further including a foot link mechanism and foot connector, shown as detached from one another.
Figure 22A:
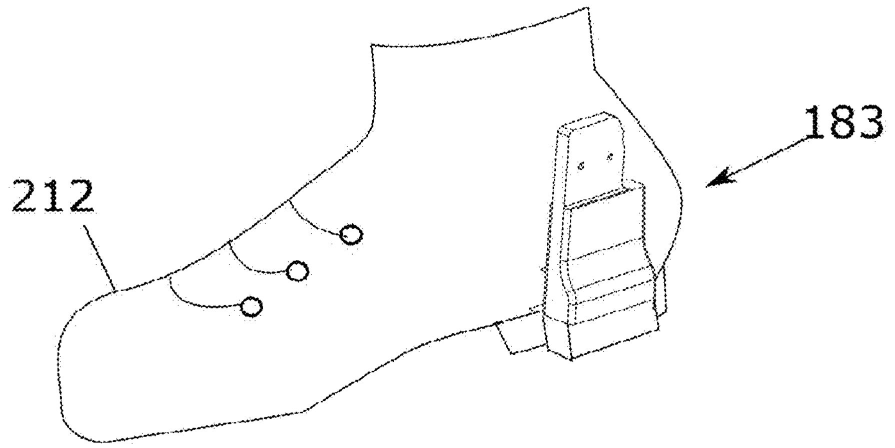
FIG. 22A shows an outer profile of one embodiment of the foot connector.
Figure 22B:
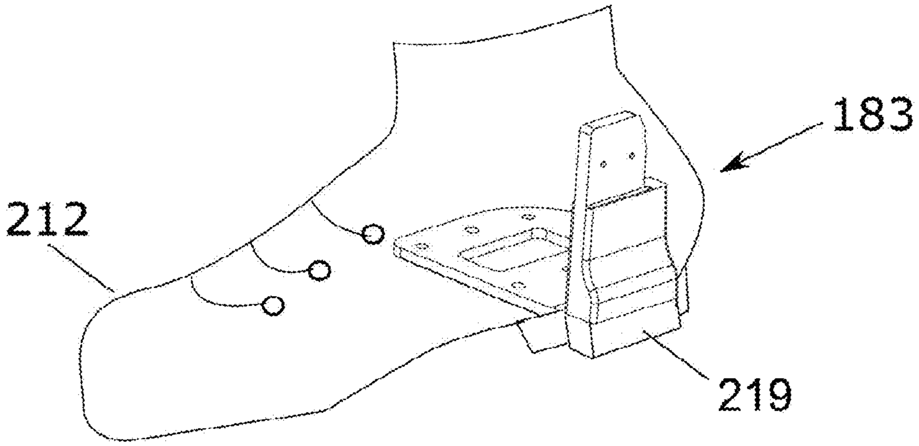
FIG. 22B depicts how the embodiment of FIG. 22A is configured to extend into a heel of the shoe.
Figure 22C:
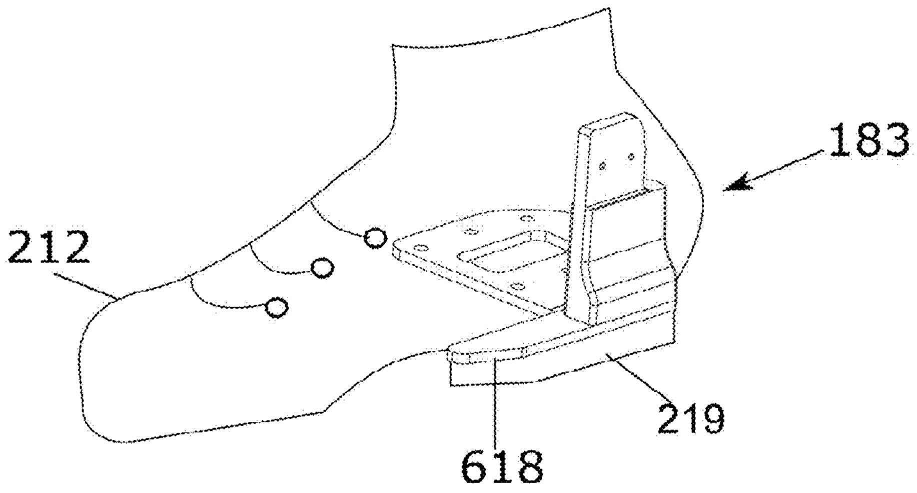
FIG. 22C presents a different embodiment of the foot connector as extending beyond the heel of the shoe.

FIG. 18 shows an embodiment of ankle exoskeleton 610 further comprising a foot link mechanism 182 and foot connector 183, shown as detached from one another, the details of which are described later. A section view of foot link mechanism 182 is shown in FIG. 18 for clarity and to explain internal components. Specifically, as shown in FIG. 18, in some embodiments, foot connector 183 is attached to a wearer's shoe 212. FIGS. 22A, 22B, and 22C show embodiments of a foot connector 183 of exoskeleton leg 100 of FIG. 1, as coupled to a wearer's shoe 212 configured to be worn by an intended wearer 200. FIG. 22A shows an outer profile of one embodiment of foot connector 183. FIG. 22B depicts how an embodiment of FIG. 22A is configured to extend into a heel of shoe 212. FIG. 22C shows a different embodiment of foot connector 183 as extending beyond the heel of the shoe. More specifically, FIG. 22A shows an embodiment where foot connector 183 is coupled to a wearer's shoe 212. In some embodiments foot connector 183 further comprises shoe ground connector 219, to transfer the load of exoskeleton leg 100 to the ground.

FIG. 22B shows an embodiment of FIG. 22A where foot connector 183 extends into a heel of wearer's shoe 212. A cut away view of wearer's shoe 212 is shown to make foot connector 183 inside wearer's shoe 212 visible for clarity.

By coupling foot connector 183 to wearer's shoe 212 in this way, wearer 200 may be coupled to the embodiment such that its supportive forces may be transferred to the ground, while wearer 200 may enjoy the comfort provided by use of a typical shoe.

In some embodiments, foot connector 183 extends beyond a heel of wearer's shoe 212. As seen in FIG. 22C, in some embodiments, foot connector 183 extends beyond a heel and is partially situated outside the shoe, foot link extension 618 of foot connector 183 does not extend to the ball of a wearer's foot 214. This permits wearer 200 to get on their toes without obstruction. In some embodiments, foot connector 183 is coupled to wearer's shoe 212 externally.

Figure 56:
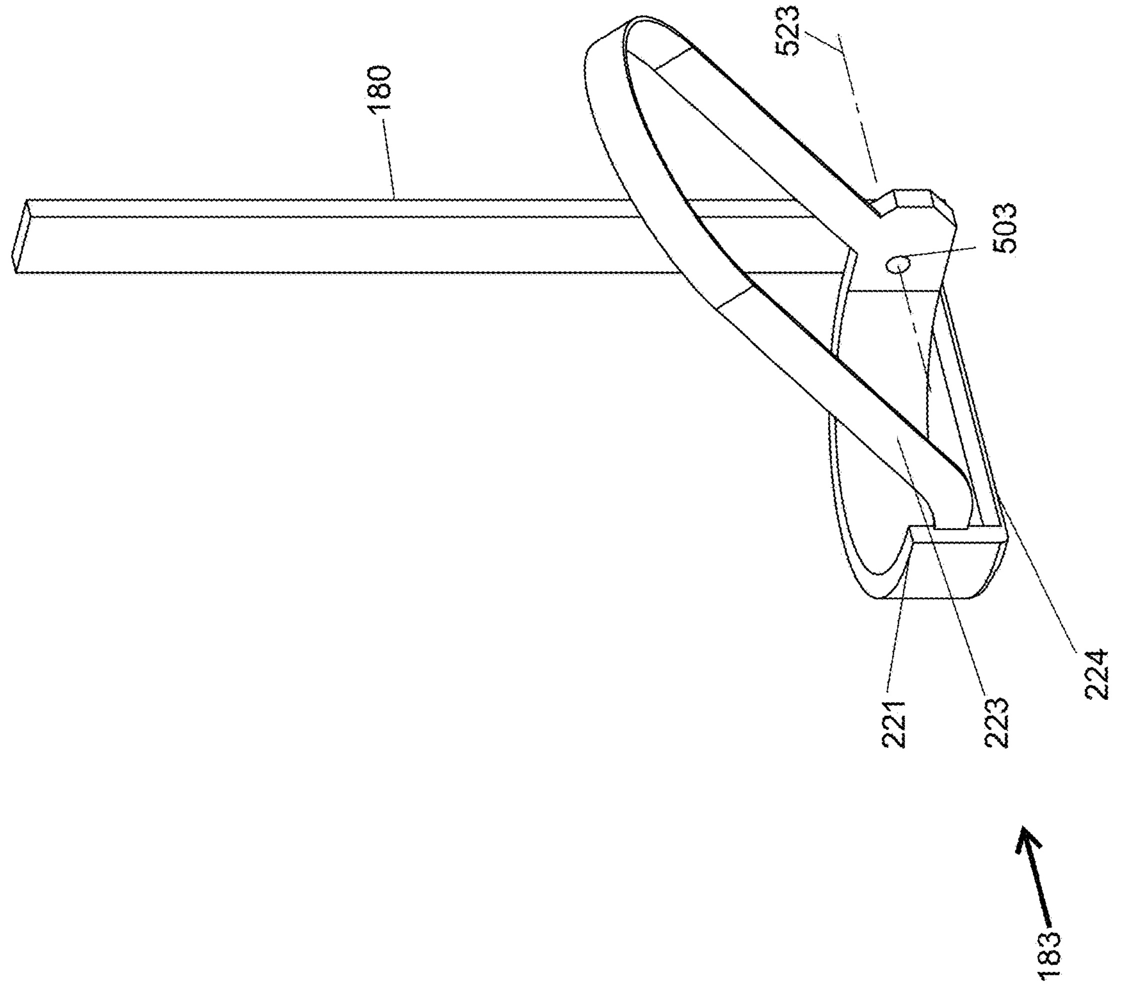
FIG. 56 shows another embodiment of the ankle exoskeleton external to the shoe.
Figure 57:
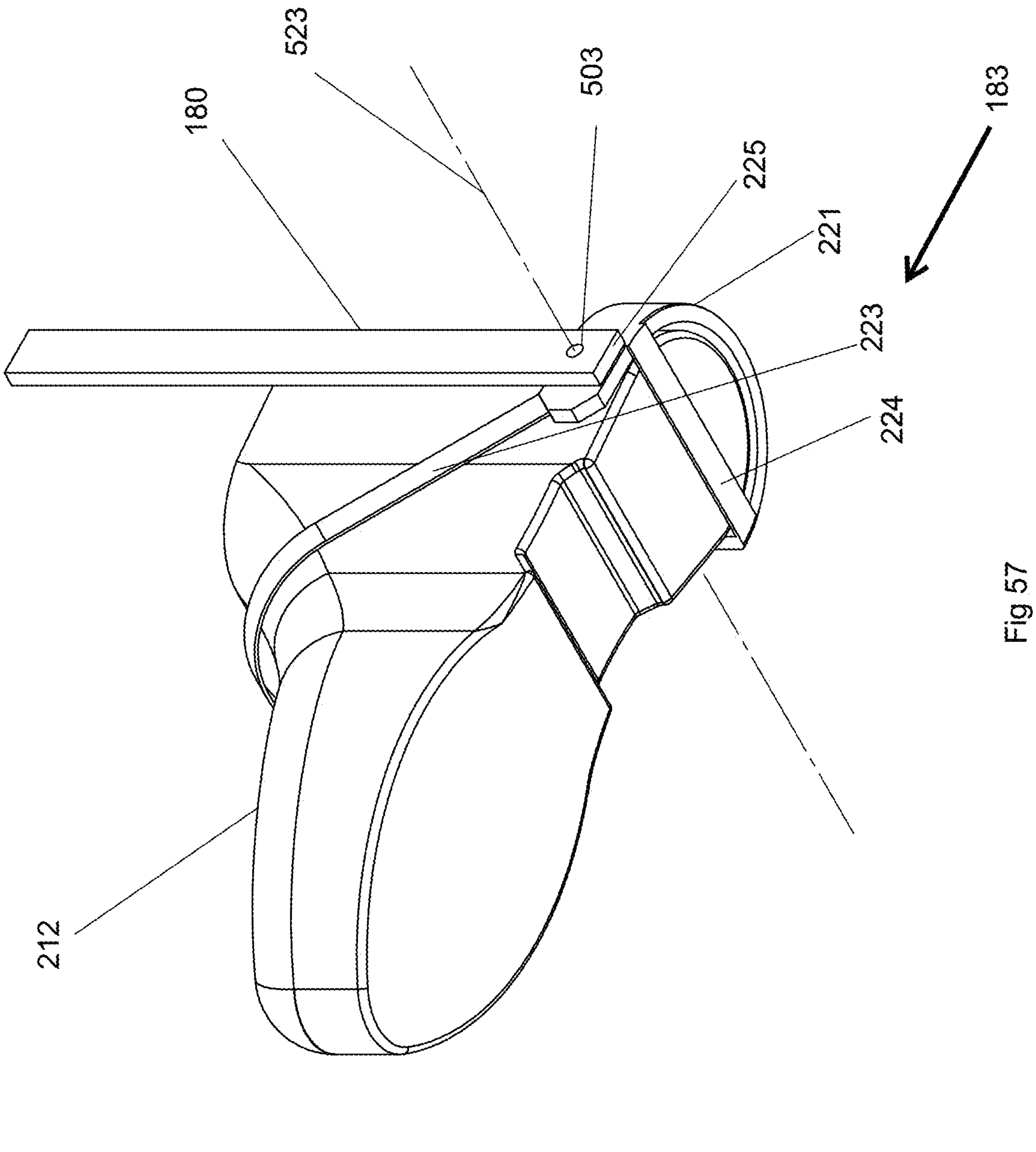
FIG. 57 shows another embodiment of the ankle exoskeleton external to the shoe with a shoe.

FIG. 56 and FIG. 57, show an embodiment of foot connector 183 that is configured to wrap around the heel of shoe 212 of the wearer 200. The embodiments of FIGS. 56 and 57, foot connector 183 comprises a heel cuff 221, over-shoe strap 223 and under-shoe catch 224. In some embodiments, first ankle link 180 is coupled to foot connector 183. In the embodiment of FIG. 57, ankle first link 180 is rotatably coupled to foot connector 183, at ankle plantar joint 503, allowing rotation along ankle plantar flexion axis 523. In the embodiment of FIG. 57, ankle first link 180 extends past ankle plantar joint 503 such that, when exoskeleton leg 100 is supporting wearer 200, ground connector 225 can come in contact with the ground. In some embodiments, foot connector 183 further comprises an over-shoe strap 223 to help with the connection of foot connector 183 to wearer's shoe 212. In some embodiments, foot connector 183 further comprises a under-shoe catch 224 to help with the connection of foot connector 183 to wearer's shoe 212.

In some embodiments, ankle exoskeleton 610 can be detached from a wearer's foot or a wearer's shoe 212. In some embodiments, foot connector 183 can be coupled and decoupled from the upper part of an ankle exoskeleton 610. In the embodiment of FIG. 19, ankle exoskeleton 610 comprises foot link mechanism 182. FIG. 18 also shows an embodiment where foot link mechanism 182 and foot connector 183 are detached.

A section view of foot link mechanism 182 is shown for clarity and to explain internal components in FIG. 18. As shown in FIG. 18, foot connector 183 comprises a male ankle boss 186. Moreover, foot link mechanism 182 comprises a female ankle boss 185, button interface 189 and spring pin 188. In operation, when male ankle boss 186 in foot link mechanism 182 interfaces with female ankle boss 185 in foot connector 183, a spring pin 188 enters a channel (not shown) in male ankle boss 186 and latches male ankle boss 186 with female ankle boss 185, thereby coupling foot link mechanism 182 relative to foot connector 183.

To release or detach foot link mechanism 182 from foot connector 183, button interface 189 is used to unlatch spring pin 188 with male ankle boss 186. The unlatching is achieved by interfacing the back of spring pin 188 with button interface 189 such that moving button interface 189 pushes spring pin 188 out of male ankle boss 186 in foot connector 183.

Figure 16:
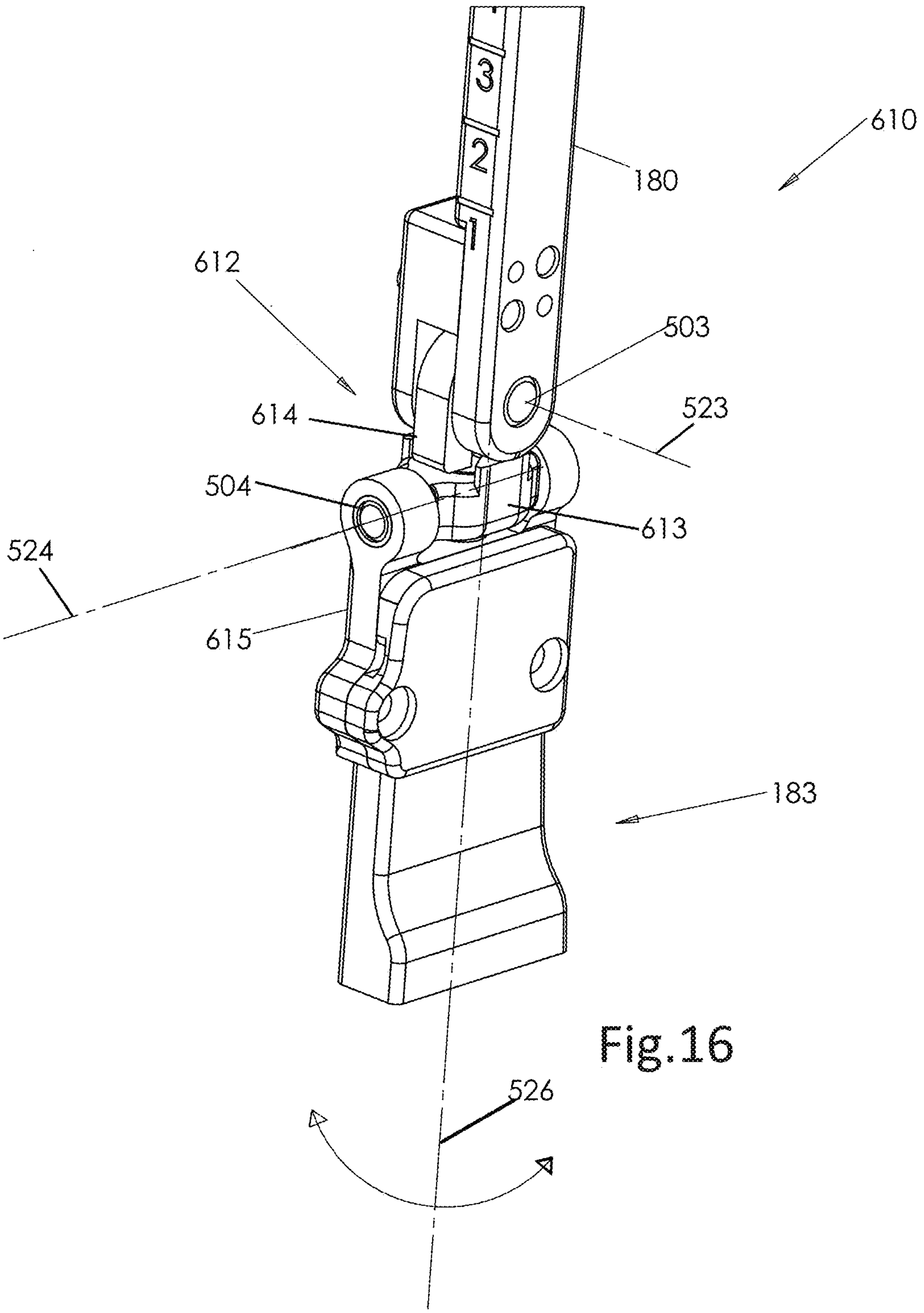
FIG. 16 shows an embodiment of an ankle exoskeleton component of the exoskeleton legs of FIG. 1, including an ankle eversion joint to allow for ankle inversion of a foot connector relative to the shank link.

FIGS. 15, 16, and 18 show three different embodiments of an ankle exoskeleton. A wearer's foot and wearer's shoe 212 are shown in FIG. 18 for clarity. More specifically, FIG. 15 shows an embodiment of an ankle exoskeleton 610 of exoskeleton leg 100 of FIG. 1, comprising an ankle eversion joint 504 to allow for ankle eversion and inversion of foot connector 183 relative to shank link 102. Provision of ankle exoskeleton 610 allows substantial range of motion to wearer's ankle 220 during certain tasks, while still sufficiently coupling the embodiment to wearer 200 such that wearer 200 may be supported by the embodiment.

The interface between ankle first link 180, which is an extension of shank link 102, and foot connector 183 can allow for various rotational degrees of freedom. These degrees of freedom can be achieved through the use of compliant materials or combinations of compliant and non-compliant materials.

As shown in FIG. 15, in some embodiments, ankle exoskeleton 610 comprises an ankle plantar joint 503 allowing ankle dorsiflexion and plantar flexion of foot connector 183 relative to shank link 102. Ankle dorsiflexion and plantar flexion are shown in FIG. 28 and FIG. 29 respectively. Ankle plantar flexion axis 523 represents dorsiflexion and plantar flexion motion of foot connector 183 relative to shank link 102.

FIG. 15 also shows an embodiment of ankle exoskeleton 610 further comprising an ankle second link 612, which is rotatably coupled to ankle first link 180 (shank link 102) at ankle plantarjoint 503, and is rotatably coupled to ankle mechanism 615 at ankle eversion joint 504. In the embodiment of FIGS. 15 and 16, ankle mechanism 615 includes foot link mechanism 182. In the embodiment in FIG. 15, a compliant bushing 616 is present along ankle eversion joint 504. In some embodiments, compliant bushing 616 is a soft material such that it allows for ankle abduction and allows ankle adduction when ankle mechanism 615 twists relative to ankle second link 612. The twisting motion occurs along ankle rotation axis 526. This motion occurs via compression of compliant bushing 616. It can be appreciated that the soft bushing can be placed along ankle plantarjoint 503 to permit ankle rotation. Provision of said ankle elements allows full range of motion to wearer's ankle 220 during certain tasks, while still sufficiently coupling the embodiment to wearer 200 such that wearer 200 may be supported by the embodiment.

Figure 17:
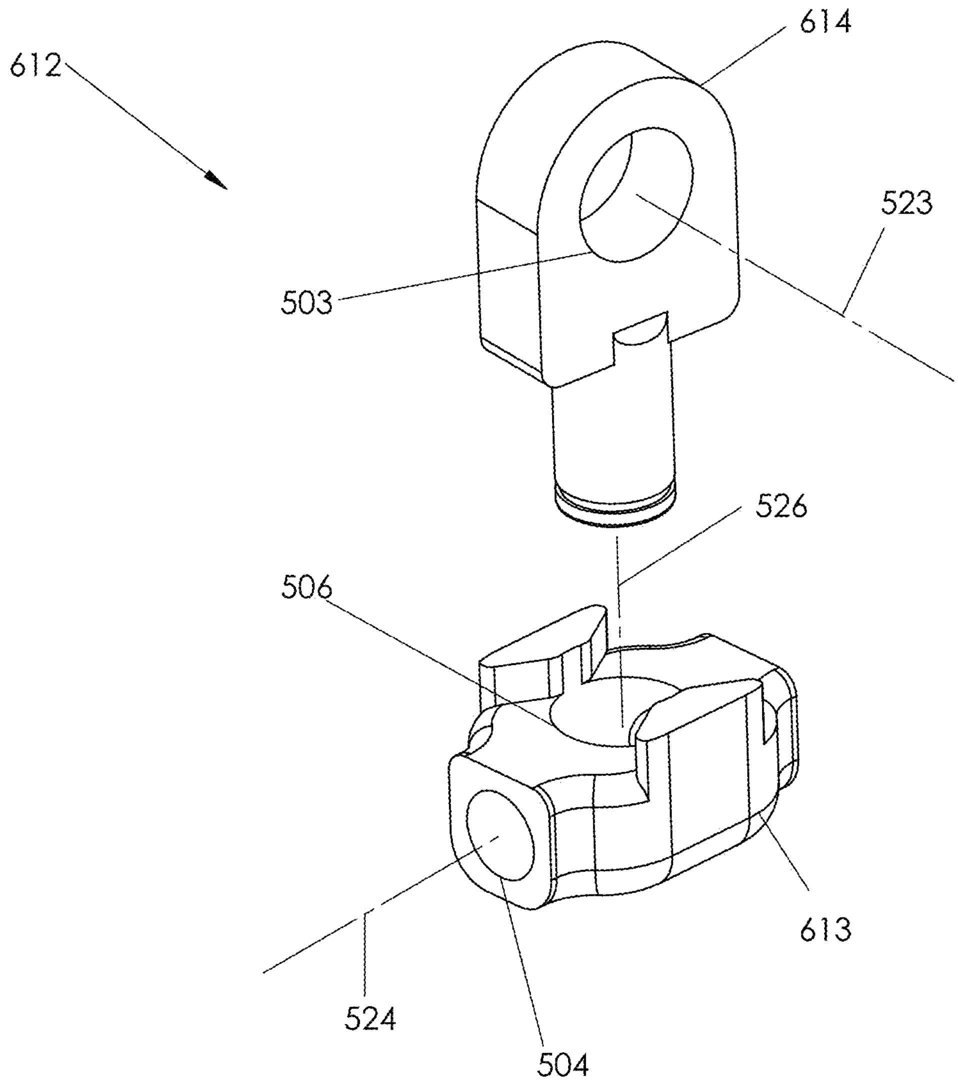
FIG. 17 shows an exploded partial view of an embodiment of the ankle exoskeleton of FIG. 16, including an ankle rotation joint to allow for ankle rotation of the foot connector relative to shank link.

FIGS. 16 and 17 show an embodiment of ankle exoskeleton 610, further comprising an ankle rotation joint 506 to allow for ankle rotation of foot connector 183 relative to shank link 102. Specifically, in the embodiment of FIG. 16 and FIG. 17, ankle exoskeleton 610 comprises an ankle rotation joint 506 allowing ankle rotation of foot connector 183 relative to shank link 102. Ankle rotation axis 526 represents rotation motion of shank link 102 relative to foot connector 183.

FIGS. 16 and 17 show an embodiment wherein ankle second link 612 comprises ankle eversion link 613 and ankle plantar link 614, such that ankle plantar link 614 is rotatably coupled to ankle first link 180 at ankle plantar joint 503, and ankle plantar link 614 is rotatably coupled to ankle eversion link 613 at ankle rotation joint 506. Ankle eversion link 613 is further rotatably coupled to ankle mechanism 615, at ankle eversion joint 504, to allow ankle eversion and ankle inversion. For clarity, FIG. 17 generally illustrates ankle inversion/eversion, and generally illustrates ankle rotation.

In some embodiments, ankle exoskeleton may be comprised of compliant and rigid elements to provide ankle plantar and dorsiflexion, ankle inversion and eversion, and ankle rotation.

Figure 39:
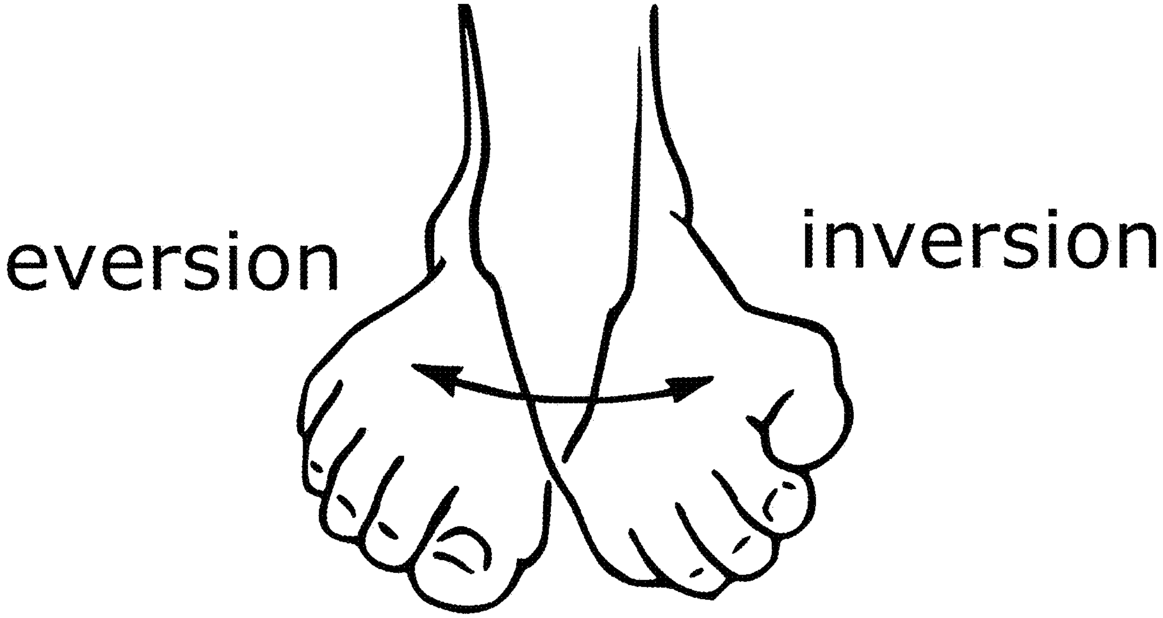
FIG. 39 shows ankle inversion and eversion in an intended wearer.
Figure 40:
FIG. 40 shows ankle foot rotation in an intended wearer.
Figure 40:

FIG. 18 shows an embodiment where ankle exoskeleton 610 comprises a compliant ankle 187 with ankle plantar joint 503, which is rotatably coupled to ankle first link 180 to allow plantar flexion and dorsiflexion. Compliancy of compliant ankle 187 is configured to allow ankle inversion and eversion (as shown in FIG. 39) and ankle rotation (as shown in FIG. 40). In some embodiments, ankle rotation joint 506 is spring loaded such that it has a predetermined neutral position.

Figure 58:
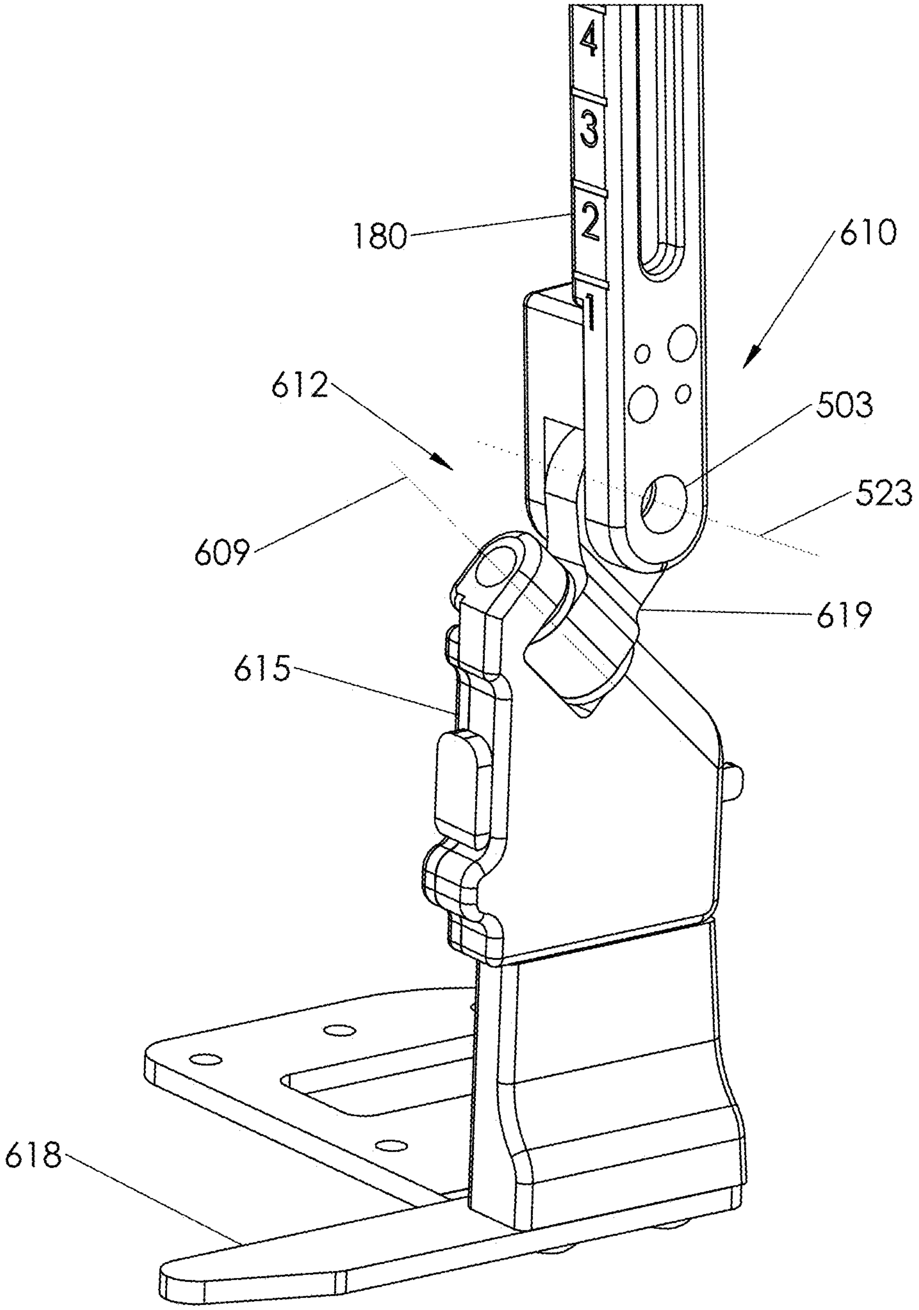
FIG. 58 shows another embodiment of an ankle exoskeleton with a combined ankle rotation joint.

FIG. 58 shows an embodiment of ankle exoskeleton 610, further comprising a combination ankle rotation joint 619 to allow for ankle rotation between foot connector 183 relative to shank link 102 along a combination ankle rotation axis 609.

FIG. 58 also shows an embodiment of ankle exoskeleton 610 further comprising an ankle second link 612, which is rotatably coupled to ankle first link 180 (shank link 102) at ankle plantar joint 503, and is rotatably coupled to ankle mechanism 615 at combination ankle rotation joint 619.

In some embodiment, combination ankle rotation axis 609 can be selected and adjusted by the wearer 200. FIG. 58 shows an embodiment of ankle exoskeleton 610 where combination ankle rotation joint 619 has a predetermined axis of rotation that is oriented approximately halfway in between ankle eversion axis 524 and ankle rotation axis 526. It will be appreciated that said combination ankle rotation joint 506 and ankle rotation axis 526 can have a variety of different orientations.

Figure 14A:
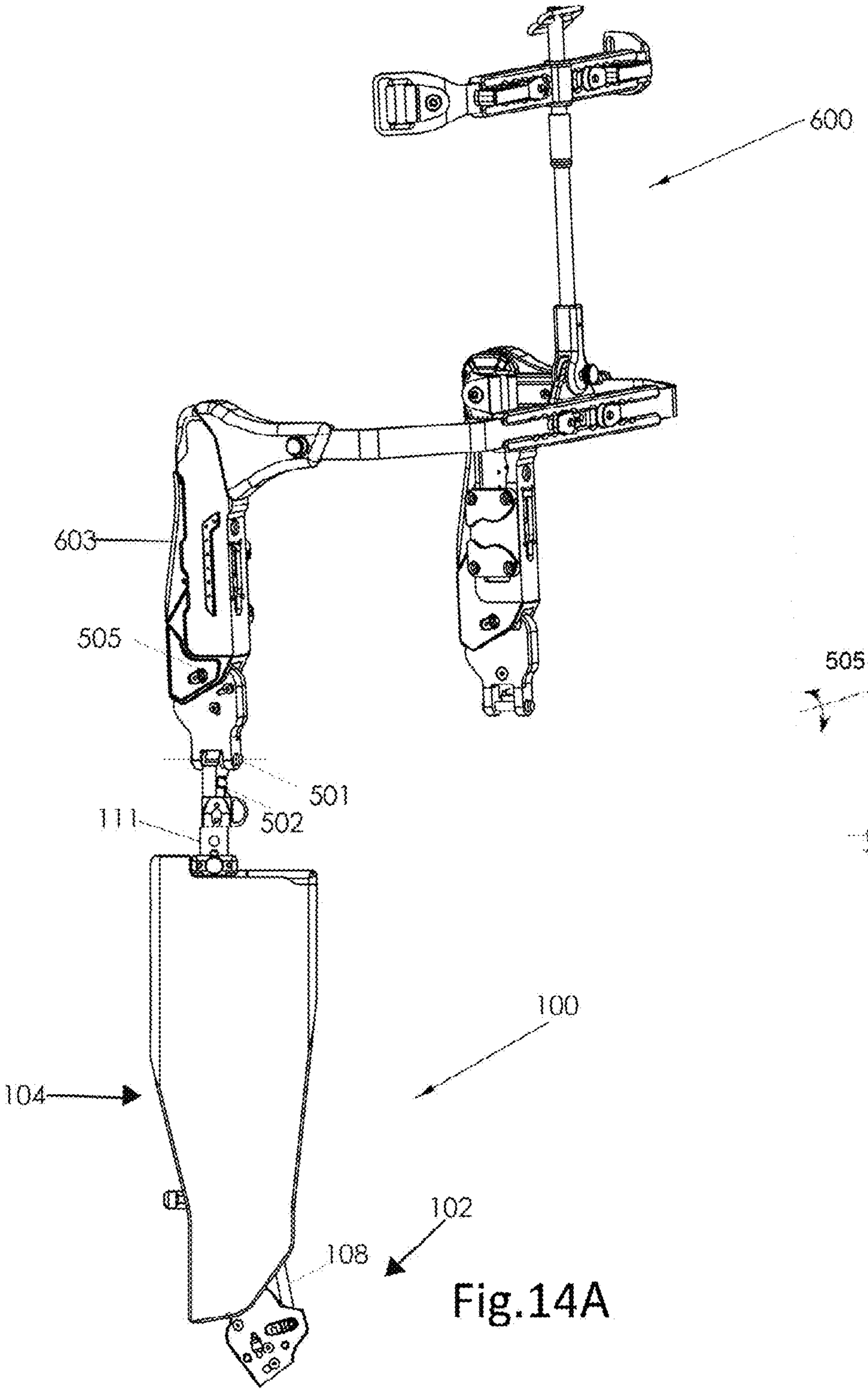
FIG. 14A shows a close-up view of another embodiment.
Figure 14B:
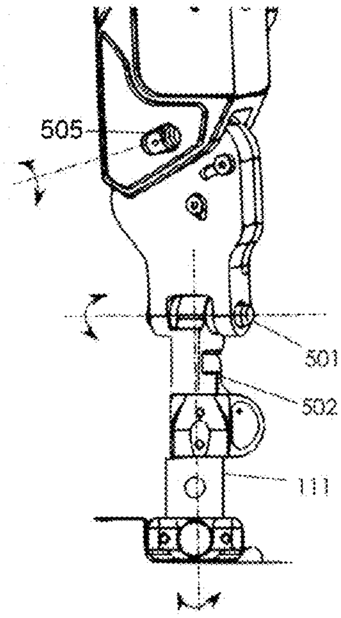
FIG. 14B shows a partial view of another embodiment.

In some embodiments, at least one exoskeleton leg (100 and/or 101) is coupled to a torso exoskeleton 600. An example of this is seen in FIG. 14A and FIG. 14B. In some embodiments, torso exoskeleton 600 is coupled to thigh link 104. In some embodiments, thigh link 104 includes thigh extension link 111, which extends the length of thigh link 104.

Torso exoskeleton 600 can have various forms and shapes. In some embodiments, torso exoskeleton 600 can be a belt. In various embodiments, exoskeleton leg 100 is configured to allow for flexion and extension movements of a wearer's leg. Exoskeleton leg 100 also may allow for abduction and adduction of movements of the wearer's leg. Exoskeleton leg 100 further may allow for rotational movements of the wearer's leg.

FIGS. 14A and 14B also show an embodiment where exoskeleton leg 100 further comprises hip flexion-extension joint 505, allowing for flexion and extension of exoskeleton leg 100 relative to torso exoskeleton 600. An example of hip flexion is shown in FIG. 26. FIGS. 14A and 14B also show an embodiment where exoskeleton leg 100 further comprises hip abduction-adduction joint 501, allowing for abduction and adduction of exoskeleton leg 100 relative to torso exoskeleton 600. An example of hip abduction is shown in FIG. 25. FIGS. 14A and 14B further show an embodiment where exoskeleton leg 100 further comprises hip rotation joint 502, allowing for rotation of exoskeleton leg 100 relative torso exoskeleton 600. An example of hip rotation is depicted in FIG. 27.

FIGS. 14A and 14B also show close-up and partial views of another embodiment, where each exoskeleton leg further comprises: (1) a hip abduction-adduction joint 501 to allow for abduction and adduction of exoskeleton leg 100 relative to a torso component; (2) a hip flexion-extension joint 505 to allow for flexion and extension of the exoskeleton leg 100 relative to a torso component (as shown in FIG. 14A); and (3) a hip rotation joint 502 to allow for rotation of exoskeleton leg 100 relative to the torso component (as shown in both FIG. 14A and FIG. 14B). These joints are intended to allow wearer 200 full range of motion, while still enabling embodiments disclosed herein to provide support to wearer 200.

FIGS. 14A and 14B further show an embodiment wherein thigh extension link 111 is coupled to an embodiment of torso exoskeleton 600. In some embodiments of the disclosure, the coupling between torso exoskeleton 600 and exoskeleton leg 100/101 allows the embodiment to provide support to wearer 200 at the knee, and also support the wearer at the hip or torso. In some embodiments, coupling between thigh extension link 111 and torso exoskeleton 600 may be used to provide support to the wearer's back, thereby reducing their back muscle fatigue during certain tasks, by providing a torque about at least one of wearer's hips. In embodiments, where exoskeleton leg 100 is coupled to the ground, the weight of the torso exoskeleton 600 and all items attached to it is transferred to the ground thereby alleviating strain on wearer 200.

In still other embodiments, torso exoskeleton 600 may be coupled to an arm support exoskeleton, which may be used to provide support to at least one of the wearer's shoulders, thereby reducing their shoulder muscle fatigue during certain tasks, by providing a torque about at least one of wearer's shoulders 222.

In some embodiments, the exoskeleton leg 100 may be coupled to an arm support exoskeleton, configured to support the wearer's shoulders during overhead tasks and maneuvers. In some embodiments of the disclosure, exoskeleton leg 100 may be coupled to an arm support exoskeleton through a torso exoskeleton 600. In some embodiments of the disclosure, exoskeleton leg 100 can be worn in conjunction with an arm support exoskeleton. In some embodiments of the disclosure, exoskeleton leg 100 can be worn in conjunction with an exoskeleton torso.

Figure 45:
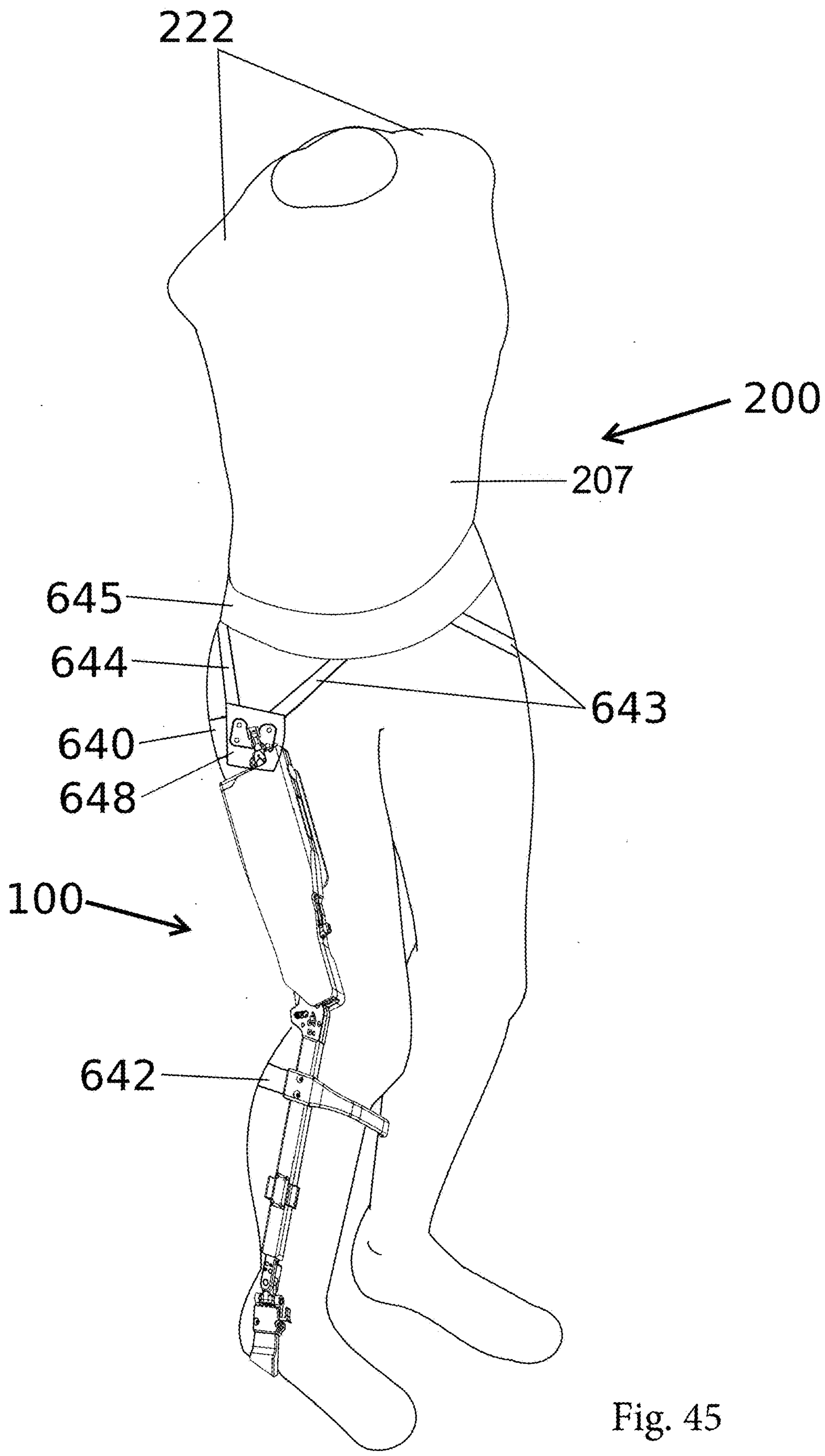
FIG. 45 shows a wearer coupled to the exoskeleton leg 100 using a human machine interface.
Figure 46:
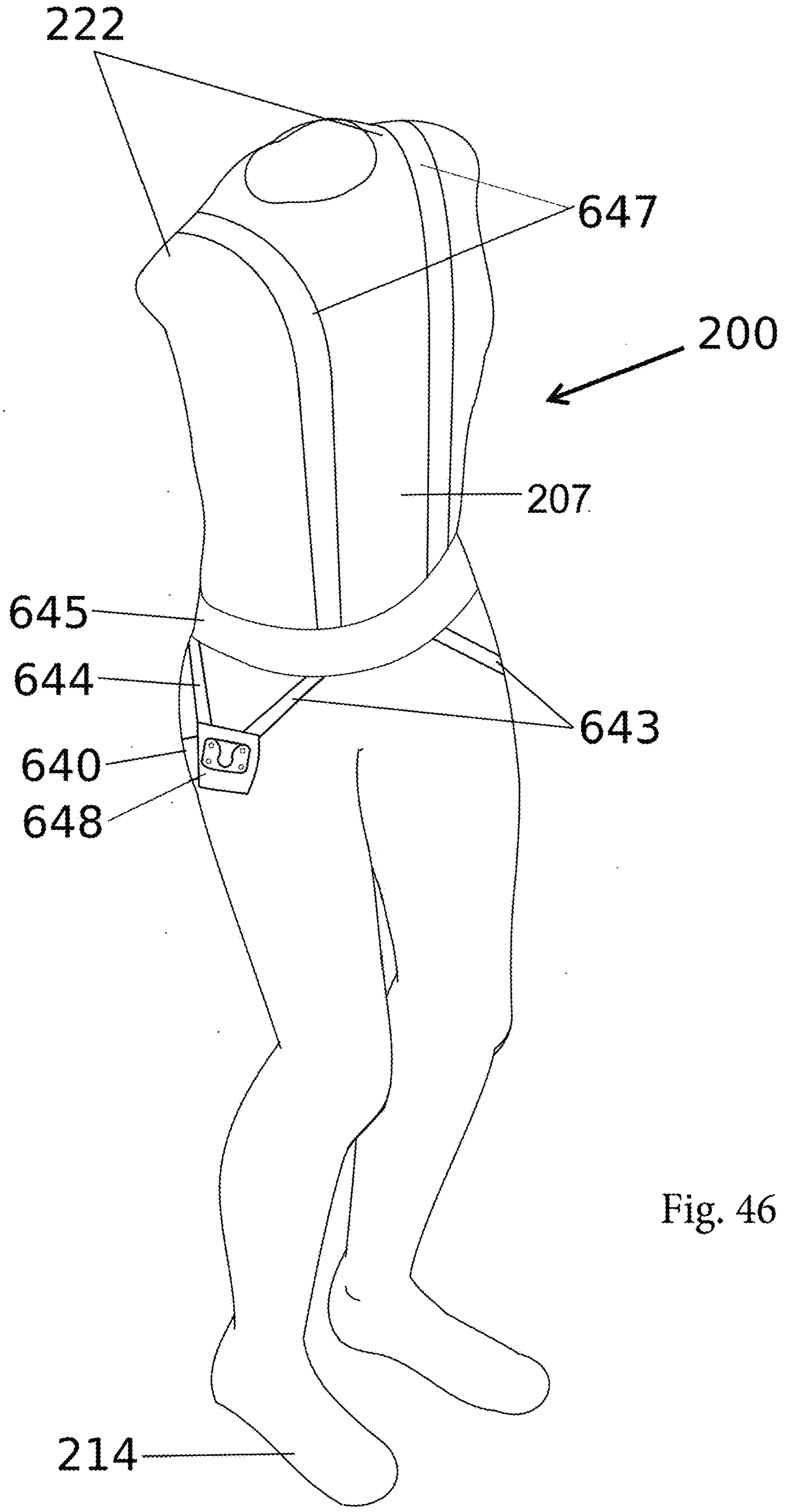
FIG. 46 shows a front view human machine interface on a user.
Figure 47:
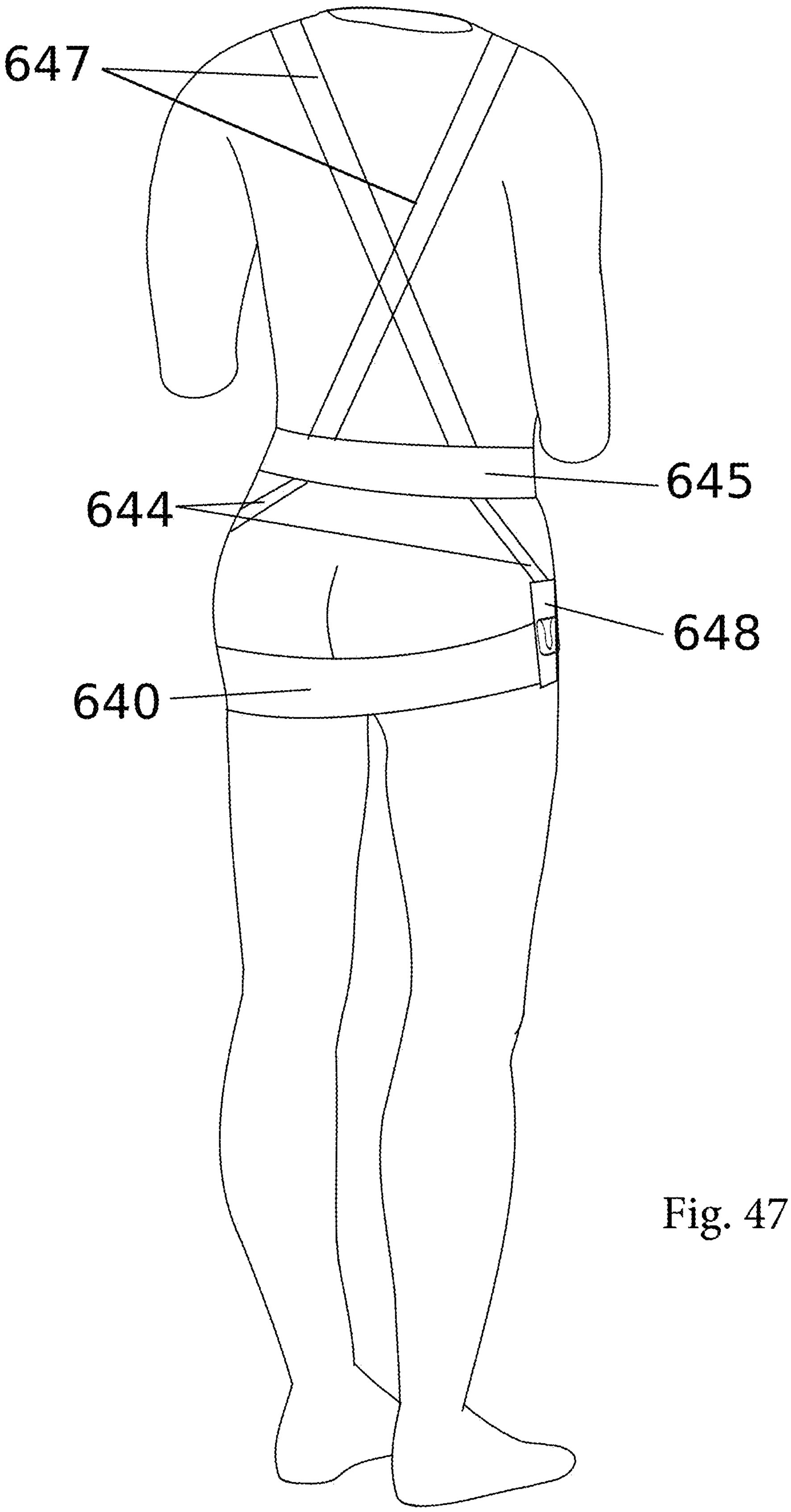
FIG. 47 shows a rear view human machine interface on a user.

In some embodiments, exoskeleton legs (100 and 101) can be configured to be coupled to a wearer's upper body. In some embodiments, exoskeleton legs 100 and 101 may be coupled to a wearer's waist via a belt 645, as shown in FIG. 45. In some embodiments, exoskeleton legs 100 and 101 couple to a wearer's upper body via shoulder straps 647 (FIG. 46). Several combinations of soft and hard attachments can be used to achieve each of these couplings. Such coupling may be used to transfer the load between wearer 200 to exoskeleton leg 100/101 or to couple the exoskeleton leg to the wearer.

FIG. 45 is an illustration of a human machine interface 639 for attaching exoskeleton leg 100 to a wearer 200. FIG. 45 comprises of a waist belt 645, thigh clip 648, front hip strap 643, back hip strap 644, and butt pad 640. In some embodiments, human machine interface 639 may further comprise at least one shin strap 642. In some embodiments of the disclosure, human machine interface 639 comprises at least one waist belt 645, at least thigh clip 648, at least one front hip strap 643, at least one back hip strap 644, at least one butt pad 640 and at least one shin strap 642.

Exoskeleton leg 100 consists of a thigh link 104 and a shank link 102. In some embodiments, thigh link 104 may be configured to move in unison with a wearer's thigh 204. In some embodiments, shank link 102 may be configured to move in unison with a wearer's shank 206. FIG. 45 shows an example of an embodiment configured to harness the exoskeleton leg 100, so that thigh link 104 can move in unison with wearer's thigh 204. The butt pad is configured to couple knee flexion of wearer with knee flexion of at least one exoskeleton leg 100.

Figure 31:
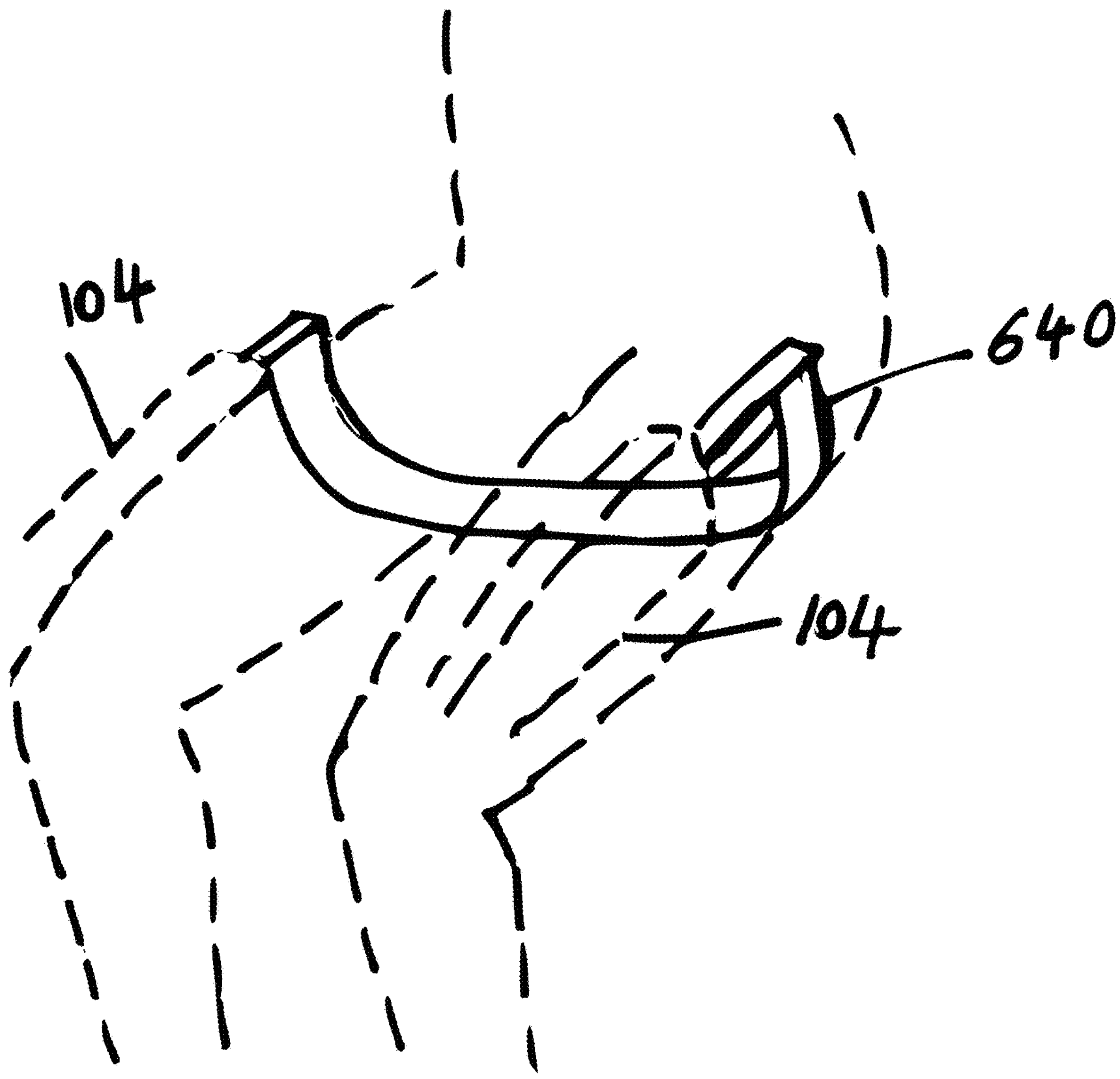
FIG. 31 shows an embodiment which includes a butt strap coupled to the exoskeleton legs of FIG. 1.

FIG. 31 shows an embodiment where butt pad 640 is configured to be coupled to thigh link 104. In some embodiments, butt pad 640 is coupled to thigh extension link 111. In some embodiments, butt pad 640 is coupled to thigh link 104 of exoskeleton leg 100 on one end of butt pad 640 and the thigh link of exoskeleton leg 101 at the other end of butt pad 640. In some embodiments, one end of butt pad 640 is connected to thigh link 104 of exoskeleton leg 100 and the other end of butt pad 640 is attached the wearers contralateral leg 210. In some embodiments, the other end of butt pad 640 may be coupled to the wearer's hip.

Figure 30:
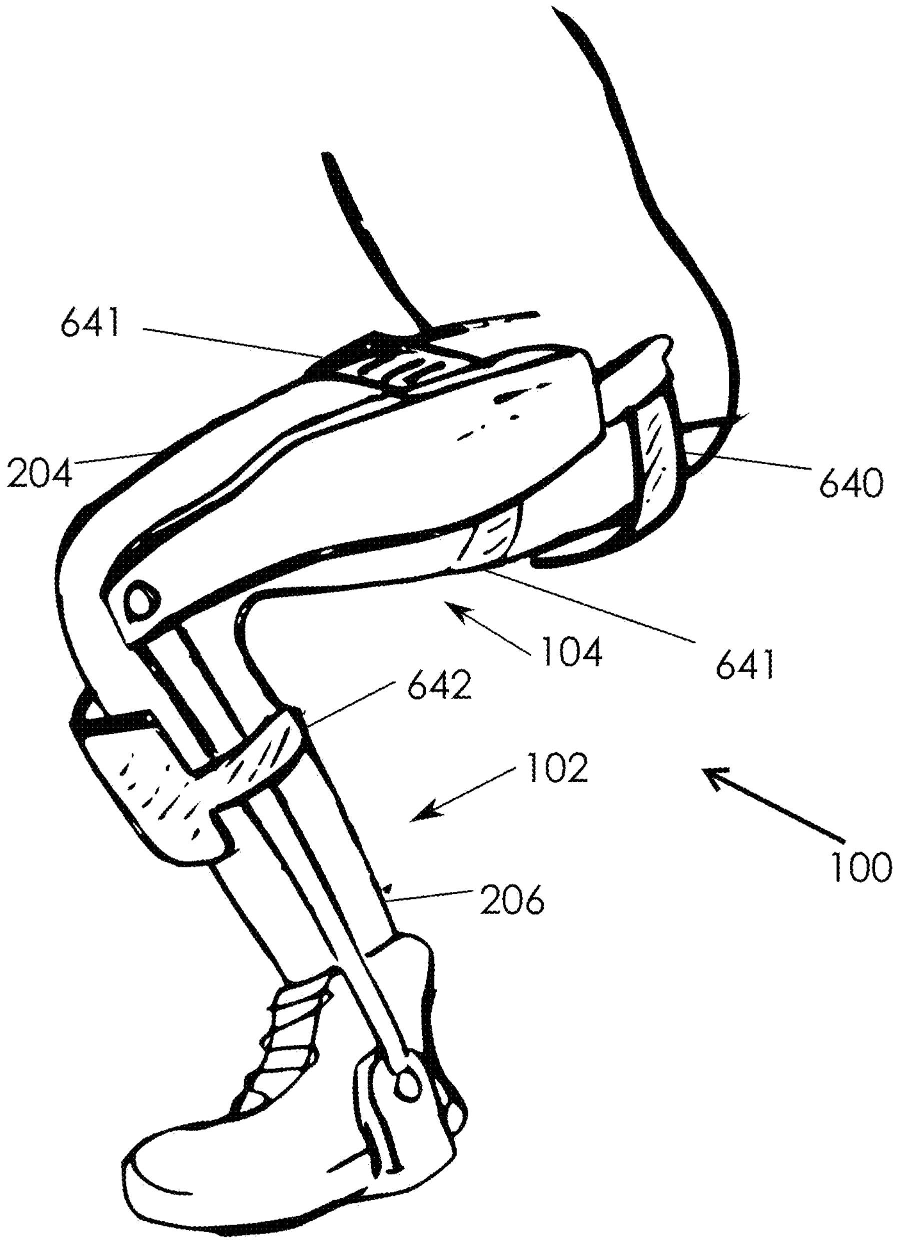
FIG. 30 shows an embodiment, wherein a thigh strap couples the thigh link of the exoskeleton leg of FIG. 6 to a thigh, and a shank strap couples the shank link of the exoskeleton leg to a shank of the wearer.

FIG. 30 further shows butt pad 640, which is positioned under the wearer's buttocks. In some embodiments, the location of butt pad 640 may be adjusted by adjusting thigh extension link 111 such that butt pad 640 is under the wearer's buttocks. Butt pad 640 transfers the wearers load to the exoskeleton leg 100, thereby allowing the wearer 200 to use the exoskeleton leg 100 like a seat of a chair. In some embodiments, butt pad 640 serves to transfer support between wearer 200 and exoskeleton leg 100.

FIG. 31 shows an embodiment comprises a butt pad 640 coupled to the exoskeleton legs of FIG. 1. Specifically, FIG. 31 shows an embodiment wherein butt pad 640 is coupled to exoskeleton leg 100 and exoskeleton leg 101 (other elements of the exoskeleton leg 100 and exoskeleton leg 101 are not shown for the purposes of clarity).

Figure 32A:
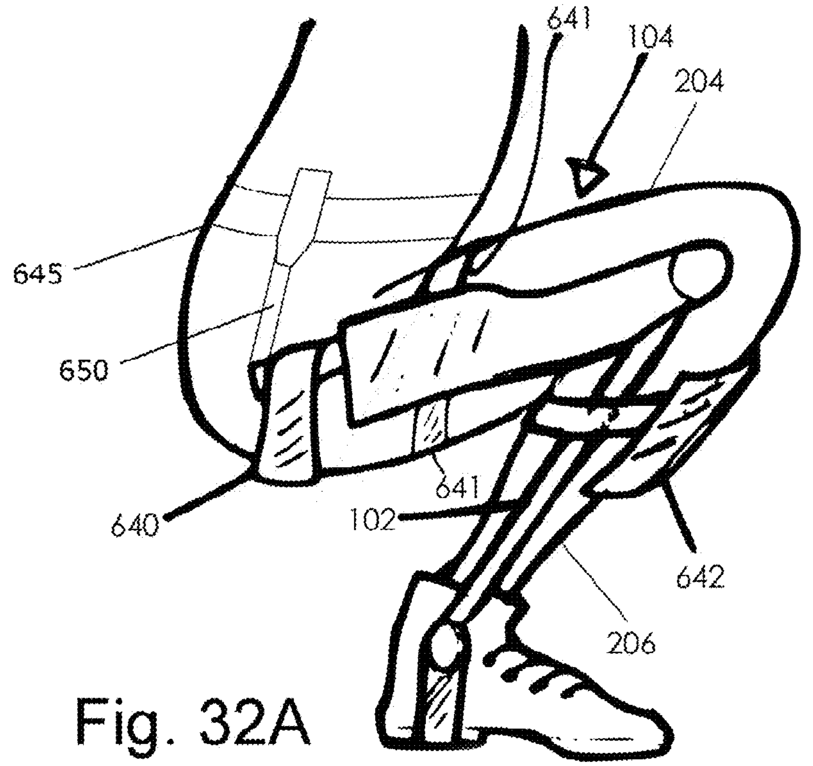
FIG. 32A shows an embodiment with a flexible belt attachment coupling the butt strap to the wearer and an exoskeleton leg.
Figure 32B:
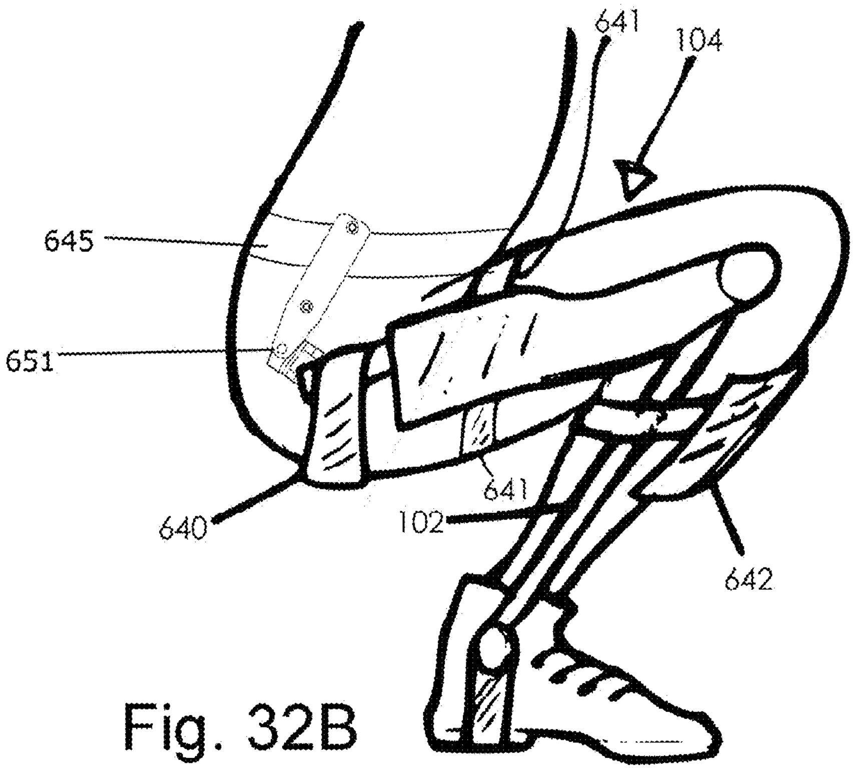
FIG. 32B shows an embodiment with a rigid belt attachment coupling the butt strap to the wearer and the exoskeleton leg.

FIGS. 32A and 32B show an embodiment of FIG. 31, configured so that when a wearer 200 is in a squatting position, butt pad 640 supports the wearer and prevents further motion in flexion direction. FIG. 32 further shows an embodiment comprising an integrated thigh strap 641. In some embodiments, butt pad 640 serves to transfer at least a portion of external loads to exoskeleton leg 100. In some embodiments, butt pad 640 may be used to transfer the load between the wearer 200 to exoskeleton leg 100/101. More specifically, FIG. 32*a* and FIG. 32*b* show the wearer in a squatting position, where butt pad 640 acts like a seat for the wearer to sit on when exoskeleton legs 100 and 101 are flexed, and preventing further motion in flexion direction 120.

In some embodiments, butt pad 640 is coupled to exoskeleton leg 100 using a flexible attachment (FIG. 32 (*a*)). In some embodiments, also not shown, butt pad 640 is coupled to exoskeleton leg 100 using a rigid attachment (FIG. 32 (*b*)).

Figure 48:
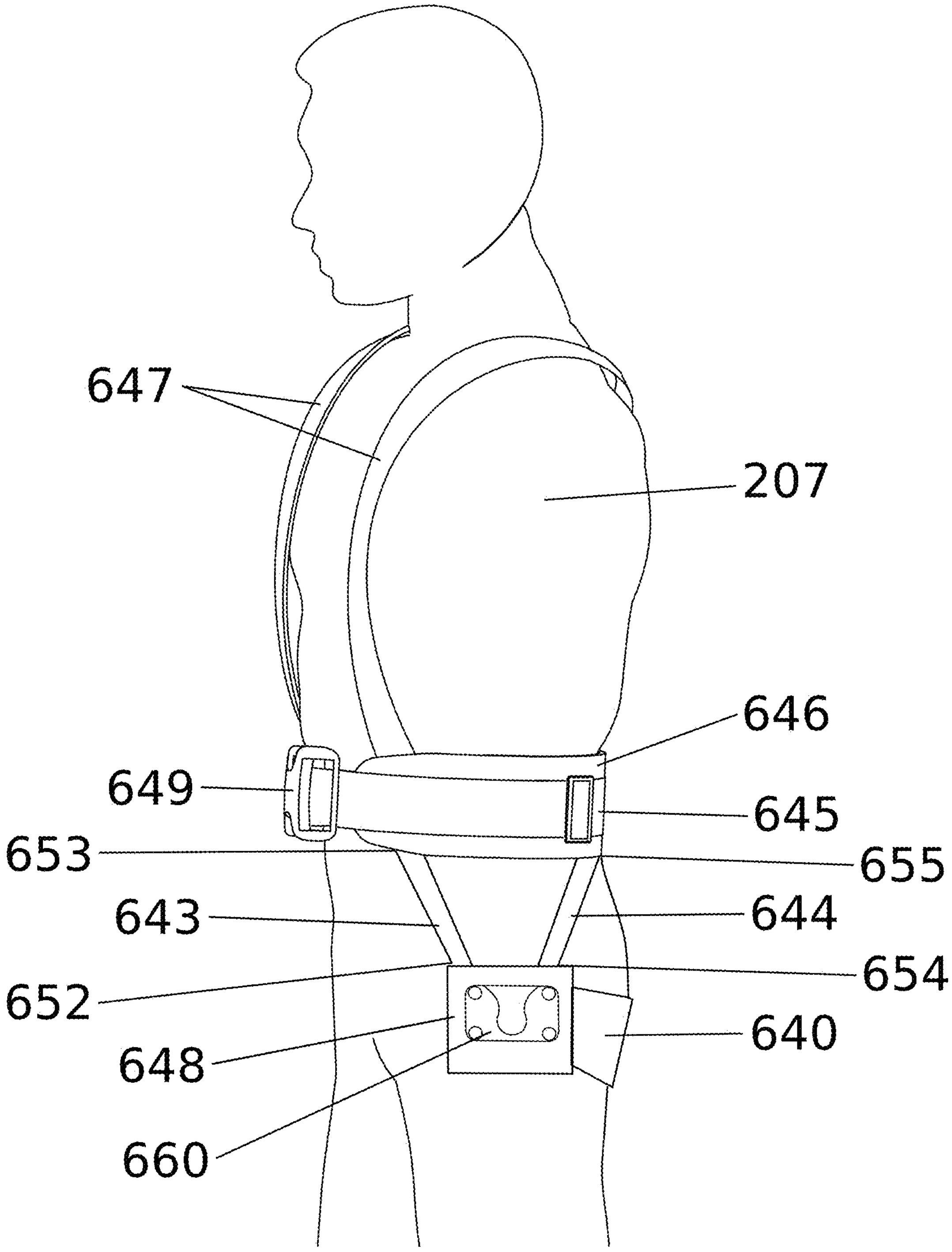
FIG. 48 shows a side view human machine interface on a user.

Some embodiments of exoskeleton leg 100 consist of a waist belt component 645. Waist belt 645 is configured to transfer the weight of exoskeleton leg 100 onto the wearer's hips. In some embodiments, waist belt 645 has waist belt padding 646 as shown in FIG. 48. In some embodiments, waist belt padding 646 is separated into two parts that sit on the wearer's hips. In some embodiments, the length of waist belt 645 may be adjusted in the front and or the back of the wearer. In some embodiments, waist belt 645 may be quickly connected or disconnected in the front of the wearer by mechanisms such as but not limited to a buckle or latch 649. In some embodiments, as shown in FIG. 32A waist belt 645 is coupled to at least one thigh link using a flexible belt attachment.

FIG. 32A shows an embodiment with a flexible belt attachment 650 coupling waist belt 645 to wearer 200 and an exoskeleton leg 100. FIG. 32B shows an embodiment with a rigid belt attachment 651 coupling waist belt 645 to wearer 200 and exoskeleton leg 100. In some embodiments, the belt attachment may be a combination of flexible straps and rigid components. In some embodiments, as shown in FIGS. 30 and 32, exoskeleton legs further include integrated thigh strap 641. The thigh strap 641 couples thigh link 104 to wearer's thigh 204.

Figure 55:
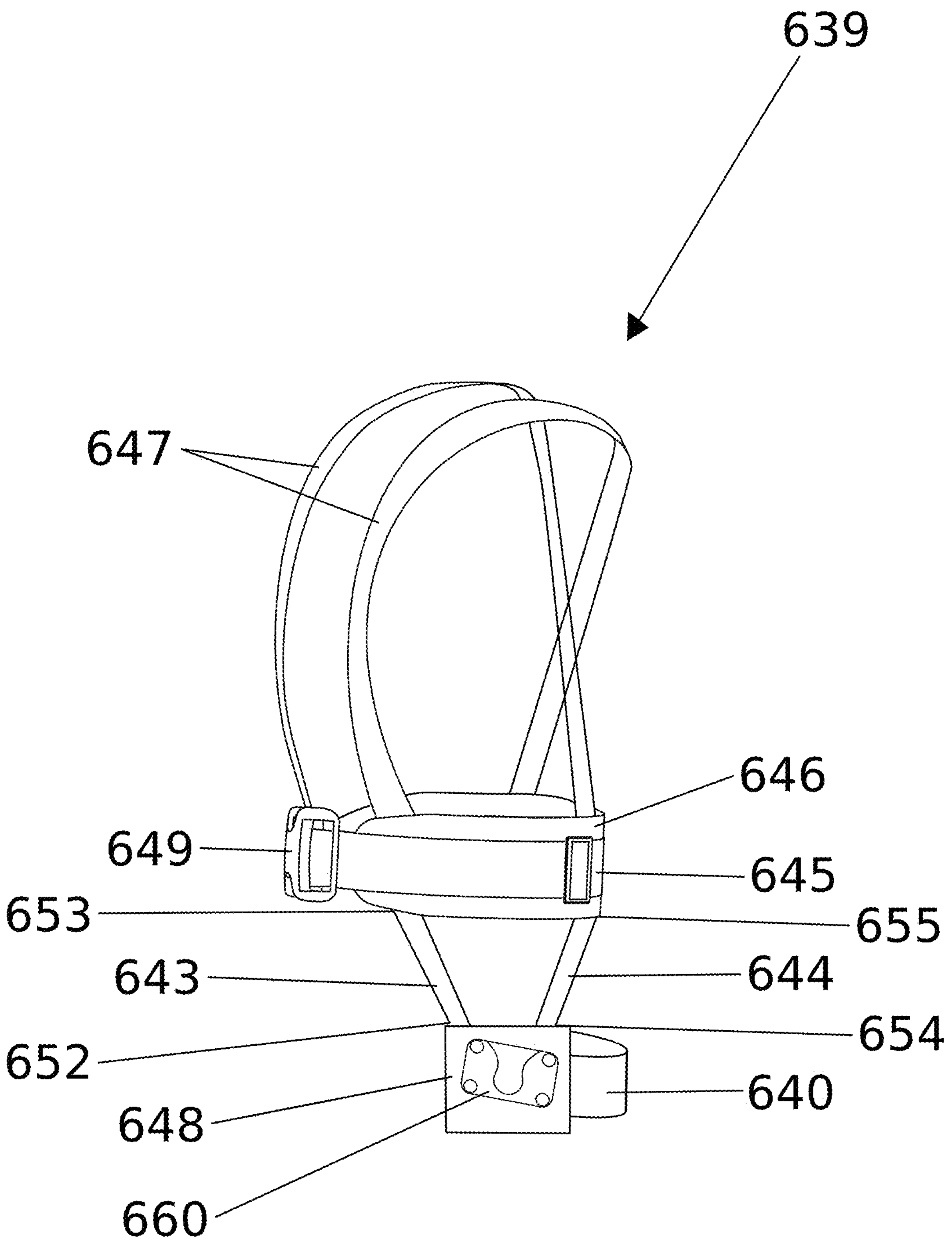
FIG. 55 shows components of the human machine interface.

In some embodiments, a human machine interface, such as human machine interface 639 shown in FIGS. 46 and 55, includes shoulder straps 647 which may transfer a portion of the weight of exoskeleton leg 100 onto wearer's shoulders 222.

FIG. 30 shows an embodiment where a thigh strap 641 couples a thigh link of exoskeleton leg 100 of FIG. 6 to a wearer's thigh 204 of a wearer 200, and a shank strap 642 couples a shank link 102 of the exoskeleton leg of FIG. 6 to a shank of the wearer. More specifically, in some embodiments, exoskeleton legs 100 are secured to a wearer at the wearer's shanks (e.g. 206) and the wearer's thigh (e.g. 204). FIG. 30 shows an embodiment where a thigh strap 641 couples thigh link 104 of exoskeleton leg 100 to wearer's thigh 204, and shin strap 642 couples shank link 102 of the exoskeleton leg to wearer's shank 206. Shin strap 642 and thigh strap 641 can be a combination of hard and soft elements.

Accordingly, some embodiments of exoskeleton leg 100 include at least one shin strap 642. Shin strap 642 is configured to couple exoskeleton shank link 102 to the wearer's shank 206. In some embodiments, shin strap 642 may be composed of hard components to provide support to wearer 200. In some embodiments, shin strap 642 is connected directly to shank link 102 of exoskeleton leg 100. In some embodiments, shin strap 642 may be composed of soft compliant components i.e. non-rigid components to provide support to wearer 200.

Some embodiments of exoskeleton leg 100 include at least one thigh clip 648. In some embodiments, butt pad 640 is detachable from thigh clip 648. In some embodiments, shoulder straps 647 are detachable from waist belt 645. In some embodiments, such as that shown in FIG. 45 and FIG. 48, thigh clip 648 is coupled to waist belt 645 by front hip strap 643 and back hip strap 644. In various embodiments, front hip strap 643 may be rigid. In some embodiments, back hip strap 644 may be rigid.

In some embodiments, front hip strap 643 may be directly coupled to thigh extension link 111. In some embodiments, front hip strap 643 may be directly connected to thigh link 104.

In some embodiments, back hip strap 644 may be directly coupled to the thigh extension link 111. In some embodiments, back hip strap 644 may be directly connected to the thigh link 104.

In various embodiments, front hip strap 643 is configured to provide multiple functionalities. For example, front hip strap 643 may be configured to provide a portion of the vertical lift, through thigh clip 648, to exoskeleton leg 100 to prevent it falling down due to its own weight. Front hip strap 643 may also be configured to prevent exoskeleton leg 100 from falling posterior to the frontal plane of the wearer 200.

Similarly, back hip strap 644 is configured to provide multiple functionalities. Back hip strap 644 may be configured to provide a portion of the vertical lift, through thigh clip 648, to exoskeleton leg 100 to prevent it falling down due to its own weight. Back hip strap 644 may also be configured to prevent exoskeleton leg 100 from falling anterior to the wearer's frontal plane.

FIG. 48 shows that upper end of front hip strap 653 is coupled to waist belt 645, anterior to the frontal plane of wearer 200 and that lower end of front hip strap 652 is coupled to thigh clip 648. FIG. 48 also shows that upper end of back hip strap 655 is coupled posterior to the frontal plane of wearer 200 on waist belt 645 and the lower end of back hip strap 654 is coupled to thigh clip 648.

In some embodiments, the lengths of front hip strap 643 and back hip strap 644 during use are fixed. These fixed lengths of front hip strap 643 and back hip strap 644 and their attachment locations restrict sagittal motion of the thigh clip 648 in the frontal plane (i.e. the thigh clip 468 motion anterior and posterior to the wearer are restricted). In some embodiments, lower end of front hip strap 652 and lower end of back hip strap 654 do not connect to thigh clip 648 at the same place, as shown in FIG. 48.

In some embodiments, such as that shown in FIG. 45, thigh extension link 111 of exoskeleton leg 100 is configured to be coupled to thigh clip 648. Such a configuration further couples thigh link 104 of exoskeleton leg 100 to wearer's thigh 204.

In some embodiments, such as that shown in FIG. 45, thigh link 104 of exoskeleton leg 100 is configured to be coupled to thigh clip 648. This in turn couples thigh link 104 of exoskeleton leg 100 to wearer's thigh 204.

In some embodiments, waist belt 645, thigh clip 648, front hip strap 643, back hip strap 644, butt pad 640, shin strap 642, and shoulder strap 647 may be adjustable in length. In some embodiments, the coupling between thigh link 104 and thigh clip 648 may allow rotation.

In various embodiments, the location of the rotation point on the thigh clip 648 between thigh link 104 and thigh clip 648 is substantially aligned with the wearer's hips joint 216 of the wearer 200.

In some embodiments, the coupling between human machine interface 639 and exoskeleton leg 100 is detachable. In some embodiments, the coupling between human machine interface 639 and exoskeleton leg 100 is attachable and detachable at thigh clip 648.

Figure 51:
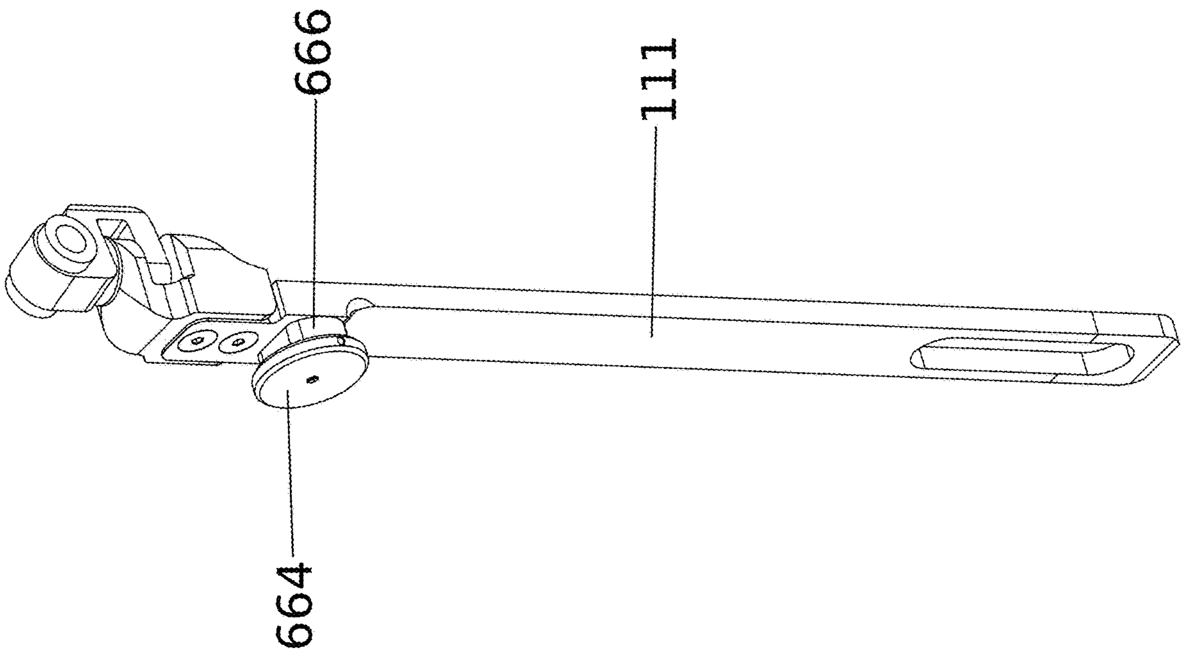
FIG. 51 shows the thigh extension link with button assembly installed.

In some embodiments, such as that shown in FIG. 45, the coupling of thigh extension link 111 and thigh clip 648 is achieved using holding bracket 660, coupled to thigh clip 648, and button head 665 coupled to think extension link 111, as shown in FIG. 51. The functionality of button head 665 and holding bracket 660 are described further below.

In some embodiments the coupling of thigh link 104 and thigh clip 648 is achieved using holding bracket 660, coupled to thigh clip 648, and button assembly 664 coupled to thigh link 104.

In some embodiments the coupling of thigh extension link 111 and thigh clip 648 is achieved using holding bracket 660, coupled to thigh extension link 111, and button assembly 664 coupled to think clip 648.

In some embodiments the coupling of thigh link 104 and thigh clip 648 is achieved using holding bracket 660, coupled to thigh link 104, and button assembly 664 coupled to think clip 648.

In various embodiments, button assembly 664 consists of a button head 665 and button neck 666. In some embodiments, the coupling between the thigh link 104 and thigh clip 648 is achieved using a holding bracket 660 on the thigh clip 648 comprising an upper cavity 662 and a lower cavity 661 in the thigh clip 648 and a button assembly 664 on the thigh link 104 comprising button neck 666 and a button head 665 wherein said holding bracket upper cavity 662 only allows insertion and removal of the button neck 666 in a certain orientation, and button head 665 can rotate freely in the lower cavity.

Figure 49:
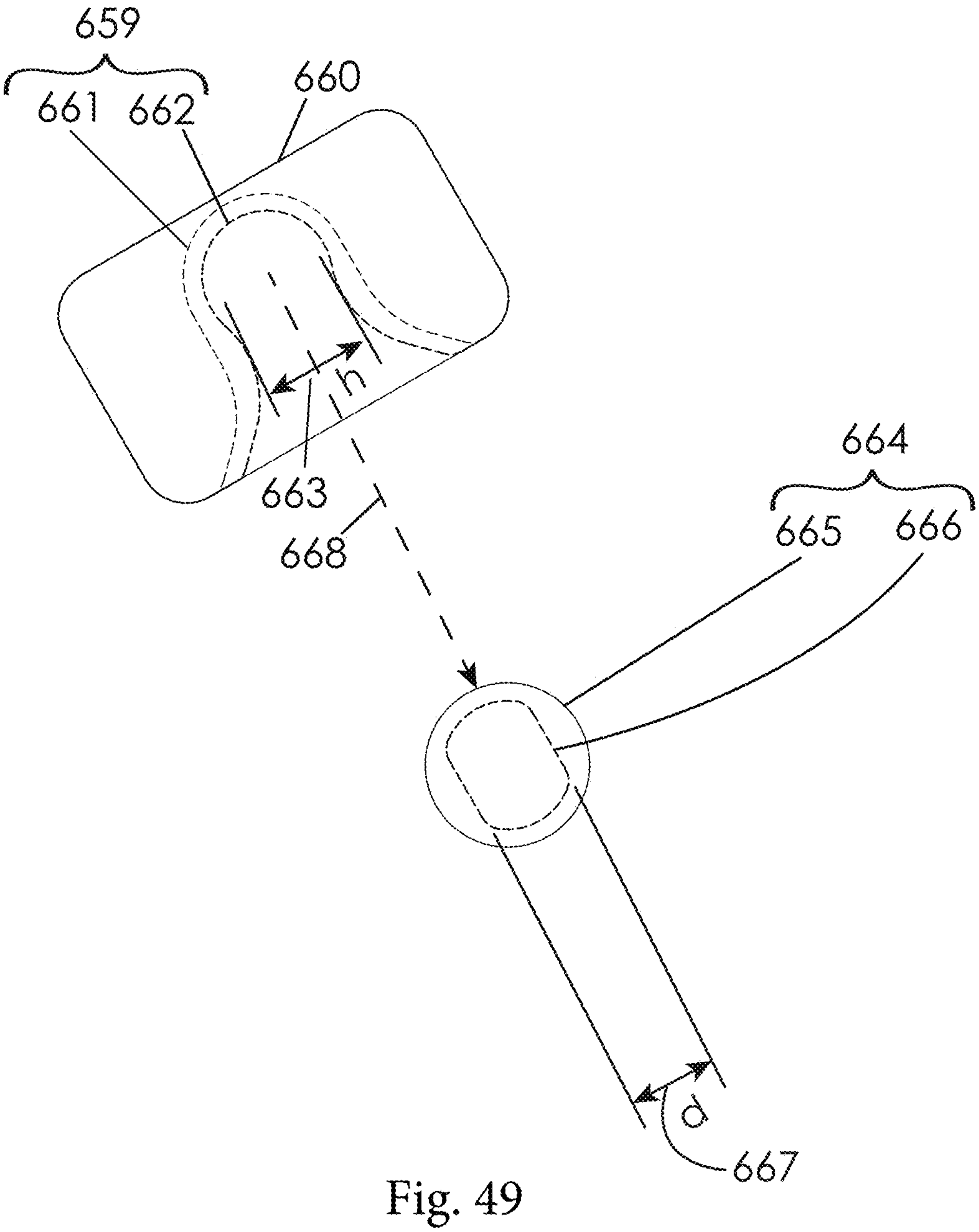
FIG. 49 shows a view of the holding bracket and the button assembly when not coupled, but when oriented for insertion.
Figure 50:
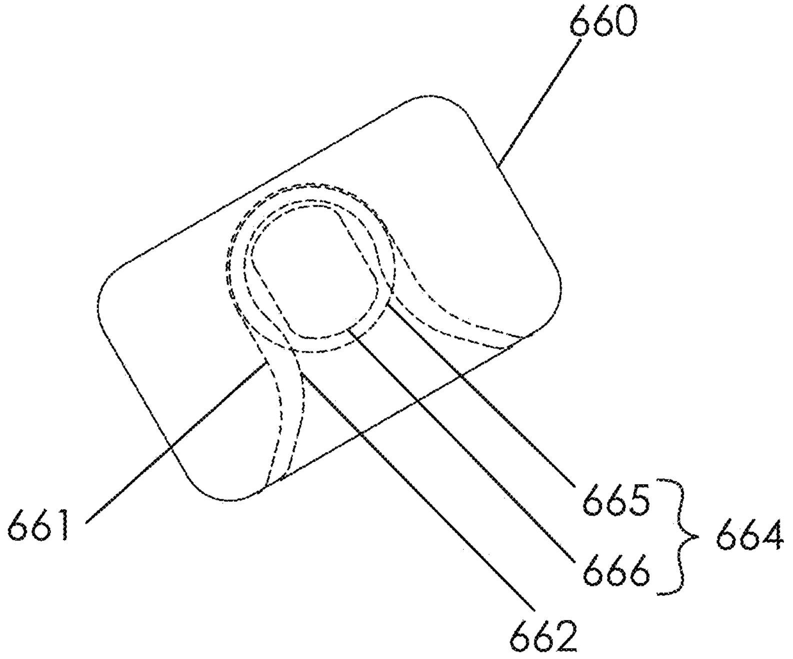
FIG. 50 shows a view of the holding bracket and the button assembly when coupled right after insertion.

As shown in FIG. 49 and FIG. 50, in some embodiments, a cavity 659 is formed within holding bracket 660. In some embodiments, cavity 659 is comprised of lower cavity 661 and upper cavity 662 to accommodate button head 665 and button neck 666. In some embodiments, as shown in FIG. 49 and FIG. 50, lower cavity 661 has a shape that allows button head 665 can easily slide into lower cavity 661. However upper cavity 662 has a shape such that button neck 666 can be moved into upper cavity 662 along a particular direction arrow 668.

Figure 53:
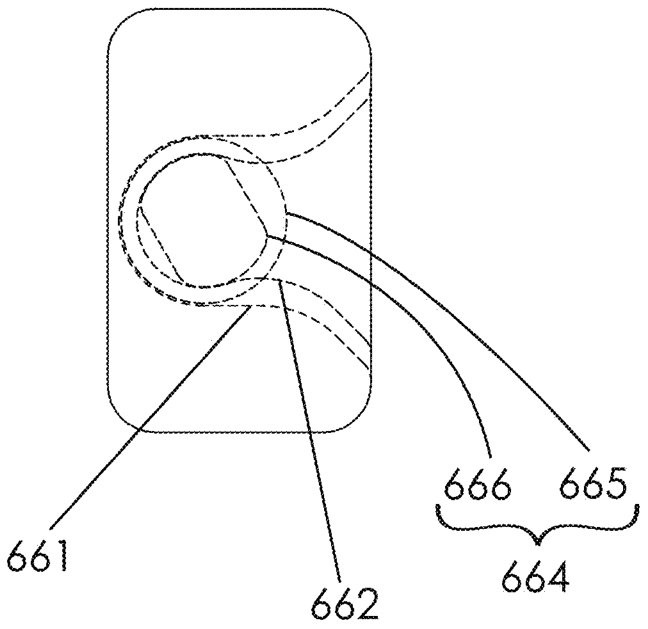
FIG. 53 shows a view of the holding bracket and the button assembly when coupled, where the button assembly has been rotated so that it does not decouple from the holding bracket.
Figure 54:
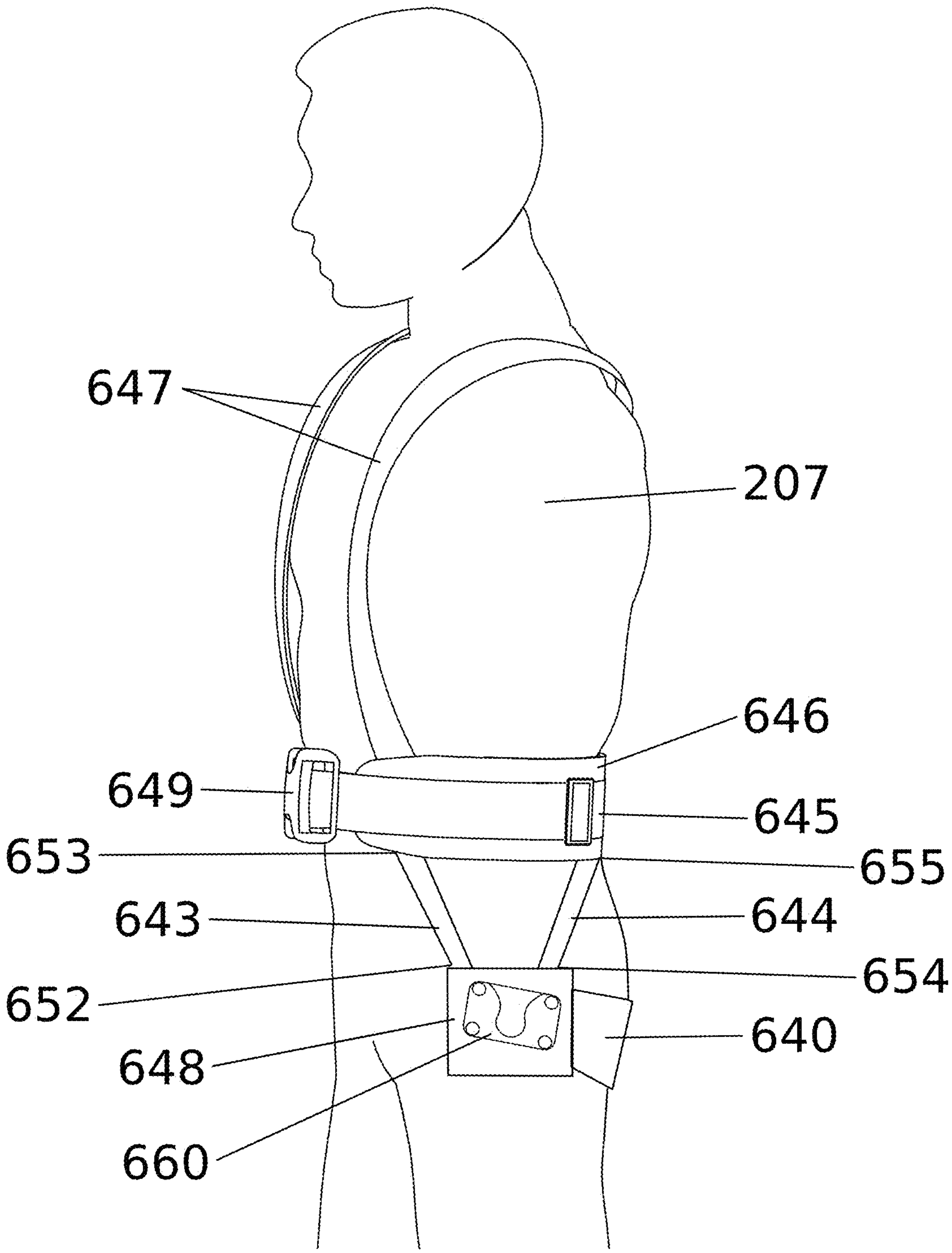
FIG. 54 shows a side view of the human machine interface on a user with the thigh clip oriented at a slight angle.

FIG. 49 shows button assembly 664 and holding bracket 660 when they are not coupled to each other. In the orientation of FIG. 49, when holding bracket 660 is moved relative to button assembly 664 along arrow 668, button neck 666 and button head 665 move into upper cavity 662 and lower cavity 661. Button neck 666 has a shape that can be moved into upper cavity 662 only along the direction 668 as shown in FIG. 49. This is true because upper cavity 662 has an opening that can accommodate button neck 666 only along direction 668. In particular it can be observed in FIG. 49 and FIG. 50 that button neck 666 has a small dimension 667 shown by d and upper cavity 662 has an opening 663 shown by h. d is smaller than h and therefore button assembly 664 can be moved into cavity 659 only when button assembly 664 and cavity 659 are aligned relative to each other as shown by arrow 668. When not aligned along direction 668, button assembly 664 cannot slide out of holding bracket 660 as shown in FIG. 53.

In some embodiments, holding bracket 660 is attached to thigh clip 648 and button assembly 664 is coupled to thigh link 104 such that thigh link 104 is non-parallel to wearer's thigh 204 when standing upright to allow button assembly 664 to slide into or out of holding bracket 660.

Figure 52:
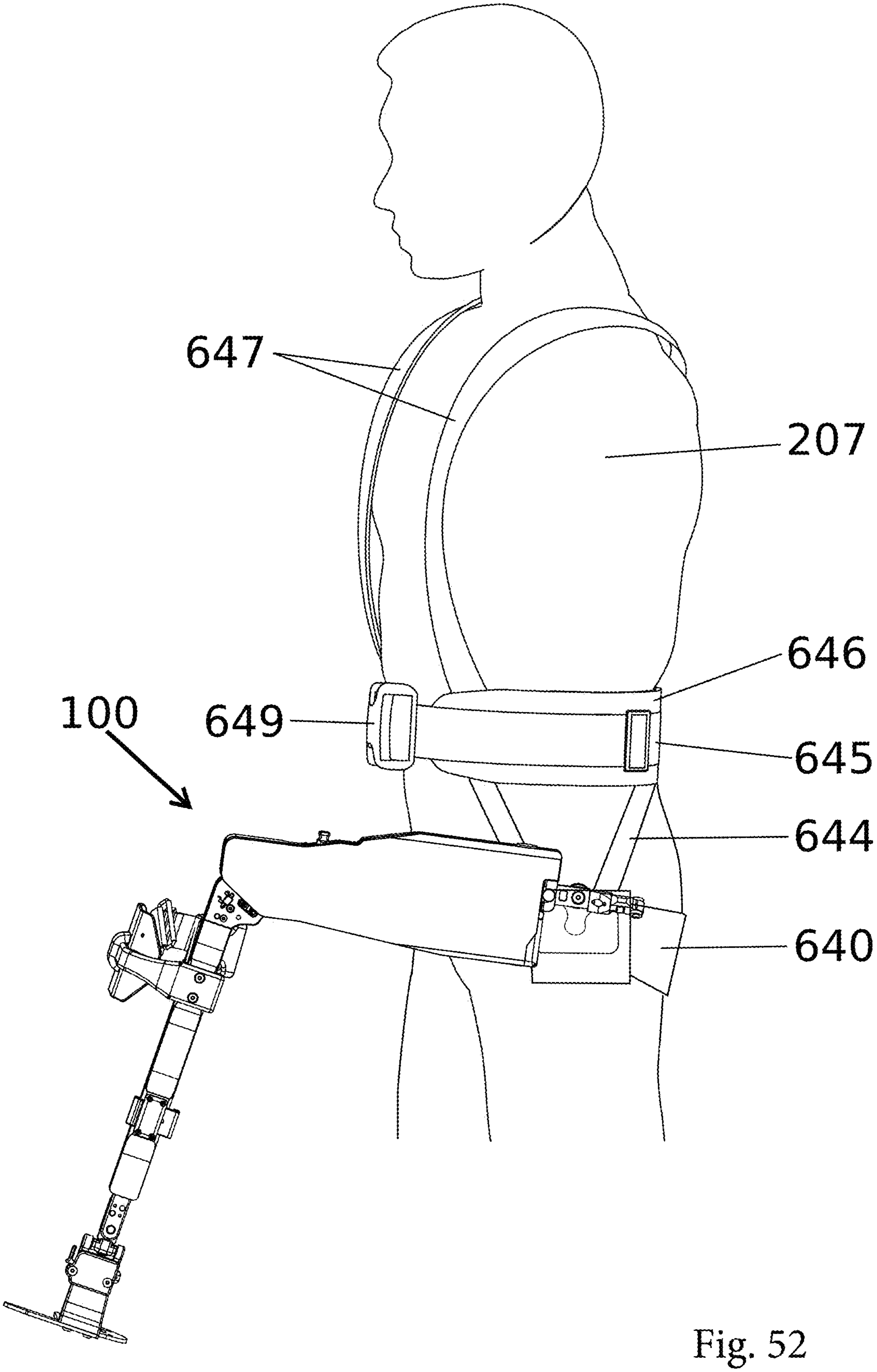
FIG. 52 shows an orientation of the exoskeleton leg relative to the wearer to install and couple the exoskeleton thigh link to the thigh clip.

In some embodiments, holding bracket 660 is attached to thigh clip 648 and button assembly 664 is coupled to thigh link 104 (or thigh extension link 111 as shown in FIG. 51) such that thigh link 104 must be substantially perpendicular to wearer's thigh 204 when standing upright to allow button assembly 664 to slide into or out of holding bracket 660 as shown in FIG. 52.

In some embodiments, holding bracket 660 and button assembly 664 may be configured such that they can be coupled when the thigh link 104 is not substantially parallel to wearer's thigh.

FIG. 51 shows that flat edge of button neck 666 is oriented perpendicular to thigh extension link 111. A wearer 200 may quickly don or doff exoskeleton leg 100 by appropriately rotating thigh link 104 of exoskeleton leg 100 and sliding button assembly 664 into, or out of, respectively, holding bracket 660. It will be appreciated that similar embodiments may instead have holding bracket 660 attached to thigh extension link 111 or thigh link 104 and button assembly 664 attached to thigh clip 648.

In some embodiments, holding bracket 660 is positioned on the thigh clip 648, such that during use, the motion of exoskeleton thigh link 104, relative to the thigh clip 648, button head 665 does not dislodge from holding bracket 660.

The holding bracket 660 and button assembly 664 can be coupled or decoupled when the thigh link is not substantially parallel to wearer's thigh 204. This is achieved by orienting the holding bracket such that installing and removal of the exoskeleton leg can only occur when the thigh link is non parallel to the thigh. This can be seen in the embodiment of FIG. 52. FIG. 48 and FIG. 52 show examples of the holding bracket orientation relative to the wearer.

In some embodiments, the wearer 200 may put on or take off the entirety of the device, including human machine interface 639 and exoskeleton leg 100 and 101 all at once by using waist belt buckle or latch 649. In such embodiments, human machine interface 639 is coupled by thigh clips 648 to exoskeleton leg 100 and 101, and to wear the device, a wearer fastens the waist belt 645, shin straps 642. In some embodiments, a wearer may have additional coupling to exoskeleton leg 100 at wearer's foot 214 or wearer's ankle 220.

In some embodiments the components of button assembly 664 are constructed from the same part. In some embodiments, holding bracket 660 and button assembly 664 cannot be uncoupled when the thigh link 104 is substantially parallel to wearer's thigh. In some embodiments, butt pad 640 may be replaced by a thigh strap 641 which is rigid. In some embodiments, thigh strap 641 comprises a combination of rigid and flexible materials. The thigh strap 641 is configured to couple the thigh link 104 to the thigh of the wearer 200.

In some embodiments, the human machine interface 639 can couple to the exoskeleton leg 100 as well as other exoskeleton systems such as torso exoskeleton 600. Torso exoskeleton 600 may be coupled to the waist belt 645 using a similar connection as the button assembly 664 and holding bracket 660 previously described where the holding bracket 660 may be coupled to the torso link 603 of the torso exoskeleton 600 and button assembly 664 is coupled to the waist belt 645. Alternatively, the holding bracket 660 may be coupled to the waist belt 645 and the button assembly 664 may be coupled to the torso link 603 of the torso exoskeleton 600.

In some embodiments, some components of the harnessing, such as shoulder straps 647, waist belt 645, thigh straps 641, may be replaced by some or all components of a standard safety harness (not shown). In some embodiments, human machine interface 639 is selected from a group comprising of safety harness, safety belt, tool belt harness, tool belt, climbing harness, construction worker fall protection safety harness and any combination thereof. In some embodiments, the use of a safety harness, a safety belt, a climbing harness, or a construction worker fall protection safety harness as human machine interface 639 provides advantages such as the simultaneous achievement of securing safety of wearer 200, and coupling exoskeleton leg 100 to wearer 200.

It will be appreciated that human machine interface 639 can include any safety harness, such as, for example, a climbing harness or fall prevention safety harness, or any combination of safety harnesses configured to couple a trunk supporting an exoskeleton to a wearer, in addition to securing safety for the wearer. Thus, in some embodiments, human machine interface 639 is selected from the group consisting of a safety harness, a safety belt, a construction worker fall protection safety harness, a climbing harness, a fall prevention safety harness, a tool belt, and any combination thereof.

Figure 12:
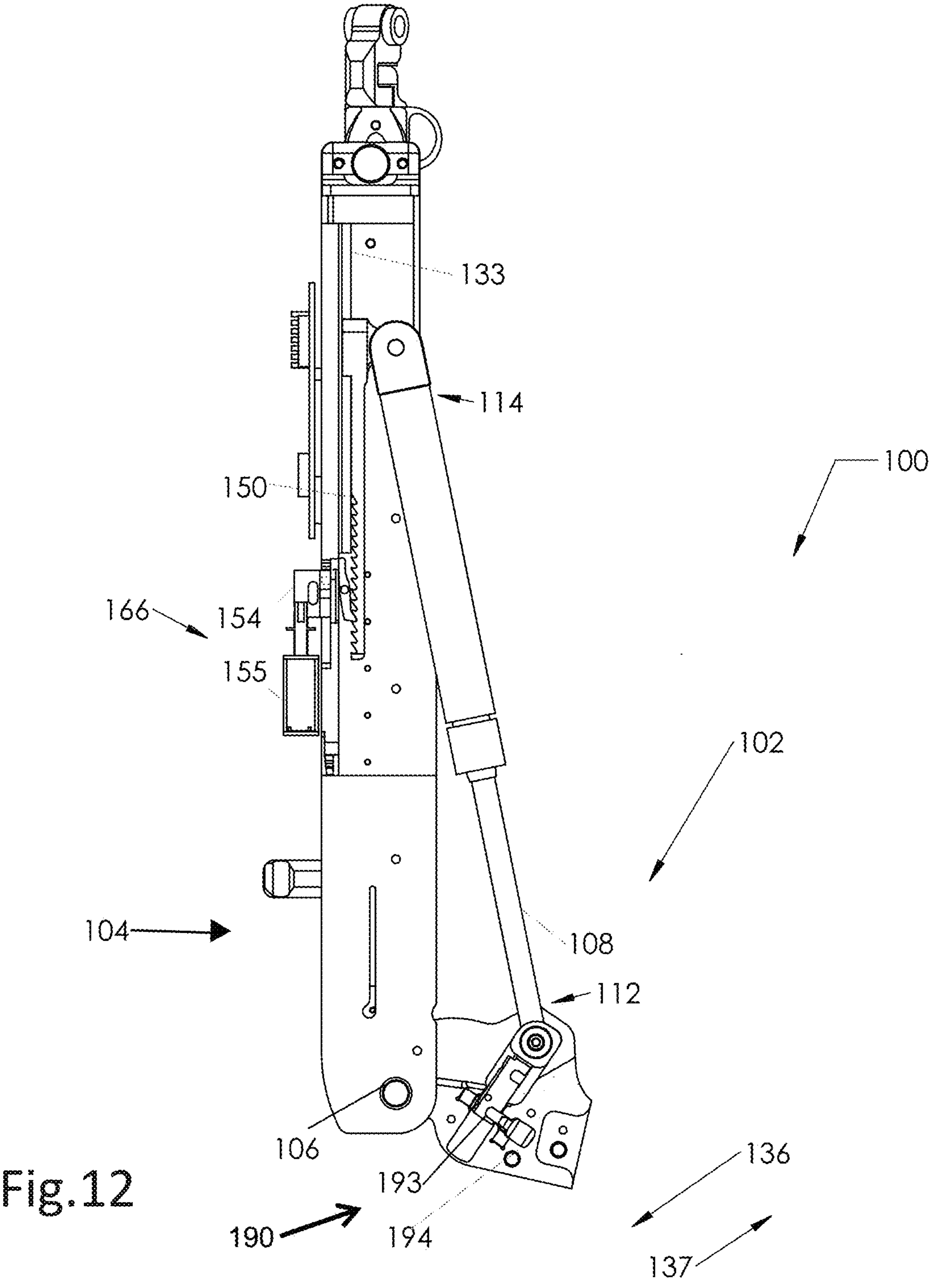
FIG. 12 shows the close-up and partial view of the embodiment shown in FIG. 11, wherein the adjustment mechanism coupled to the shank link includes torque adjustment lock.
Figure 13:
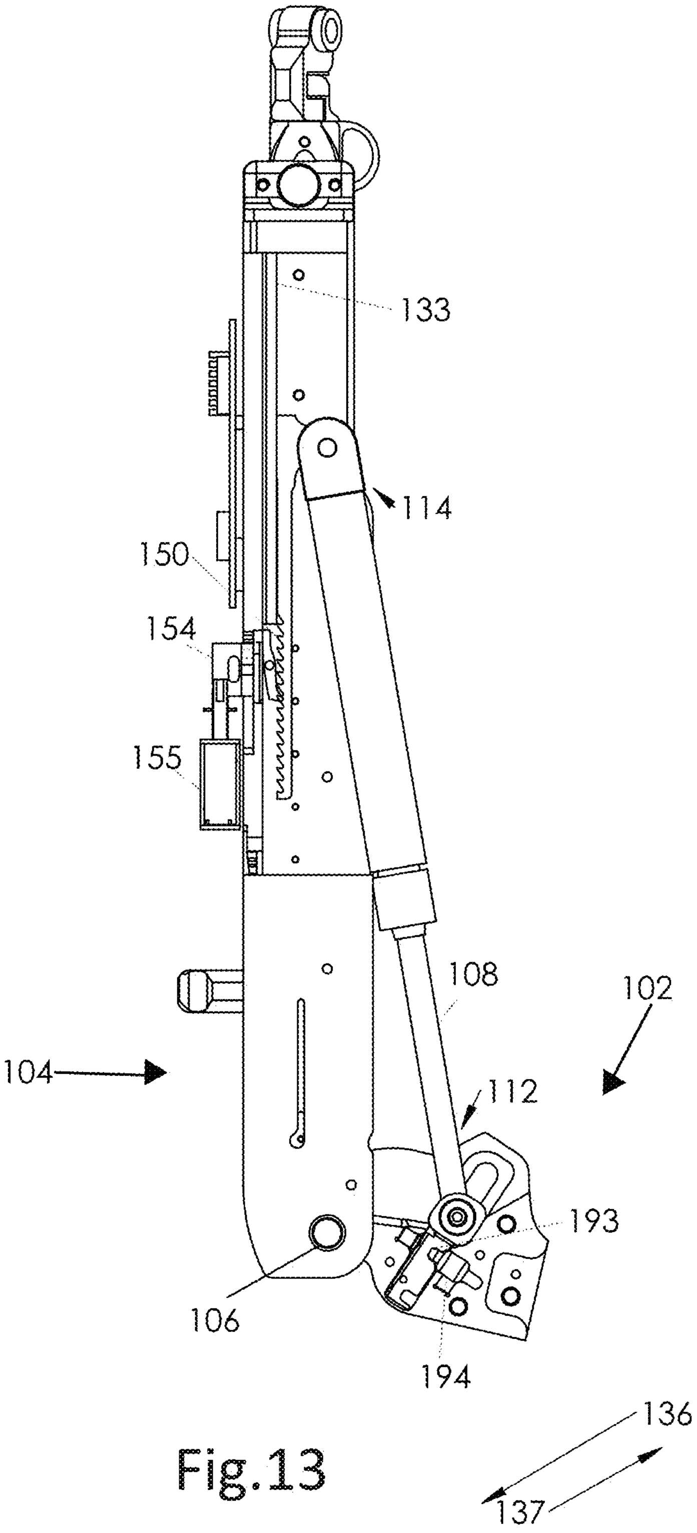
FIG. 13 shows the close-up and partial view of the embodiment shown in FIG. 12, wherein the adjustment mechanism further includes a torque adjustment switch to enable relocation of an end of the force generator.

FIG. 11 shows a close-up and partial view of the embodiment shown in FIG. 10, wherein a torque adjustment mechanism 190 coupled to a shank link 102 is shown. FIGS. 11-13 show one embodiment of a torque adjustment mechanism 190. FIG. 11-13 show a cutout of shank link 102 for clarity with regard to the mechanism inside shank link 102.

In various embodiments, various advantages are provided by the ability to adjust the torque output of exoskeleton leg 100 at a knee joint for various wearers 200 of various sizes. For example, FIGS. 11-13 depict one embodiment of a torque adjustment mechanism 190. Specifically, torque adjustment switch 193 on at least one exoskeleton leg may be used to control a location of first end 112 of force generator 108 relative to knee joint 106. In this embodiment, the torque at the knee joint is proportional to the moment arm length between the force generator 108 and the knee joint 106. Thus, the torque at the knee joint 106 is larger when the location of first end 112 is furthest from knee joint 106. The torque at knee joint 106 is lowest when the location of first end 112 is closest to knee joint 106. This is because the location of end first 112 governs the maximum moment arm length between the force generator 108 and the knee joint 106. It will be appreciated that any suitable technique for implementing such an adjustments is contemplated and disclosed herein.

FIG. 11 depicts an embodiment where first end 112 of force generator 108 in its furthest position from knee joint 106, resulting in a largest torque setting when in this configuration. In various embodiments, torque adjustment switch 193 is positioned in a channel inside shank link 102. In some embodiments, torque adjustment switch 193 may contain at least two detents which interface with torque adjustment lock 194.

FIG. 12 shows a close-up and partial view of the embodiment shown in FIG. 11, wherein the torque adjustment mechanism 190 coupled to a shank link 102 comprises torque adjustment lock 194. Specifically, the embodiment of FIG. 12 shows torque adjustment lock 194 in a lowered position, allowing the torque adjustment switch 193 to move in low torque direction 136 and high torque direction 137.

FIG. 13 shows the close-up and partial view of the embodiment shown in FIG. 12 wherein the torque adjustment mechanism 190 further comprises a torque adjustment switch 193 configured to enable relocation of an end of force generator 108 and torque adjustment lock 194 to constrain the location of torque adjustment switch 193 relative to the knee joint. More specifically, FIG. 13 depicts torque adjustment switch 193 which has been moved such that first end 112 of force generator 108 is closer to knee joint 106. In this orientation, torque at knee joint 106 is lower than the setting shown in FIG. 11. Once torque adjustment switch 193 is moved to the desired position or setting, torque adjustment lock 194 is raised (as shown in FIG. 13), thereby preventing the motion of torque adjustment switch 193.

FIGS. 11, 12, and 13 show torque adjustment switch 193 with 2 detents. Torque adjustment lock 194 constrains a location of torque adjustment switch 193 relative to knee joint 106 when it interfaces with a detent in torque adjustment switch 193. In some embodiments, torque adjustment switch 193 is controlled manually.

Accordingly, in the embodiment of FIGS. 11-13, torque adjustment switch 193 is lowered manually. However, in various embodiments, such toggling of torque adjustment switch 193 may be implemented automatically. In the embodiment shown, in order to change the torque setting, torque adjustment lock 194 is lowered, allowing torque adjustment switch 193 to move relative to knee joint 106, within a channel inside shank link 102.

Figure 33:
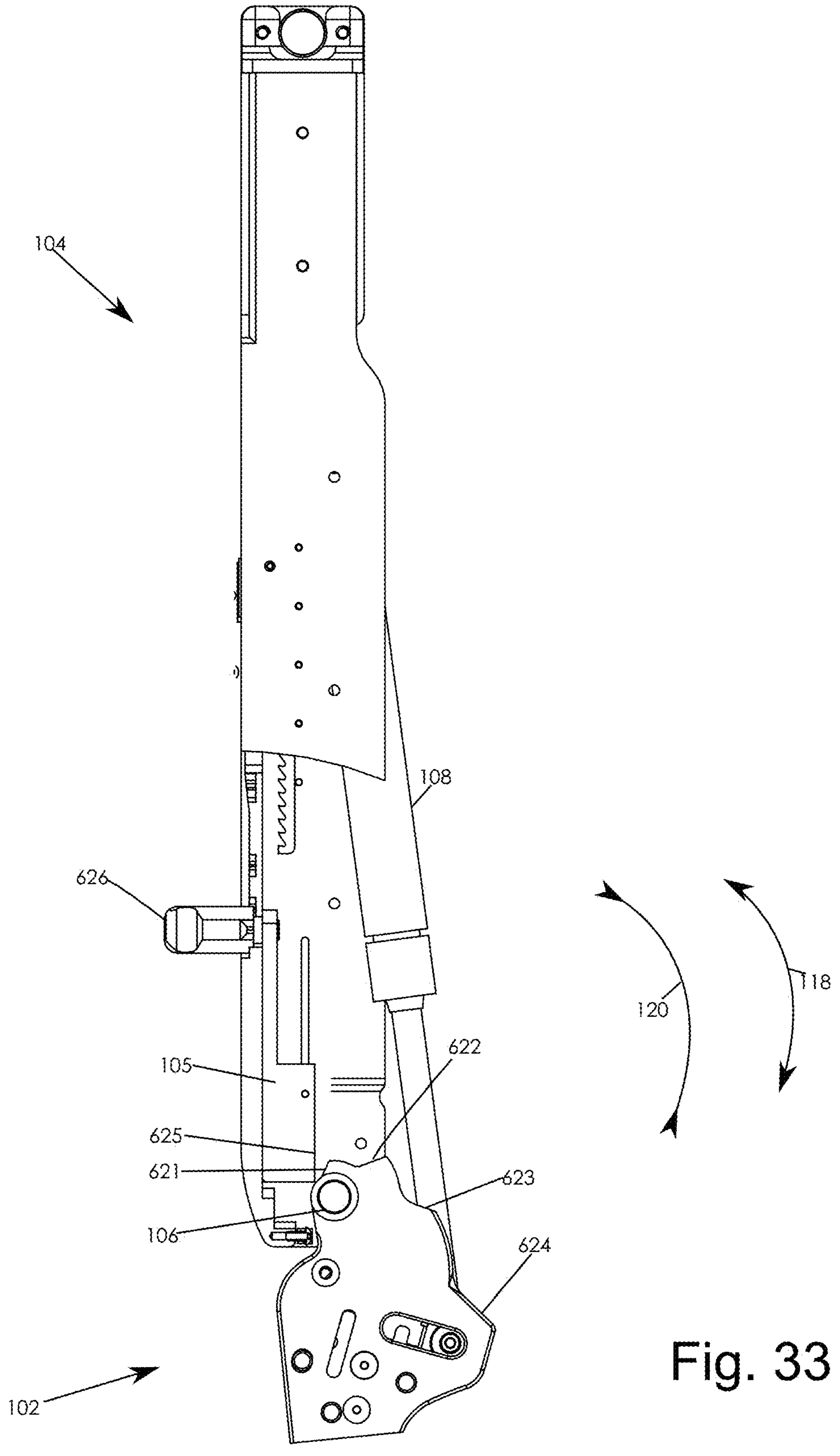
FIG. 33 shows a close-up and partial embodiment of the thigh link, knee joint, and shank link of the exoskeleton leg of FIG. 6, further showing a locking block in a lower position along the thigh link.
Figure 34:
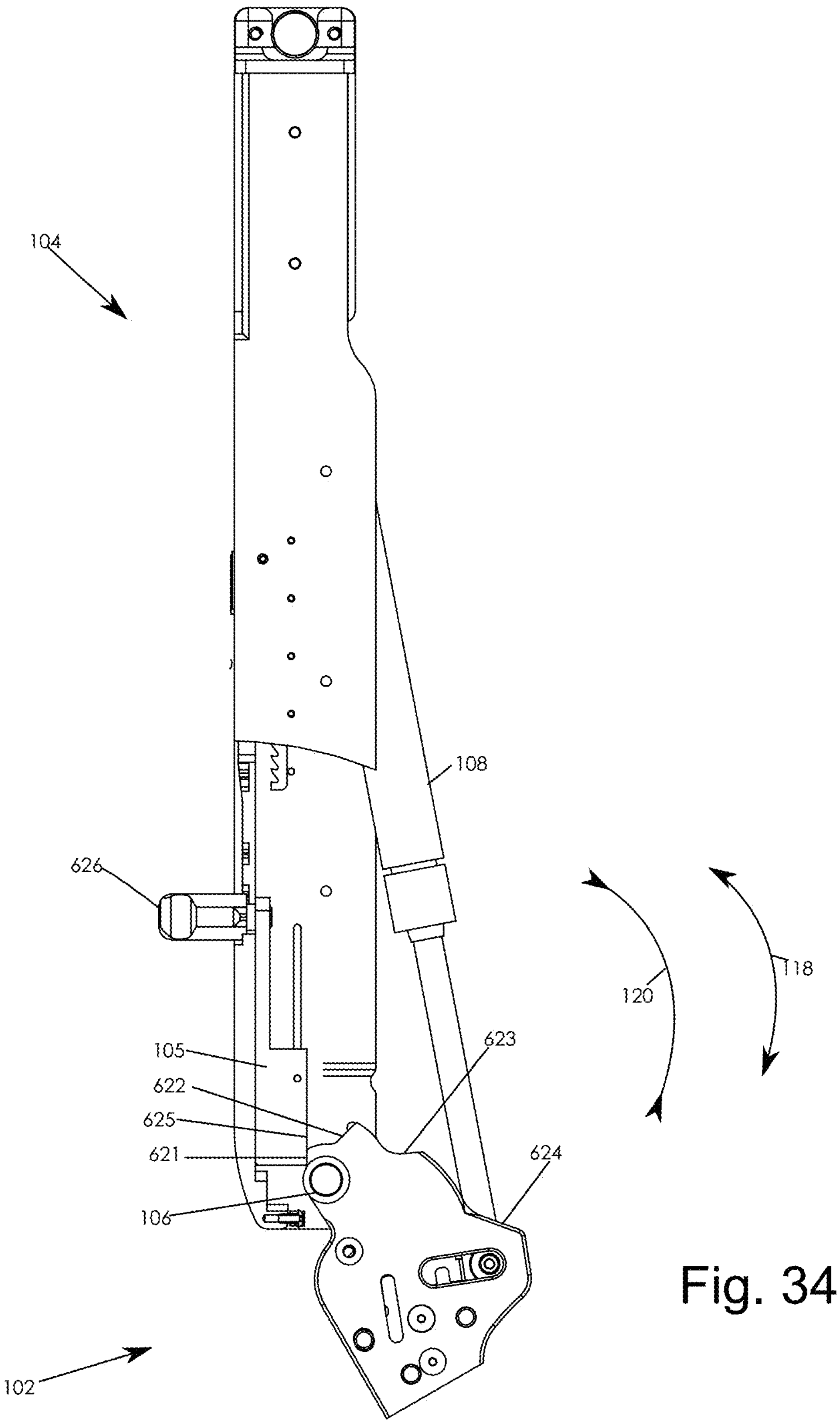
FIG. 34 shows how, when in operation, the embodiment of FIG. 33 includes one or more teeth configured to touch a locking face of the locking block, which is configured to touch each tooth at different degrees of knee flexion.
Figure 35:
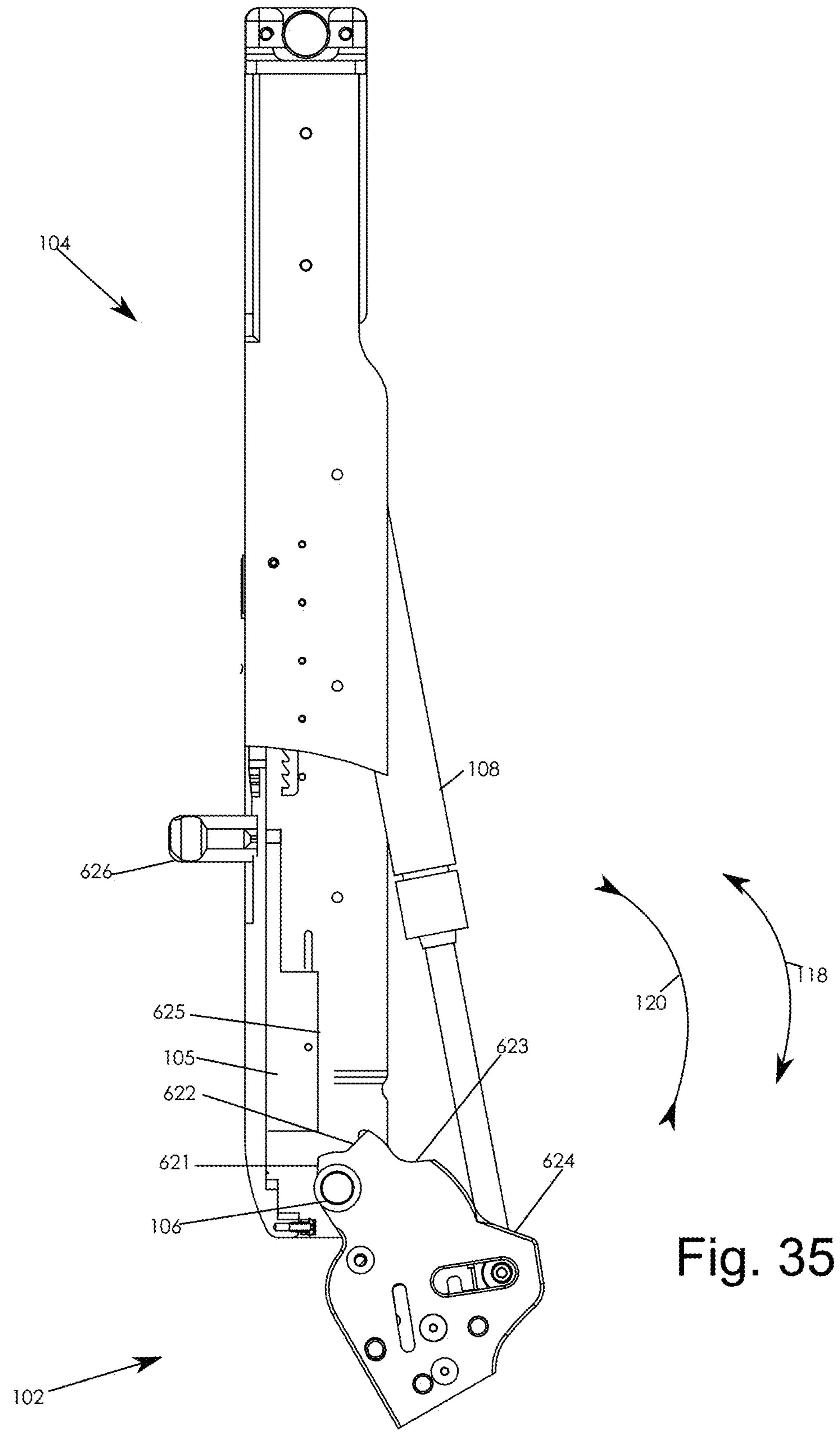
FIG. 35 shows how, when in operation, the embodiment of FIG. 33 allows for another configuration of the locking block relative to each tooth on the shank link, so that each tooth may be positioned at a desired angular position relative to the locking face of locking block.

Some embodiments of exoskeleton leg 100 include a locking mechanism. The locking mechanism of exoskeleton leg 100 prevents motion of the thigh link 104 in flexion direction 120. In some embodiments, the locking mechanism includes a locking block 105. As shown in FIGS. 33-35, an embodiment of locking block 105 is linearly constrained to move along thigh link 104, and shank link 102 includes at least one tooth. For example, in the embodiment of FIGS. 33-35, shank link 102 has 4 teeth: first shank tooth 621, second shank tooth 622, third shank tooth 623, and fourth shank tooth 624.

FIG. 33 shows a close-up and partial embodiment of a thigh link 104, knee joint 106, and shank link 102 of the exoskeleton leg 100 of FIG. 6, further showing a locking block 105 in a lower position along a thigh link 104. Specifically, FIG. 33 shows locking block 105 in a lower position along thigh link 104.

Referring to FIG. 33, it can be seen that shank link 102 can rotate about knee joint 106 in flexion direction 120 until first shank tooth 621 interfaces (i.e. makes contact) with locking face 625. This occurs at an angle defined by first tooth 621 relative to locking face 625. Once first shank tooth 621 meets locking face 625, locking block 105 prevents further motion of the shank link 102 relative to the thigh link 104 in flexion direction 120. However shank link 102 can still rotate in extension direction 118.

FIG. 34 shows how, when in operation, the embodiment of FIG. 33 comprises one or more teeth configured to touch a locking face 625 of a locking block 105, which in turn is configured to touch each tooth at different degrees of knee flexion. FIG. 34 shows first shank tooth 621 touching locking face 625.

FIG. 35 shows how, when in operation, the embodiment of FIG. 33 allows for another configuration of a locking block 105 on thigh link 104. The locking block 105 can be positioned relative to each tooth on a shank link 102, so that when shank link 102 rotates relative to the locking block 105 or thigh link 104, the tooth on the shank link 102 engages with the locking face 625. More specifically, as shown in FIG. 35, each tooth on shank link 102 is positioned at a desired angular position relative to locking face 625 of locking block 105. In this embodiment, the desired angular position of each tooth relative to locking block 105 when the thigh link 104 are upright, corresponds to a locking angle between thigh link 104 and shank link 102.

For example, in the embodiment shown, when thigh link 104 and shank link 102 are parallel, if the angle between locking face 625 on locking block 105 and a tooth on shank link 102 is 30 degrees, then locking block 105 can be positioned along thigh link 104 such that after 30 degrees of rotation, a tooth on shank link 102 (first shank tooth 621 in this case) interfaces with locking face 625, stopping further rotation in one direction. As shown in FIG. 35, locking block 105 in a higher position along thigh link 104, such that shank link 102 can rotate without interfacing first shank tooth 621 with locking face 625.

Figure 36:
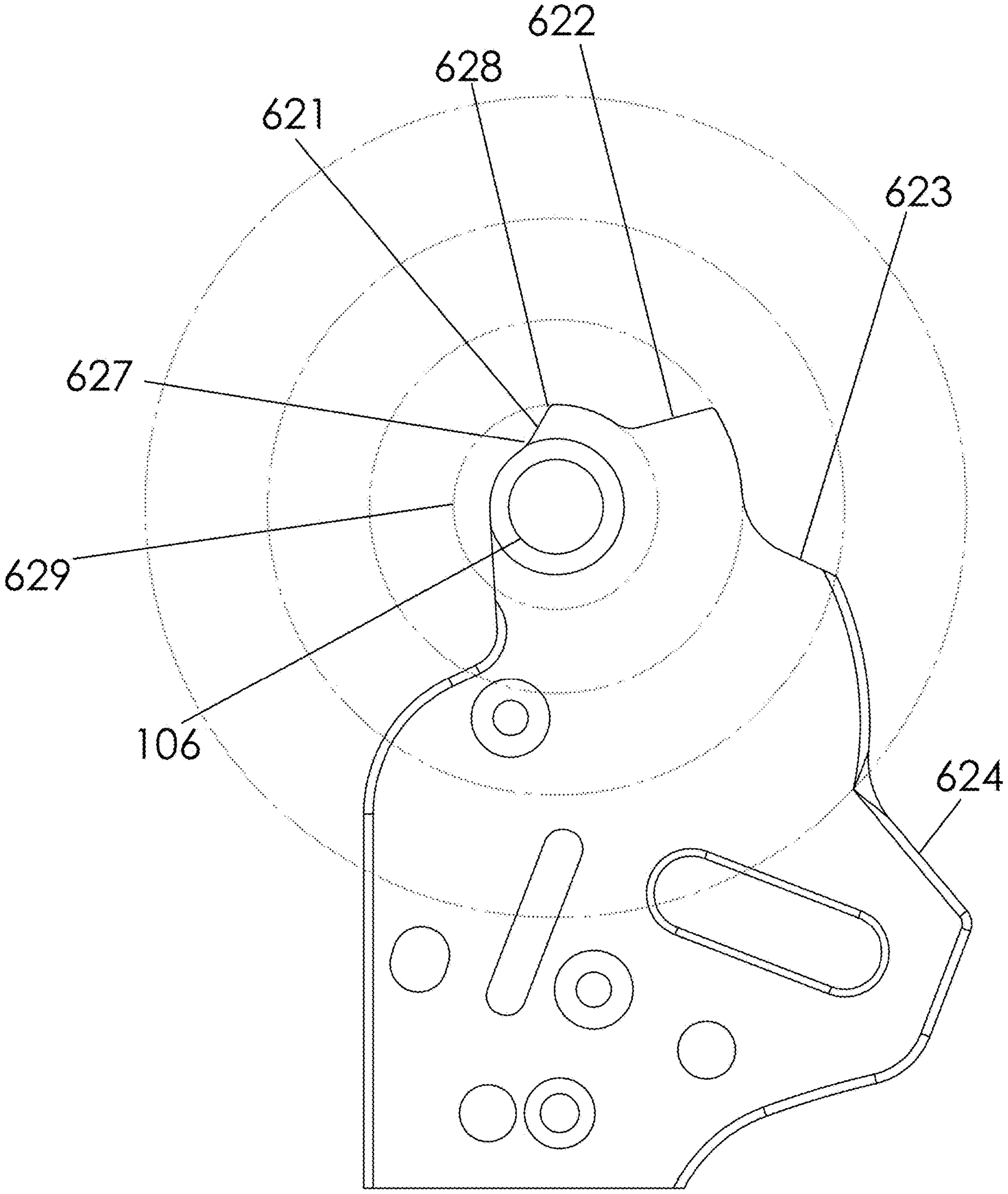
FIG. 36 shows a close-up view of the angular positions of each tooth relative to the locking face of the locking block (not shown), so as to create a locking angle, beyond which no more knee flexion is permitted.

FIG. 36 shows a close-up view of angular positions of each tooth relative to a locking face 625 of a locking block (not shown), so as to create a locking angle, beyond which no more knee flexion 120 is permitted. As can be seen, the shank link 102 rotating in the extension direction relative to the thigh link 104 is not prohibited. Accordingly, knee extension can occur freely.

As shown in FIG. 36, the location of locking block 105 for a locking angle (angle beyond which no more flexion is permitted) is determined based on tooth start point 627 (point of first shank tooth 621 closest to knee joint 106) and tooth endpoint 628 (point of first shank tooth 621 farthest from knee joint 106). Each tooth has a start point and an endpoint.

In some embodiments, each tooth for a different locking angle occurs in sequential order of a locking angle. For example, a locking tooth for angle 30 degrees is followed by a locking tooth for angle 75 degrees, which is followed by a locking tooth for angle 140 degrees.

In some embodiments, the location of tooth start point 627 (point of the tooth closest to knee joint 106) and tooth endpoint 628 (point of the tooth farthest from the knee joint 106) for first shank tooth 621 depends upon the availability of space in the mechanical system and the strength requirement of the material. For illustration purposes, FIG. 36 shows tooth start point 627 and tooth endpoint 628 for only first shank tooth 621. However, each tooth has its own start point and endpoint.

FIG. 36 also shows a circle with its center about knee joint 106 which contains tooth endpoint 628 of first shank tooth 621. A tooth start point for second shank tooth 622 can be placed on a first circle 629 which contains tooth endpoint 628, or, alternatively, a circle of larger radius. In some embodiments, the radial location of a tooth start point of a not-first tooth (all subsequent teeth) is equal to or larger than the radial location of a tooth end point of the adjacent previous tooth.

Figures 37A, 37B, 37C:
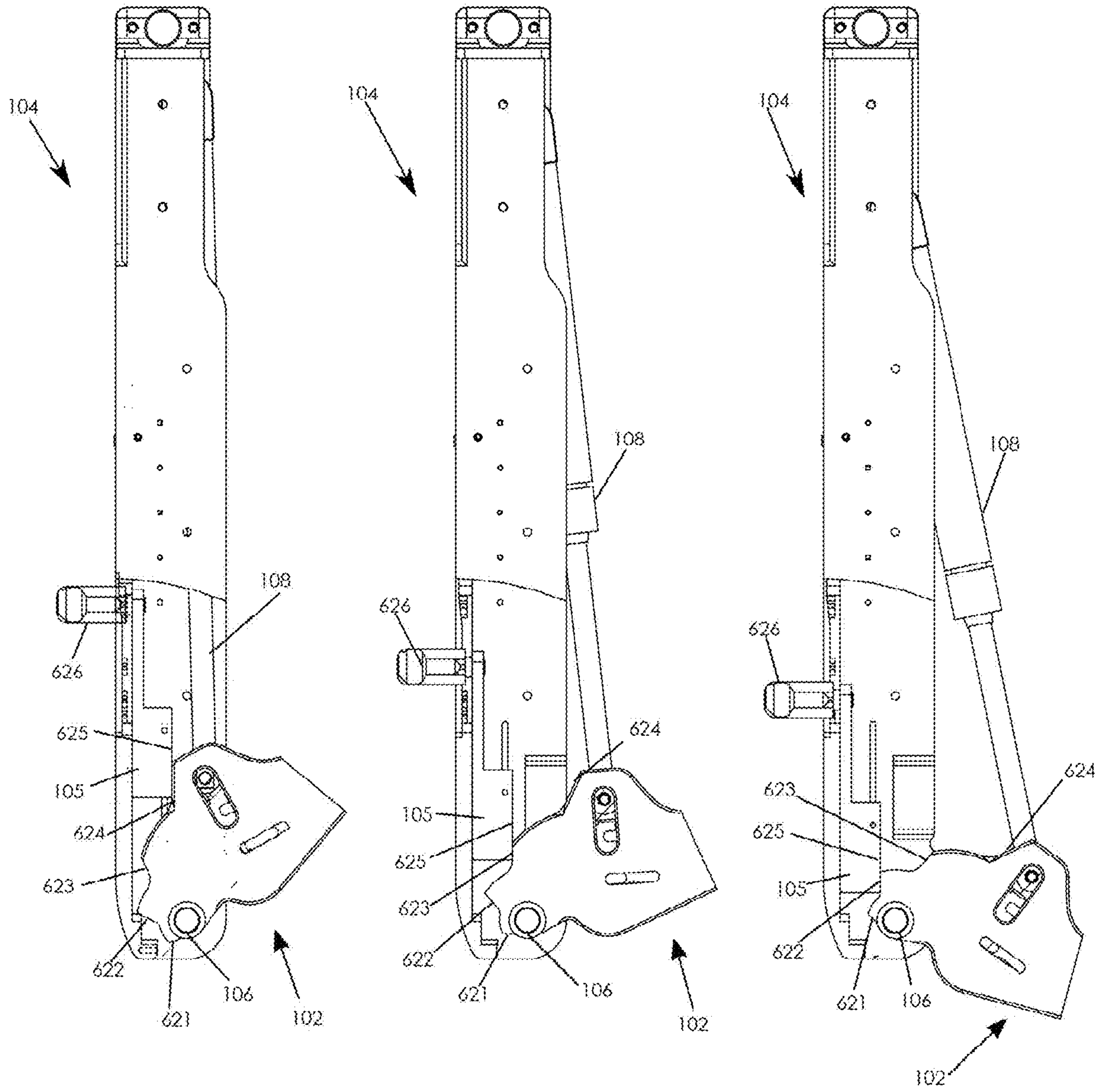
FIGS. 37A, 37B, and 37C show the locking block of FIG. 35 in three positions.

Referring to FIGS. 35, 36, 37A, 37B, and 37C, tooth start points for second shank tooth 622, third shank tooth 623 and fourth shank tooth 624 each occur at a radial position equal to or larger than a previous tooth end point. This ensures that shank link 102 rotates within an allowable angular range without interference from the other teeth. In one embodiment, FIGS. 37A, 37B, and 37C show the locking block 105 of FIGS. 35 and 36 in three positions, such that locking face 625 interfaces with four different teeth, each configured to lock knee flexion at a different angle between shank link 102 and thigh link 104 of one or both legs of the embodiment. More specifically, FIGS. 37A, 37B, and 37C show locking block 105 in three positions such that locking face 625 interfaces with second shank tooth 622, third shank tooth 623 and fourth shank tooth 624 respectively. In this embodiment, the angles are 140 degrees, 110 degrees, 75 degrees, and 30 degrees between shank link 102 and thigh link 104.

In some embodiments, constraining mechanism 130 of exoskeleton leg 100 or exoskeleton leg 101 is in constrained mode 138 and locking block 105 is oriented to limit rotation beyond a particular angle. In this situation, force generator 108 resists a wearer's flexion until a permissible amount of angular rotation, after which the wearer is not allowed to flex any more.

In various embodiments, constraining mechanism 130 of exoskeleton leg 100 or exoskeleton leg 101 is in its unconstrained mode 138, and locking block 105 is oriented to limit rotation beyond a particular angle. In this situation, force generator 108 does not resist a wearer motion in flexion direction 120, and the wearer is able to extend his or her leg(s) freely. However, such freely allowed flexion is only permissible up to a certain amount of angular rotation, after which the wearer 200 is prevented from further motion in flexion direction 120.

In the embodiment shown in FIG. 35, the location for locking block 105 relative to knee joint 106 is adjusted by moving locking switch 626. Locking switch 626 allows control of the locking angle of exoskeleton leg 100. In some embodiments, locking block 105 is a rigid component and does not permit any motion in flexion direction 120 between thigh link 104 and shank link 102 when locking face 625 interfaces with shank link teeth. In some embodiments locking block 105 is a semi-rigid component and may permit limited flexion direction 120 of thigh link 104 relative to shank link 102 when locking face 625 interfaces with shank link teeth.

What is claimed is:

1. An exoskeleton leg wearable by a person, the exoskeleton leg comprising:

a thigh link configured to move in unison with a thigh of the person;

a shank link rotatably coupled to the thigh link and comprising a tooth; and a locking block coupled to the thigh link and comprising a locking face, the locking block movable relative to the thigh link between a first position and a second position, wherein the shank link and the tooth rotate together relative to the thigh link and the locking block, and wherein when the locking block is at the first position, the tooth contacts the locking face when the shank link is at a first angle relative to the thigh link, thereby preventing a flexion motion of the shank link relative to the thigh link, but allowing an extension motion of the shank link relative to the thigh link.

2. The exoskeleton leg of claim 1, wherein said shank link comprises a second tooth, and wherein when the locking block is at the second position, the second tooth of the shank link contacts the locking face when the shank link is at a second angle relative to the thigh link, thereby preventing a flexion motion of the shank link relative to the thigh link, but allowing an extension motion of the shank link relative to the thigh link.

3. The exoskeleton leg of claim 2, wherein said shank link comprises a third tooth, wherein the locking block is movable relative to the thigh link to a third position, and wherein when the locking block is at the third position, the third tooth of the shank link contacts the locking face when the shank link is at a third angle relative to the thigh link, thereby preventing a flexion motion of the shank link relative to the thigh link, but allowing an extension motion of the shank link relative to the thigh link.

4. The exoskeleton leg of claim 1, wherein when the locking block prevents flexion motion of the shank link relative to the thigh link, at least a portion of the person's weight is supported about a knee joint of the exoskeleton leg.

5. The exoskeleton leg of claim 4, wherein when the locking block prevents flexion motion of the shank link relative to the thigh link, at least a portion of the person's weight is supported about a knee joint of the exoskeleton leg and transferred to the ground.

6. The exoskeleton leg of claim 1, wherein the locking block moves linearly between the first position and the second position.

7. The exoskeleton leg of claim 1, wherein the thigh link is rotatable relative to the shank link about a knee joint, and the locking block moves relative to the knee joint when moving from the first position to the second position.

8. The exoskeleton leg of claim 1, wherein the first angle of the shank link relative to the thigh link corresponds to a squatting posture of the person.

9. The exoskeleton leg of claim 1, wherein the shank link is rotatable relative to the thigh link about a first axis, and wherein the shank link comprises a series of teeth arranged such that a radial distance from the first axis to a tooth start point is equal to or larger than a radial distance from the first axis to a tooth end point of an adjacent tooth.

10. The exoskeleton leg of claim 1, further comprising a locking switch configured to move the locking block between the first position and the second position.

11. The exoskeleton leg of claim 1, wherein the locking block is rigid and does not permit any flexion motion of the shank link relative to the thigh link when the tooth contacts the locking face.

12. The exoskeleton leg of claim 1, wherein the locking block is semi-rigid and permits limited flexion motion of the shank link relative to the thigh link when the tooth contacts the locking face.

13. The exoskeleton leg of claim 1, further comprising a shoe ground connector coupled to the shank link and configured to transfer a load of the exoskeleton leg to the ground.

14. The exoskeleton leg of claim 1, further comprising a butt pad coupled to the thigh link and configured to be positioned under the person's buttocks.

15. The exoskeleton leg of claim 14, wherein the butt pad is configured to transfer at least a portion of a weight of the person to the exoskeleton leg.

16. An exoskeleton leg wearable by a person comprising:

a thigh link configured to move in unison with a thigh of the person;

a shank link rotatably coupled to the thigh link and comprising a tooth; and a locking block coupled to the thigh link and comprising a locking face;

wherein the tooth of the shank link contacts the locking face when the shank link is at a locking angle relative to the thigh link, wherein the locking angle corresponds to a squatting posture of the person, and wherein when the tooth of the shank link contacts the locking face, the shank link is prevented from flexion motion relative to the thigh link, but is allowed to extend relative to the thigh link.

17. The exoskeleton leg of claim 16, wherein the locking angle is 30 degrees.

18. The exoskeleton leg of claim 16, wherein the locking angle is 75 degrees.

19. The exoskeleton leg of claim 16, wherein the locking angle is 110 degrees.

20. The exoskeleton leg of claim 16, wherein the locking angle is 140 degrees.

21. An exoskeleton leg wearable by a person, the exoskeleton leg comprising:

a thigh link configured to move in unison with a thigh of the person;

a shank link rotatably coupled to the thigh link; and a lock adjustable between a first configuration and a second configuration, wherein when the lock is in the first configuration, the lock prevents flexion motion of the shank link relative to the thigh link beyond a first locking angle, but allows flexion motion of the shank link relative to the thigh link up to the first locking angle, wherein when the lock is in the second configuration, the lock prevents flexion motion of the shank link relative to the thigh link beyond a second locking angle, but allows flexion motion of the shank link relative to the thigh link up to the second locking angle, and wherein when the lock is in the first configuration or the second configuration, the lock allows extension motion of the shank link relative to the thigh link.

22. The exoskeleton leg of claim 21, wherein the lock comprises:

a locking block coupled to one of the thigh link or the shank link, and a first tooth and a second tooth provided on the other of the thigh link or the shank link, wherein the locking block is movable between a first position corresponding to the first configuration of the lock and a second position corresponding to the second configuration of the lock, wherein when the locking block is in the first position, the first tooth engages the locking block when the shank link is at the first locking angle relative to the thigh link, and wherein when the locking block is in the second position, the second tooth engages the locking block when the shank link is at the second locking angle relative to the thigh link.

23. The exoskeleton leg of claim 22, wherein the locking block is coupled to the thigh link, and the first tooth and the second tooth are provided on the shank link.

* * * * *